(12) United States Patent
Ito et al.

(10) Patent No.: US 10,958,133 B2
(45) Date of Patent: Mar. 23, 2021

(54) ELECTRIC MOTOR, CONTROL DEVICE, AND MOTOR CONTROL SYSTEM

(71) Applicants: DENSO CORPORATION, Kariya (JP); SOKEN, INC., Nishio (JP); National University Corporation Shizuoka University, Shizuoka (JP)

(72) Inventors: Koji Ito, Kariya (JP); Masanori Yasuda, Nishio (JP); Shinji Makita, Kariya (JP); Jun Yamaoka, Kariya (JP); Masao Tokunaga, Nishio (JP); Etsuro Yoshino, Nishio (JP); Junichi Asama, Hamamatsu (JP)

(73) Assignees: DENSO CORPORATION, Kariya (JP); SOKEN, INC., Nisshin (JP); National University Corporation Shizuoka University, Shizuoka (JP)

( * ) Notice: Subject to any disclaimer, the term of this patent is extended or adjusted under 35 U.S.C. 154(b) by 837 days.

(21) Appl. No.: 15/523,269

(22) PCT Filed: Oct. 29, 2015

(86) PCT No.: PCT/JP2015/005451
§ 371 (c)(1),
(2) Date: Apr. 28, 2017

(87) PCT Pub. No.: WO2016/072075
PCT Pub. Date: May 12, 2016

(65) Prior Publication Data
US 2017/0324304 A1    Nov. 9, 2017

(30) Foreign Application Priority Data

Nov. 3, 2014 (JP) .............................. JP2014-223870
Apr. 24, 2015 (JP) .............................. JP2015-089634
(Continued)

(51) Int. Cl.
*H02K 7/09* (2006.01)
*H02P 1/00* (2006.01)
(Continued)

(52) U.S. Cl.
CPC ............... *H02K 7/09* (2013.01); *F16C 32/04* (2013.01); *F16C 32/0402* (2013.01);
(Continued)

(58) Field of Classification Search
CPC .......... H02K 7/09; H02K 11/21; H02K 21/22; H02K 29/06; H02K 5/161; H02K 5/16; H02K 2205/03; F16C 32/04; F16C 19/06
See application file for complete search history.

(56) References Cited

U.S. PATENT DOCUMENTS 5,872,409 A * 2/1999 Jung ........................ F16C 17/02
                                                                       310/51
6,559,567 B2 * 5/2003 Schob ................. F16C 32/0444
                                                                       310/156.01
(Continued)

FOREIGN PATENT DOCUMENTS

JP    S59069522 A    4/1984
JP    2010043684 A   2/2010
JP    2013153634 A   8/2013

OTHER PUBLICATIONS

"Miniaturization of Bearingless Motor—Power Saving", Journal of the Japan Society of Mechanical Engineers, 2013.4 vol. 116 No. 1133.

*Primary Examiner* — Tran N Nguyen
*Assistant Examiner* — Leda T Pham
(74) *Attorney, Agent, or Firm* — Harness, Dickey & Pierce, P.L.C.

(57) ABSTRACT

In an electric motor, a magnetic bearing generates an electromagnetic force between multiple permanent magnets and
(Continued)

a coil and rotatably supports an other side of a rotation shaft in an axis line direction. The rotation shaft is configured to be capable of being inclined with a rotation center line using a bearing side of the rotation shaft as a fulcrum. An electronic control device controls a current that flows to the coil such that an axis line of the rotation shaft approaches the rotation center line due to a supporting force which is the electromagnetic force between the multiple permanent magnets and the coil. Accordingly, the rotation shaft is rotatably supported to be freely rotatable by a magnetic bearing and the bearing.

9 Claims, 44 Drawing Sheets

(30) Foreign Application Priority Data

| Aug. 5, 2015 | (JP) | ................................ JP2015-155172 |
| Oct. 14, 2015 | (JP) | ................................ JP2015-203209 |

(51) Int. Cl.

| *H02K 11/20* | (2016.01) |
| *F16C 39/06* | (2006.01) |
| *F16C 32/04* | (2006.01) |
| *H02P 6/16* | (2016.01) |
| *H02K 11/21* | (2016.01) |
| *H02K 21/22* | (2006.01) |
| *H02K 5/16* | (2006.01) |
| *F16C 19/06* | (2006.01) |
| *H02K 29/06* | (2006.01) |

(52) U.S. Cl.
CPC ........ *F16C 32/048* (2013.01); *F16C 32/0457* (2013.01); *F16C 32/0497* (2013.01); *F16C 39/06* (2013.01); *F16C 39/063* (2013.01); *H02K 11/20* (2016.01); *H02K 11/21* (2016.01); *H02K 21/22* (2013.01); *H02P 1/00* (2013.01); *H02P 6/16* (2013.01); *F16C 19/06* (2013.01); *H02K 5/16* (2013.01); *H02K 5/161* (2013.01); *H02K 29/06* (2013.01); *H02K 2205/03* (2013.01)

(56) References Cited

U.S. PATENT DOCUMENTS

| 6,635,976 | B2 * | 10/2003 | Kanebako | ........... F16C 32/0493 |
| | | | | 310/90.5 |
| 7,064,468 | B2 * | 6/2006 | Fujinaka | ................ H02K 1/146 |
| | | | | 310/156.45 |
| 2003/0025410 | A1 * | 2/2003 | Sun | ...................... H02K 5/1735 |
| | | | | 310/90.5 |
| 2014/0234139 | A1 * | 8/2014 | Sakawaki | ........... F16C 32/0442 |
| | | | | 417/410.1 |

* cited by examiner

ELECTRIC MOTOR, CONTROL DEVICE, AND MOTOR CONTROL SYSTEM

CROSS-REFERENCE TO RELATED APPLICATIONS

This application is a U.S. National Phase Application under 35 U.S.C. 371 of International Application No. PCT/JP2015/005451 filed on Oct. 29, 2015 and published in Japanese as WO 2016/072075 A1 on May 12, 2016. This application is based on and claims the benefit of priority from Japanese Patent Application No. 2014-223870 filed on Nov. 3, 2014, Japanese Patent Application No. 2015-089634 filed on Apr. 24, 2015, Japanese Patent Application No. 2015-155172 filed on Aug. 5, 2015, and Japanese Patent Application No. 2015-203209 filed on Oct. 14, 2015. The entire disclosures of all of the above applications are incorporated herein by reference.

TECHNICAL FIELD

The present disclosure relates to an electric motor, a control device, and a motor control system.

BACKGROUND

In the related art, as the electric motor, there is an electric motor which rotatably supports a rotation shaft (i.e., to be freely rotatable) by two magnetic bearings (for example, refer to Patent Literature 1).

In the electric motor, a rotation-driving exciting coil of a rotor and a magnetic-bearing exciting coil are wound around a common stator, in each magnetic bearing. Accordingly, the size and the number of components can be reduced.

Here, a permanent magnet is provided together with the rotation shaft in the rotor. In addition, as a rotating magnetic field generated from the rotation-driving exciting coil is imparted to the permanent magnet, a rotating force is generated in the rotor and the rotation shaft. As the magnetic field generated from the magnetic-bearing exciting coil is imparted to the permanent magnet, a supporting force for rotatably supporting the rotation shaft is generated.

PRIOR ART LITERATURES

Patent Literature

Patent Literature 1: JP-A-59-69522

SUMMARY

In the electric motor of the Patent Literature 1, in order to support the rotation shaft by using the two magnetic bearings, power consumption required for supporting the rotation shaft increases.

Considering the above-described point, an object of the present disclosure is to provide an electric motor which measures reduction of the power consumption, a control device, and a motor control system.

According to a first aspect of the present disclosure, a supporting member rotatably supports one side of a rotation shaft in an axis line direction via a mechanical bearing, a rotor is attached to the rotation shaft and which includes a permanent magnet, a first coil is attached to the supporting member and generates a magnetic field that generates a rotating force that rotates the rotor together with the rotation shaft, and a second coil is attached to the supporting member and generates an electromagnetic force between the permanent magnet and the second coil, the second coil forming a magnetic bearing that rotatably supports the other side of the rotation shaft in the axis line direction from the mechanical bearing, the rotation shaft, in which the mechanical bearing side is used as a fulcrum, is configured to be capable of being inclined with respect to a rotation center line of the rotation shaft, and a control device controls a current that flows to the second coil such that an axis line of the rotation shaft is prevented from being inclined from the rotation center line due to the electromagnetic force between the permanent magnet and the second coil.

According to the first aspect, since one side in the axis line direction of the rotation shaft is supported by the mechanical bearing and the other side of the rotation shaft in the axis line direction is supported by the magnetic bearing, power consumption required for supporting the rotation shaft can be reduced.

Here, the mechanical bearing may be any one bearing of a rolling bearing, a plain bearing, and a fluid bearing. In addition, the rolling bearing is a bearing that includes a track disposed on the outer peripheral side of the rotation shaft, and a rolling body disposed between the rotation shaft and the track, and supports the rotation shaft by a rolling motion of the rolling body. The plain bearing is a bearing which receives a shaft on a sliding surface. The fluid bearing is a bearing supported by liquid or gas.

According to a second aspect of the present disclosure, a first coil is disposed further on a rotor side than a second coil.

Accordingly, compared to a case where the second coil is disposed further on the rotor side than the first coil, the distance between the first coil and the rotor can be shortened. Therefore, since the rotational torque for rotating the rotor can be efficiently increased, the power consumption consumed by the first coil can be reduced.

According to a third aspect of the present disclosure, a first stator core is attached to the supporting member, around which the first coil is wound, and allows a magnetic field generated from the first coil to pass therethrough, and a second stator core is attached to the supporting member, which is provided to be separated from the first stator core, around which the second coil is wound, and allows a magnetic field generated from the second coil to pass therethrough, and the first coil and the second coil are disposed on one side in the axis line direction with respect to the permanent magnet.

According to the third aspect, since the first stator and the second stator are provided to be separated from each other, in a case where a load torque is large and the current that flows to the first coil becomes excessive, a situation in which a magnetic flux is saturated in the stator core and a force for supporting the rotation shaft deteriorates can be avoided. Therefore, in a case where the load torque is large, stable control of the rotation shaft is possible and an increase in vibration of the rotation shaft can be prevented.

According to a fourth aspect of the present disclosure, a rotation shaft is rotatably disposed centered on a rotation center, a rotor is attached to the rotation shaft and which includes a permanent magnet, a first coil is supported by a supporting member, is disposed in a radial direction centered on the rotation center with respect to the permanent magnet, and generates a rotating force for rotating the rotor together with the rotation shaft by imparting a magnetic field to the permanent magnet, a second coil is supported by the supporting member, is disposed in the radial direction centered on the rotation center with respect to the permanent magnet, and forms a magnetic bearing that raises up the rotation shaft to rotatably support the rotation shaft centered on the rotation center line by generating an electromagnetic force between the permanent magnet and the second coil, and a positional deviation detection sensor detects an amount by which an axis line of the rotation shaft is shifted from the rotation center line based on the magnetic field generated from the permanent magnet, a control device controls a current that flows to the second coil based on a detection value of the positional deviation detection sensor such that the axis line of the rotation shaft is prevented from separating from the rotation center line by the electromagnetic force between the permanent magnet and the second coil, the positional deviation detection sensor is disposed between the rotation center line and the permanent magnet, and a distance between the positional deviation detection sensor and the rotation shaft is greater than a distance between the positional deviation detection sensor and the permanent magnet According to the fourth aspect, the magnetic bearing which rotatably supports the rotation shaft around the rotation center line is formed by generating an electromagnetic force between the second coil and the permanent magnet and by raising up the rotation shaft. Therefore, without using the mechanical bearing, the rotation shaft can be rotatably supported by the magnetic bearing including the second coil and the permanent magnet. Therefore, similar to the first aspect, the power consumption required for supporting the rotation shaft can be reduced.

Further, according to a fifth aspect of the present embodiment, a distance between the positional deviation detection sensor and the rotation shaft is greater than a distance between the positional deviation detection sensor and the permanent magnet. Therefore, since the positional deviation detection sensor can excellently detect the magnetic flux from the permanent magnet, a shift amount of the axis line of the rotation shaft from the rotation center line can be detected with high accuracy. Accordingly, the axis line of the rotation shaft can approach the rotation center line with high accuracy.

According to a sixth aspect of the present disclosure, a stator forms a plurality of magnetic poles that are aligned in a circumferential direction around a rotation center line of a rotation shaft, and rotatably supports the rotation shaft via a mechanical bearing, a plurality of first coils and a plurality of second coils are supported by the rotation shaft, a first commutator includes a plurality of first segments that are supported by the rotation shaft and are aligned in the circumferential direction, and in which an end portion side of a corresponding first coil among the plurality of first coils is connected to the plurality of first segments, a plurality of first brushes, according to a rotation of the first commutator, slides along the plurality of first segments to sequentially change between a contacting first segment among the plurality of first segments, the plurality of first brushes outputting a current to the plurality of first coils through the contacting first segment, a second commutator includes a plurality of second segments that are supported by the rotation shaft and are aligned in the circumferential direction, and in which an end portion side of a corresponding second coil among the plurality of second coils is connected to the plurality of second segments, and a plurality of second brushes, according to a rotation of the second commutator, slides along the plurality of second segments to sequentially change between a contacting second segment among the plurality of second segments, the plurality of second brushes outputting a current to the plurality of second coils through the contacting second segment, a rotating force for rotating the rotation shaft centered on the rotation center line is generated as an electromagnetic force based on the current output from the plurality of first brushes to the plurality of first coils through the contacting segment, and a magnetic flux from the plurality of magnetic poles to the plurality of first coils, and the plurality of second coils forms a magnetic bearing that rotatably supports a portion of the rotation shaft away from the mechanical bearing by generating an electromagnetic force between the plurality of magnetic poles based on the current output from the plurality of second brushes through the contacting second segment According to the sixth aspect, since one side in the axis line direction of the rotation shaft is supported by the mechanical bearing and the other side of the rotation shaft in the axis line direction is supported by the magnetic bearing, the power consumption required for supporting the rotation shaft can be reduced.

However, the mechanical bearing means any one bearing of the rolling bearing, the plain bearing, and the fluid bearing. In addition, the rolling bearing is a bearing that includes a track disposed on the outer peripheral side of the rotation shaft, and a rolling body disposed between the rotation shaft and the track, and supports the rotation shaft by a rolling motion of the rolling body. The plain bearing is a bearing which receives a shaft on a sliding surface. The fluid bearing is a bearing supported by liquid or gas. Furthermore, in the present disclosure, the extension direction of the rotation center line is a direction in which the rotation center line extends.

According to a seventh aspect of the present disclosure, the stator includes a rotation shaft supporting member which oscillatably supports the rotation shaft via the mechanical bearing using a portion of the axis line of the rotation shaft away from the mechanical bearing as a fulcrum, and the first and second commutators are disposed on the fulcrum side with respect to the mechanical bearing.

According to the seventh aspect of the present disclosure, when the rotation shaft oscillates centered on the fulcrum, displacement of the contact portion at which the first brush of the first commutator is in a contact state can be prevented. Therefore, generation of a contact failure between the first commutator and the first brush can be prevented.

According to this, when the rotation shaft oscillates centered on the fulcrum, displacement of the contact portion at which the second brush of the second commutator is in a contact state can be prevented. Therefore, generation of a contact failure between the second commutator and the second brush can be prevented.

DESCRIPTION OF EMBODIMENTS

Figure 1:
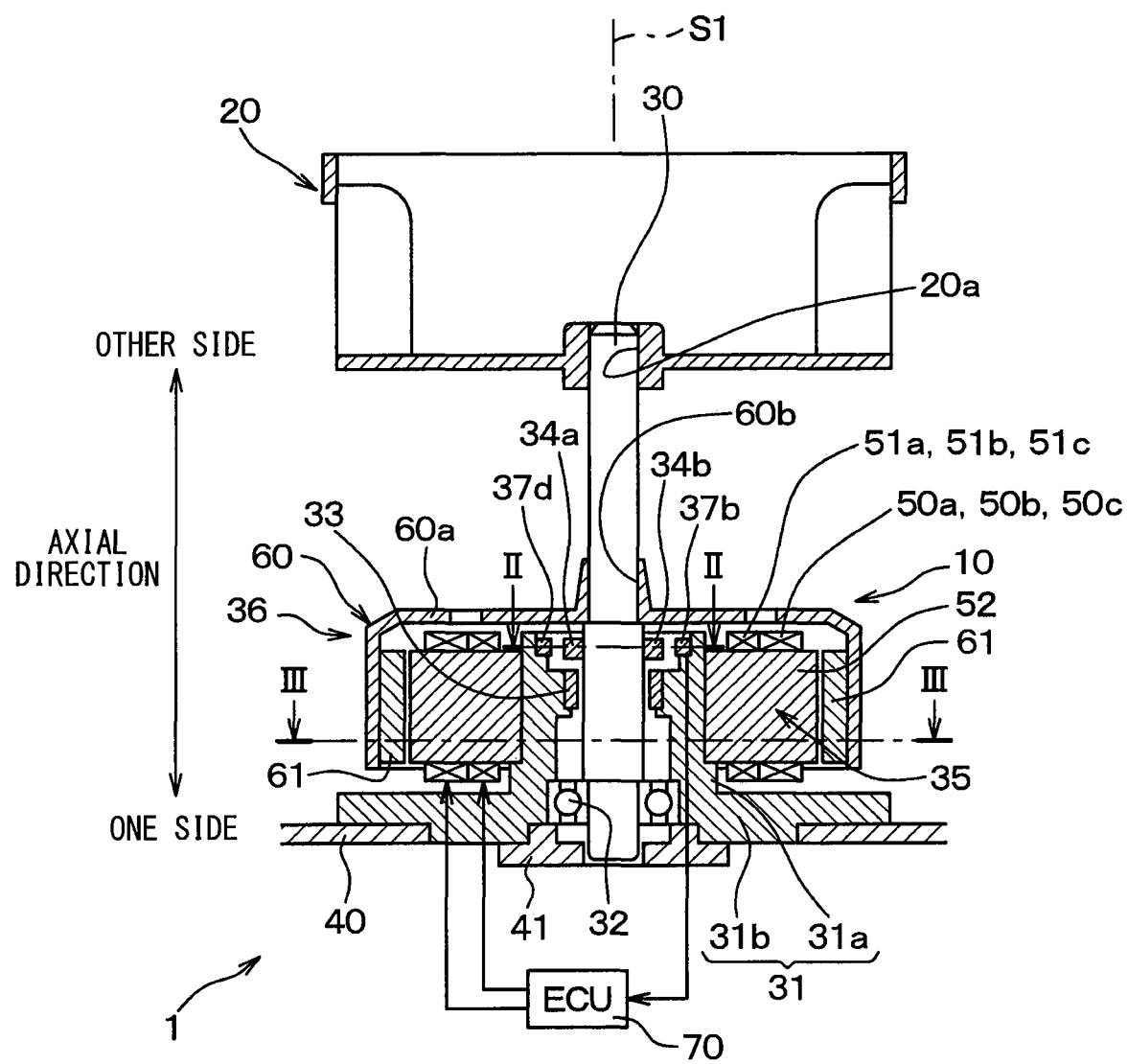
FIG. 1 is a view illustrating the entire configuration of a motor control system in a first embodiment of the present disclosure.

Hereinafter, embodiments of the present disclosure will be described based on the drawings. In each of the following embodiments, parts which are the same or equivalent to each other are briefly described and are given the same reference numerals.

First Embodiment

In FIG. 1, the entire configuration of a first embodiment of a motor control system 1 of the present disclosure is illustrated.

As illustrated in FIG. 1, the motor control system 1 of the present embodiment includes an electric motor 10 and a fan 20.

Figure 2:
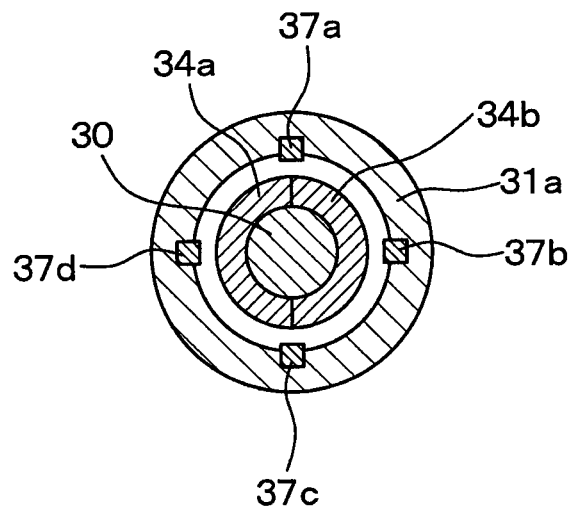
FIG. 2 is a cross-sectional view taken along a line II-II in FIG. 1.
Figure 3:
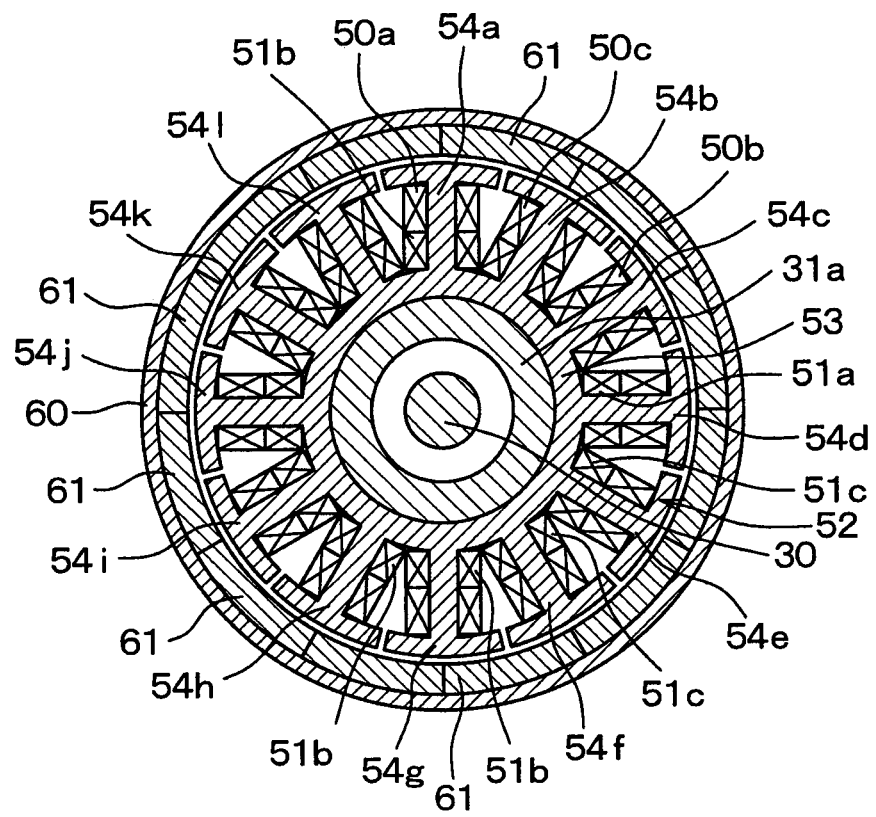
FIG. 3 is a cross-sectional view taken along a line III-III in FIG. 1.

As illustrated in FIGS. 1, 2, and 3, the electric motor 10 includes a rotation shaft 30, a centerpiece 31, a bearing 32, a pressing portion 33, permanent magnets 34a and 34b, a stator 35, a rotor 36, and hall sensors 37a, 37b, 37c, and 37d.

The rotation shaft 30 is a rotation shaft which transfers a rotating force of the rotor 36 to the fan 20. In the fan 20, as an end portion on the other side in an axis line direction of the rotation shaft 30 is fitted to a hole portion 20a thereof, the rotation shaft 30 is linked to the fan 20. In the present embodiment, as the fan 20, for example, a centrifugal fan is used.

The centerpiece 31 is a supporting member including a tubular portion 31a and a flange portion 31b. The tubular portion 31a is formed in a shape of a tube around a rotation center line M1 (refer to FIG. 7) of the rotation shaft 30. In a hollow portion of the tubular portion 31a, the rotation shaft 30 is disposed. The flange portion 31b is formed to be projected toward the outer side in a radial direction from one side in an axis line direction of the tubular portion 31a. The centerpiece 31 is fixed to a plate 40. The radial direction is a radial direction around the rotation center line M1 of the rotation shaft 30.

The bearing 32 is a mechanical bearing which rotatably supports one side of the rotation shaft 30 in the axis line direction (i.e., so as to allow the rotation shaft 30 to freely rotate). The bearing 32 is disposed on the radially inner side with respect to the tubular portion 31a of the centerpiece 31. The bearing 32 is supported by the tubular portion 31a. The bearing 32 is supported from one side in the axis line direction by a pressing plate 41. In the present embodiment, as the bearing 32, for example, a rolling bearing is used. The rolling bearing is a known bearing which includes a track disposed on an outer peripheral side of the rotation shaft 30, and a rolling body disposed between the rotation shaft 30 and the track, and supports the rotation shaft 30 by a rolling motion of the rolling body.

The permanent magnets 34a and 34b are disposed on the other side in the axis line direction with respect to the bearing 32 in the rotation shaft 30. The permanent magnets 34a and 34b are located on the radially inner side with respect to the other side in the axial direction in a stator core 52. The permanent magnets 34a and 34b are fixed to the rotation shaft 30. As illustrated in FIG. 2, the permanent magnets 34a and 34b are respectively formed in an arc shape. The permanent magnets 34a and 34b are combined to cover an outer circumference of the rotation shaft 30. The radially outer side of one permanent magnet of the permanent magnets 34a and 34b forms an S pole and the radially outer side of the other permanent magnet forms an N pole. The permanent magnets 34a and 34b impart a magnetic flux to the hall sensors 37a, 37b, 37c, and 37d.

The pressing portion 33 is disposed between the bearing 32 and the permanent magnets 34a and 34b. The pressing portion 33 is formed in a shape of a ring around the rotation center line M1 of the rotation shaft 30.

A void is provided between the pressing portion 33 and the rotation shaft 30. As will be described later, the pressing portion 33 is a bearing portion which supports the rotation shaft 30 in a state where the rotation shaft 30 is largely inclined (or tilted) from the rotation center line M1 of the rotation shaft 30. The pressing portion 33 is supported by the tubular portion 31a of the centerpiece 31. The pressing portion 33 of the present embodiment is formed of a resin material having lubricity.

As illustrated in FIGS. 1 and 3, the stator 35 includes coils 50a, 50b, and 50c, coils 51a, 51b, and 51c, and the stator core 52.

The stator core 52 allows the magnetic flux (that is, magnetic field) generated from the coils 50a, 50b, and 50c to pass therethrough. Furthermore, the stator core 52 allows the magnetic flux (that is, magnetic field) generated from the coils 51a, 51b, and 51c to pass therethrough. The stator core 52 forms a magnetic circuit together with multiple permanent magnets 61.

Specifically, as illustrated in FIG. 3, the stator core 52 includes a ring portion 53 and teeth 54a, 54b, 54c, 54d, 54e, 54f, 54g, 54h, 54i, 54j, 54k, and 54l. The ring portion 53 is disposed on the outer side in the radial direction with respect to the tubular portion 31a of the centerpiece 31. The ring portion 53 is fixed to the tubular portion 31a.

The teeth 54a, 54b, . . . , and 54l are formed to protrude toward the radially outer side from the ring portion 53. The teeth 54*a*, 54*b*, . . . , and 54*l* are respectively aligned at the same interval in the circumferential direction around the rotation center line M1 of the rotation shaft 30. Each tip end side of the teeth 54*a*, 54*b*, . . . , and 54*l* is formed to extend in the circumferential direction.

Figure 4:
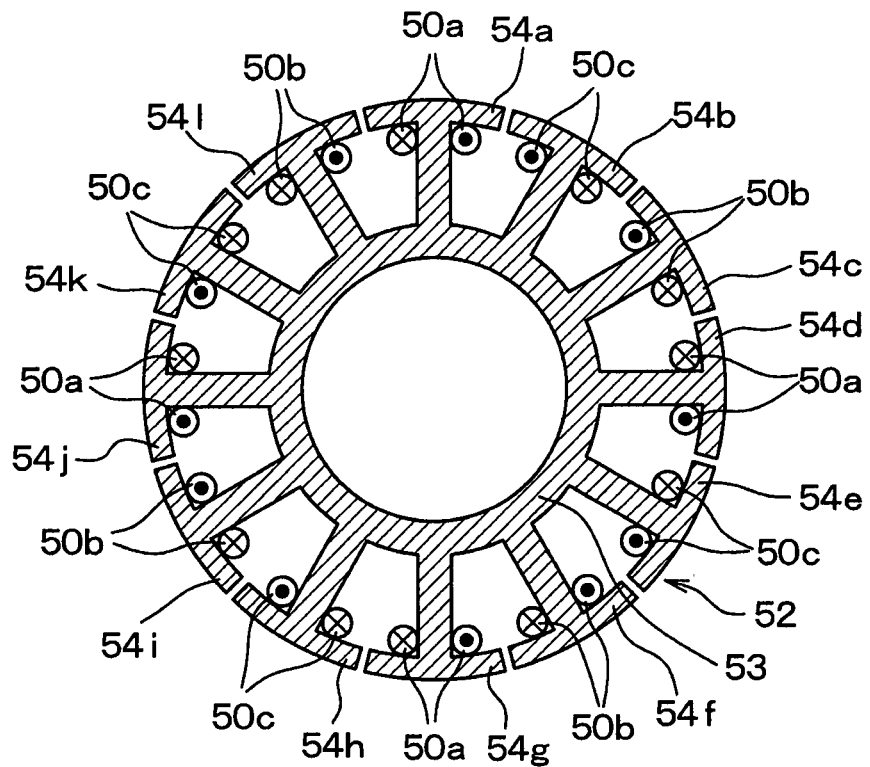
FIG. 4 is a cross-sectional view illustrating disposition of a tilt-control coil in FIG. 1.

The coils 50*a*, 50*b*, and 50*c* of the present embodiment are the tilt-control coils which generate a supporting force of the rotation shaft 30. Disposition of the coils 50*a*, 50*b*, and 50*c* of the present embodiment is illustrated in FIG. 4. In FIG. 4, for convenience of the description, the coils 51*a*, 51*b*, and 51*c* are not illustrated. In FIG. 4, in the coils 50*a*, 50*b*, and 50*c*, black dots illustrate a state where a current flows toward a far side in the paper surface vertical direction, and X marks illustrate a state where a current flows toward a near side in the paper surface vertical direction.

First, the coil 50*a* is a U1-phase coil and is wound around the teeth 54*a*, 54*d*, 54*g*, and 54*j* as illustrated in FIG. 4. The teeth 54*a*, 54*d*, 54*g*, and 54*j* are aligned at the same interval in the circumferential direction around the rotation center line M1 of the rotation shaft 30.

The coil 50*b* is a V1-phase coil and is wound around the teeth 54*c*, 54*f*, 54*i*, and 54*l*. The teeth 54*c*, 54*f*, 54*i*, and 54*l* are aligned at the same interval in the circumferential direction around the rotation center line M1 of the rotation shaft 30.

The coil 50*c* is a W1-phase coil and is wound around the teeth 54*b*, 54*e*, 54*h* and 54*k*. The teeth 54*b*, 54*e*, 54*h* and 54*k* are aligned at the same interval in the circumferential direction around the rotation center line M1 of the rotation shaft 30.

In addition, the coil 50*a* forms the U1-phase coil, the coil 50*b* forms the V1-phase coil, and the coil 50*c* forms the W1-phase coil.

Figure 5:
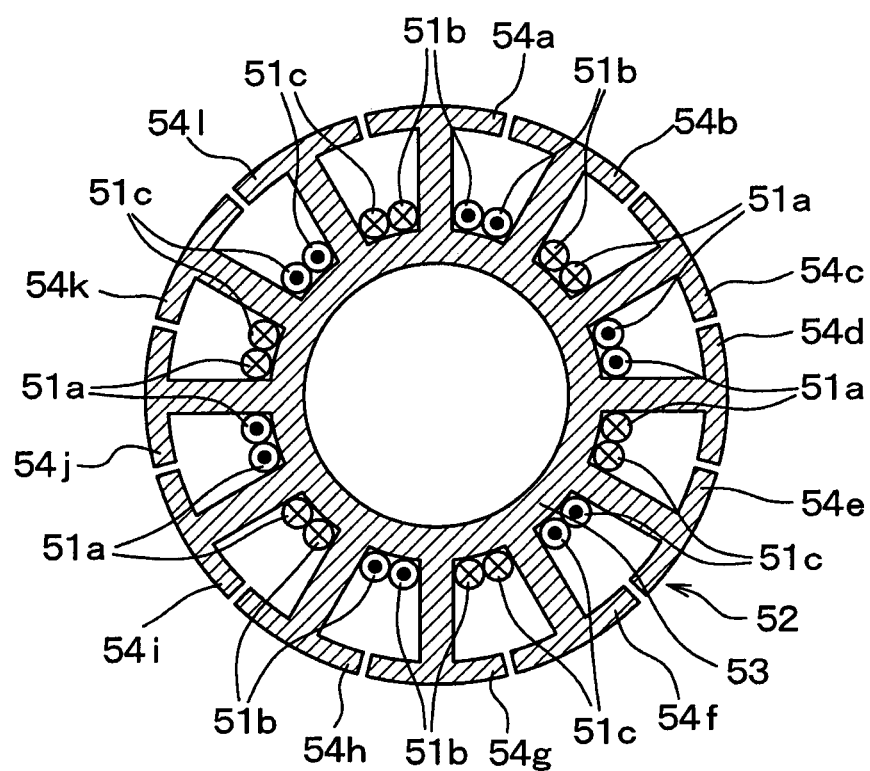
FIG. 5 is a cross-sectional view illustrating disposition of a rotation-control coil in FIG. 1.

The coils 51*a*, 51*b*, and 51*c* of the present embodiment are rotation-driving coils that generate a rotating magnetic field for rotating the rotor 36. Disposition of the coils 51*a*, 51*b*, and 51*c* of the present embodiment is illustrated in FIG. 5. In FIG. 5, for convenience of description, the coils 50*a*, 50*b*, and 50*c* are not illustrated. In FIG. 5, in the coils 51*a*, 51*b*, and 51*c*, black dots illustrate a state where a current flows toward a far side in the paper surface vertical direction, and X marks illustrate a state where a current flows toward a near side in the paper surface vertical direction.

The coil 51*a* is a U2-phase coil and is wound around the teeth 54*c*, 54*d*, 54*i*, and 54*j* as illustrated in FIG. 5. The teeth 54*c* and 54*d* and the teeth 54*i* and 54*j* are disposed being offset by 180 degrees of an angle centered on the rotation center line M1 of the rotation shaft 30.

Here, the coil 51*a* wound around the tooth 54*c* and the coil 51*a* wound around the tooth 54*d* are wound in different directions. The coil 51*a* wound around the tooth 54*i* and the coil 51*a* wound around the tooth 54*j* are wound in different directions.

The coil 51*b* is a V2-phase coil and is wound around the teeth 54*a*, 54*b*, 54*g*, and 54*h*. The teeth 54*a* and 54*b* and the teeth 54*g* and 54*h* are disposed being offset by 180 degrees of an angle centered on the rotation center line M1 of the rotation shaft 30.

Here, the coil 51*b* wound around the tooth 54*a* and the coil 51*b* wound around the tooth 54*b* are wound in different directions. The coil 51*b* wound around the tooth 54*g* and the coil 51*b* wound around the tooth 54*h* are wound in different directions.

The coil 51*c* is a W2-phase coil and is wound around the teeth 54*e*, 54*f*, 54*k*, and 54*l*. The teeth 54*e* and 54*f* and the teeth 54*k* and 54*l* are disposed being offset by 180 degrees of an angle centered on the rotation center line M1 of the rotation shaft 30.

Here, the coil 51*c* wound around the tooth 54*e* and the coil 51*c* wound around the tooth 54*f* are wound in different directions. The coil 51*c* wound around the tooth 54*k* and the coil 51*c* wound around the tooth 54*l* are wound in different directions.

In the present embodiment, the coils 50*a*, 50*b*, and 50*c* are disposed on the rotor 36 side (that is, the radially outer side) with respect to the coils 51*a*, 51*b*, and 51*c*.

In this manner, the coils 50*a*, 50*b*, and 50*c* and the coils 51*a*, 51*b*, and 51*c* are wound around the common stator core 52. In other words, the coils 50*a*, 50*b*, and 50*c* and the coils 51*a*, 51*b*, and 51*c* are attached to the centerpiece 31 via the stator core 52. In addition, the current that flows to the coils 50*a*, 50*b*, and 50*c* and the current that flows to the coils 51*a*, 51*b*, and 51*c* are controlled by the electronic control device (described as an ECU in FIG. 1) 70.

The rotor 36 includes a rotor case 60 and the multiple permanent magnets 61. The rotor case 60 is formed in a shape of a tube around the rotation center line M1 of the rotation shaft 30. The rotor case 60 is disposed on the radially outer side around the rotation center line M1 of the rotation shaft 30 with respect to the stator core 52 and the coils 50*a*, 50*b*, 50*c*, 51*a*, 51*b*, and 51*c*.

The other side in the axis line direction in the rotor case 60 of FIG. 1 is blocked by a lid portion 60*a*. In the lid portion 60*a*, a through hole 60*b* which penetrates the rotation shaft 30 is provided. The lid portion 60*a* of the rotor case 60 is fixed by the rotation shaft 30. In other words, the rotor 36 is attached to the rotation shaft 30.

The multiple permanent magnets 61 are aligned in the circumferential direction around the rotation center line M1 of the rotation shaft 30. The multiple permanent magnets 61 are disposed on the radially inner side with respect to the rotor case 60. The multiple permanent magnets 61 are fixed to the rotor case 60. The multiple permanent magnets 61 are disposed such that each of the magnetic poles is oriented in the radial direction. Regarding the magnetic poles of each of the multiple permanent magnets 61, the multiple permanent magnets 61 are disposed such that an S pole and an N pole are alternately aligned in the circumferential direction. In the present embodiment, twelve permanent magnets 61 are disposed.

The hall sensors 37*a*, 37*b*, 37*c*, and 37*d* are disposed on the radially outer side around the rotation center line M1 of the rotation shaft 30 with respect to the permanent magnets 34*a* and 34*b*. A void is provided between the hall sensors 37*a*, 37*b*, 37*c*, and 37*d* and the permanent magnets 34*a* and 34*b*. The hall sensors 37*a*, 37*b*, 37*c*, and 37*d* are aligned at the same interval in the circumferential direction around the rotation center line M1 of the rotation shaft 30. The hall sensors 37*a*, 37*b*, 37*c*, and 37*d* are fixed to the tubular portion 31*a* of the centerpiece 31. The hall sensors 37*a*, 37*b*, 37*c*, and 37*d* detect the rotational speed of the rotation shaft 30 and a tilt (or inclination) angle, and include a hall element which detects a magnetic field generated from the permanent magnets 34*a* and 34*b*.

Figure 6:
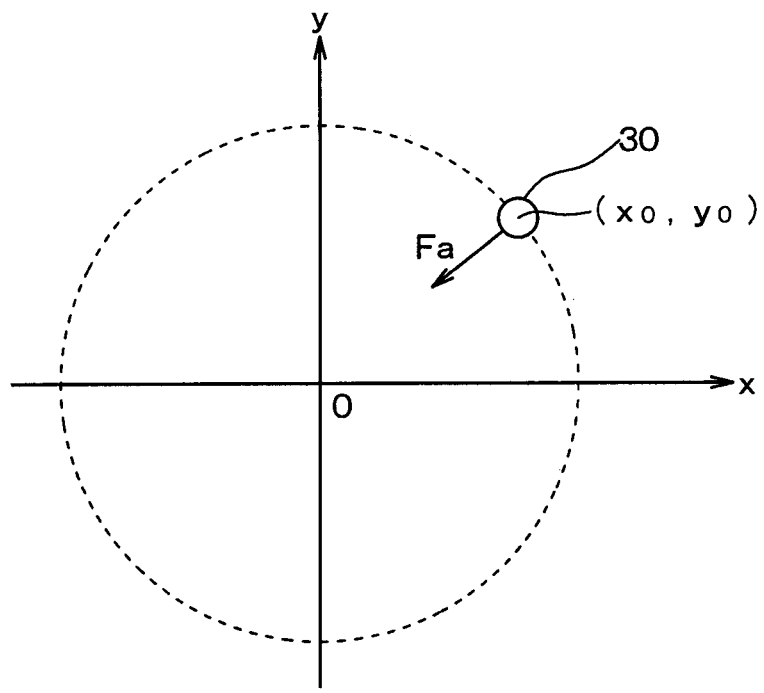
FIG. 6 is a view illustrating tilt of a rotation shaft by X-Y coordinates.
Figure 7:
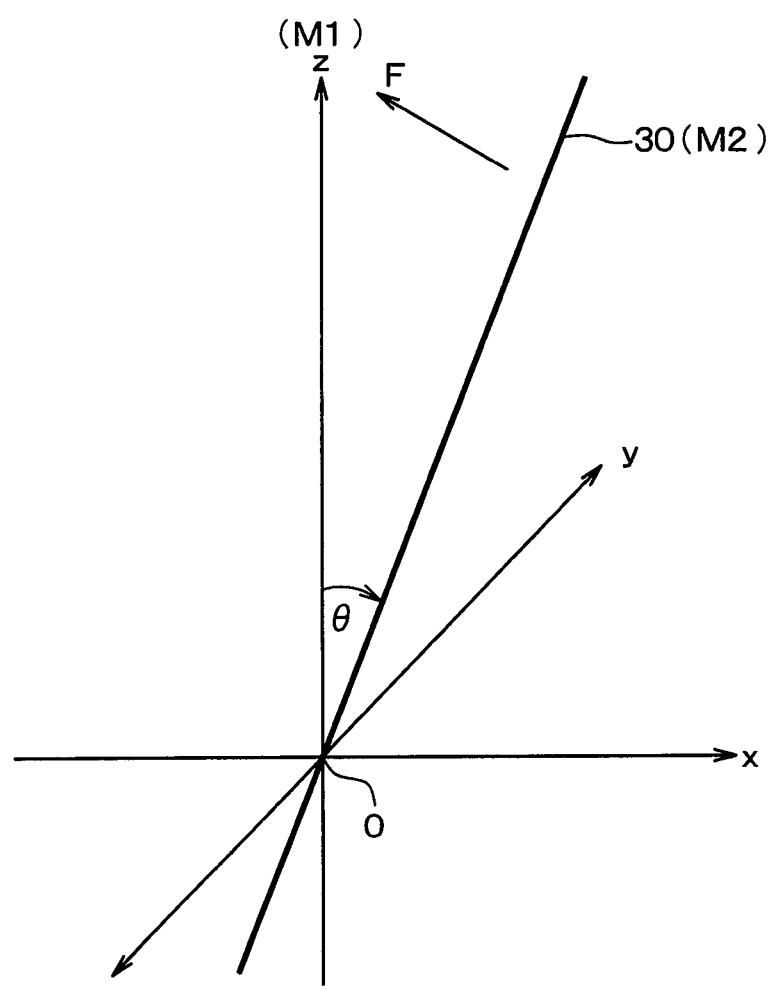
FIG. 7 is a view illustrating the tilt of the rotation shaft by X-Y-Z coordinates.
Figure 8:
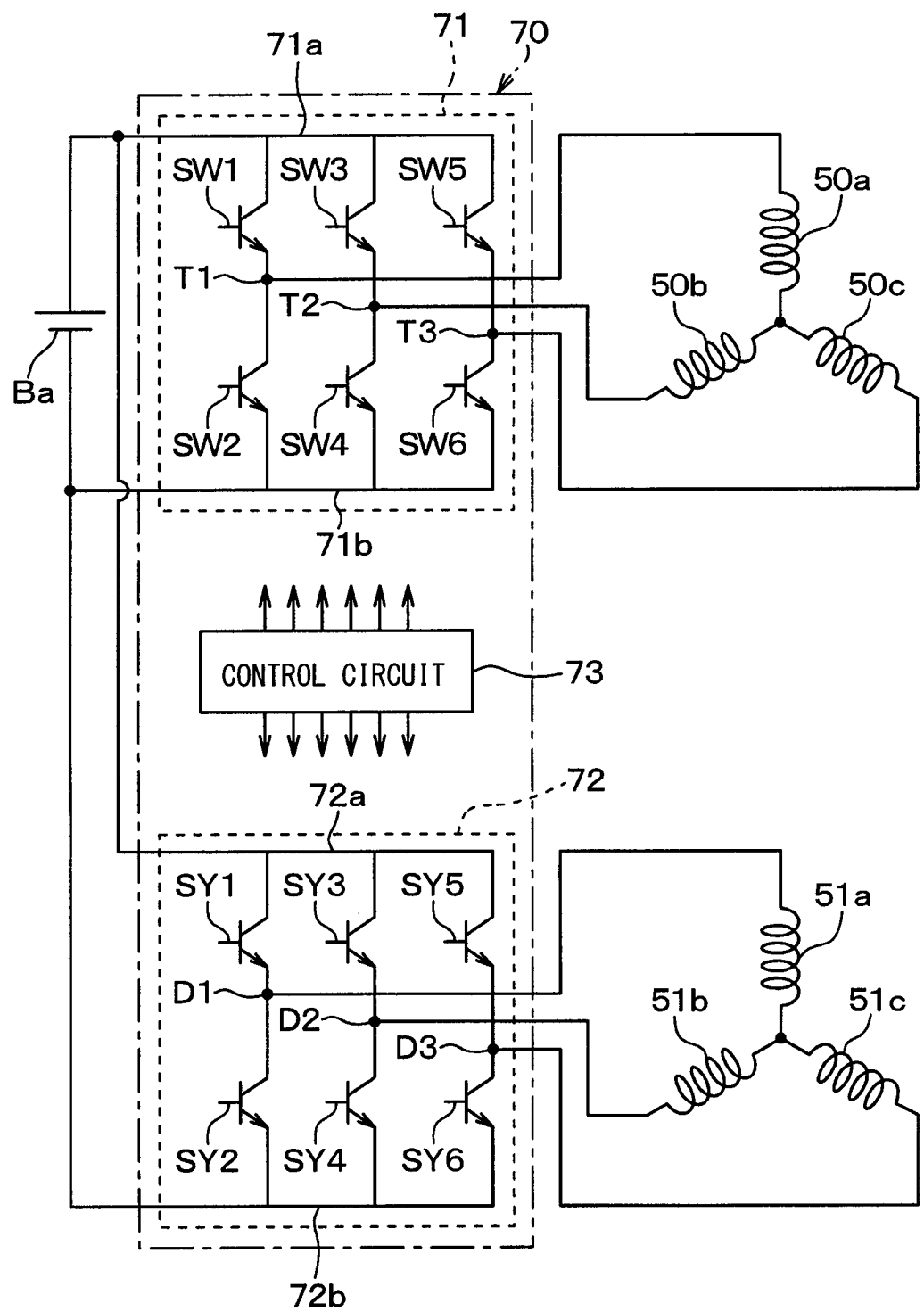
FIG. 8 is an electric circuit diagram illustrating an electric circuit configuration of an electronic control device in FIG. 1.

In the electric motor 10 formed in this manner, the rotation shaft 30 is configured to be capable of being inclined (or tilted) from the rotation center line M1 of the rotation shaft 30 using the bearing 32 side in the rotation shaft 30 as a fulcrum (refer to FIGS. 6, 7, and 8).

In FIGS. 6 and 7, an example in which the rotation shaft 30 is inclined by an angle θ with respect to a Z-axis by setting the fulcrum to be an original point 0, the rotation center line M1 of the rotation shaft 30 to be a Z-axis, and an X-axis and Y-axis which are orthogonal to the rotation center line M1, is illustrated. The coordinates (x0, y0) in FIG. 6 indicate X-Y coordinates of an end portion (that is, the fan 20) on the other side in the axis line direction in the rotation shaft 30.

Next, an electric configuration of the motor control system 1 of the present embodiment will be described.

An electronic control device 70 includes inverter circuits 71 and 72 and a control circuit 73 as illustrated in FIG. 8.

The inverter circuit 71 includes transistors SW1, SW2, SW3, SW4, SW5, and SW6.

The transistors SW1 and SW2 are serially connected to each other between a positive electrode busbar 71a and a negative electrode busbar 71b. The transistors SW3 and SW4 are serially connected to each other between the positive electrode busbar 71a and the negative electrode busbar 71b. The transistors SW5 and SW6 are serially connected to each other between the positive electrode busbar 71a and the negative electrode busbar 71b.

A common connection terminal T1 between the transistors SW1 and SW2 is connected to the coil 50a. A common connection terminal T2 between the transistors SW3 and SW4 is connected to the coil 50b. A common connection terminal T3 between the transistors SW5 and SW6 is connected to the coil 50c. The coils 50a, 50b, and 50c are connected to each other by a star-connection.

The inverter circuit 72 includes transistors SY1, SY2, SY3, SY4, SY5, and SY6.

The transistors SY1 and SY2 are serially connected to each other between a positive electrode busbar 72a and a negative electrode busbar 72b. The transistors SY3 and SY4 are serially connected to each other between the positive electrode busbar 72a and the negative electrode busbar 72b. The transistors SY5 and SY6 are serially connected to each other between the positive electrode busbar 72a and the negative electrode busbar 72b.

A common connection terminal D1 between the transistors SY1 and SY2 is connected to the coil 51a. A common connection terminal D2 between the transistors SY3 and SY4 is connected to the coil 51b. A common connection terminal D3 between the transistors SY5 and SY6 is connected to the coil 51c. The coils 51a, 51b, and 51c are connected to each other by a star-connection. The positive electrode busbars 71a and 72a are connected to a positive electrode of a DC power supply Ba. The negative electrode busbars 71b and 72b are connected to a negative electrode of the DC power supply Ba.

The control circuit 73 includes a microcomputer or a memory, and according to a computer program stored in the memory, a rotating force is generated in the rotor 36, and control processing of outputting a supporting force for supporting the rotation shaft 30 is performed. In addition, the control circuit 73 switching-controls the transistors SW1, SW2, . . . , and SW6 and the transistors SY1, SY2, . . . , and SY6 based on an output signal of the hall sensors 37a, 37b, 37c, and 37d, according to the performance of the control processing.

Figure 9:
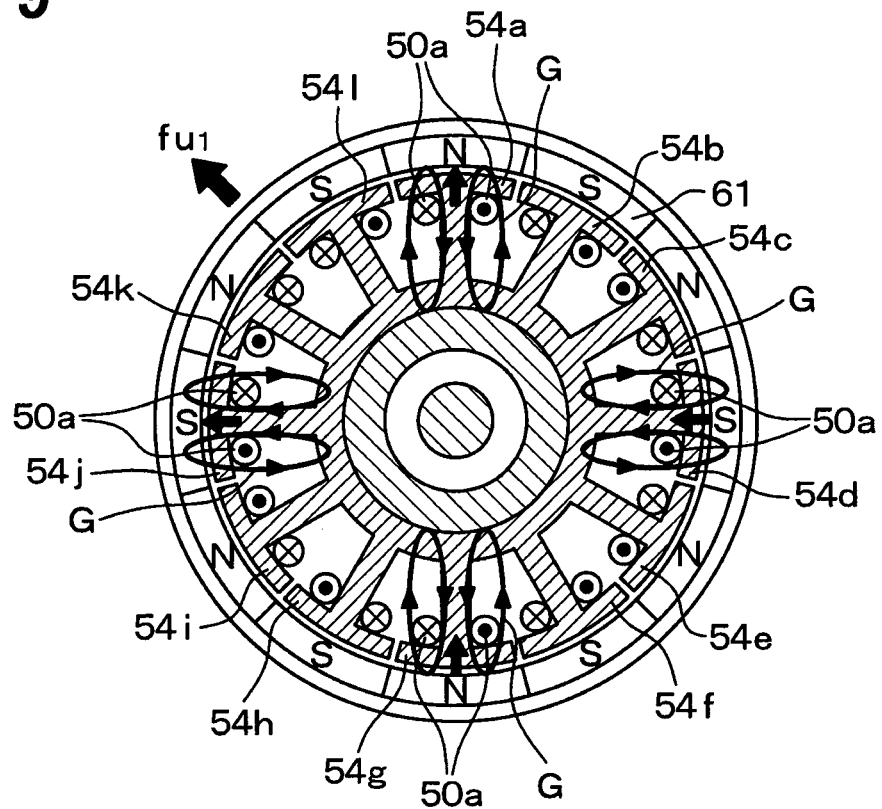
FIG. 9 is a view illustrating an electromagnetic force generated by a tilt-control u1-phase coil in the first embodiment.

When the current is output to the coil 50a from the common connection terminals T1, T2, and T3, as illustrated in FIG. 9, a repulsive force and an attracting force which are an electromagnetic force are generated based on a magnetic flux G generated by the coil 50a between the coils 50a and the multiple permanent magnets 61.

Specifically, the repulsive force which is an electromagnetic force and an attracting force are generated between the coil 50a wound around the teeth 54a, 54d, 54g, and 54j and the multiple permanent magnets 61. An electromagnetic force fu1 obtained by synthesizing the repulsive force and the attracting force which are generated between the coil 50a and the multiple permanent magnets 61, is generated. The electromagnetic force fu1 is a force for moving the rotor 36 in a first direction. When a shaft which extends to a right side of the paper surface centered on the axis line of the rotation shaft 30 is set to be the X-axis, the first direction is a direction rotated by 225° in a clockwise direction from the X-axis.

Figure 10:
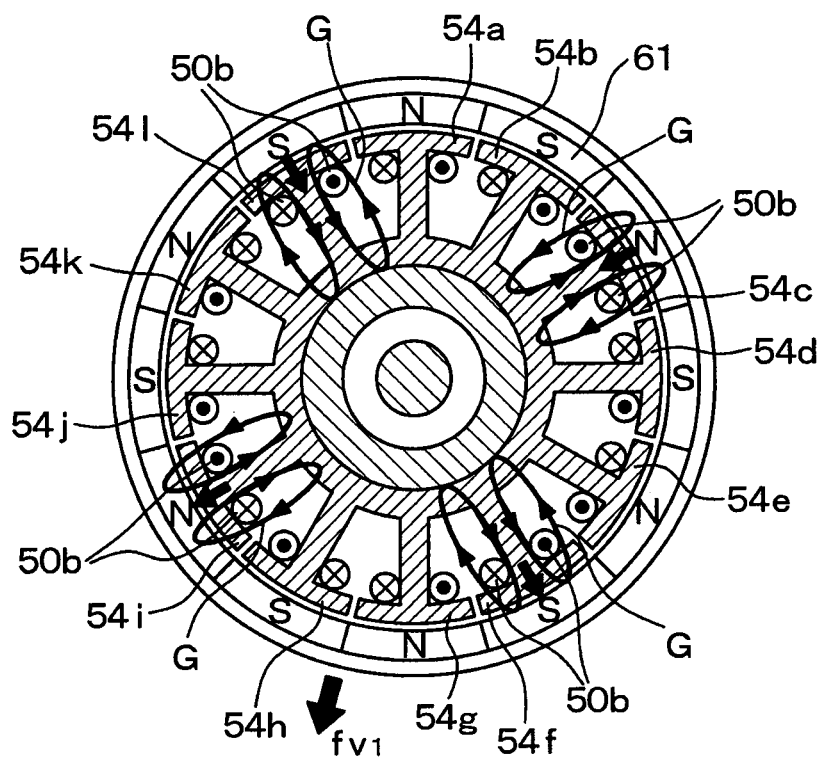
FIG. 10 is a view illustrating an electromagnetic force generated by a tilt-control v1-phase coil in the first embodiment.
Figure 11:
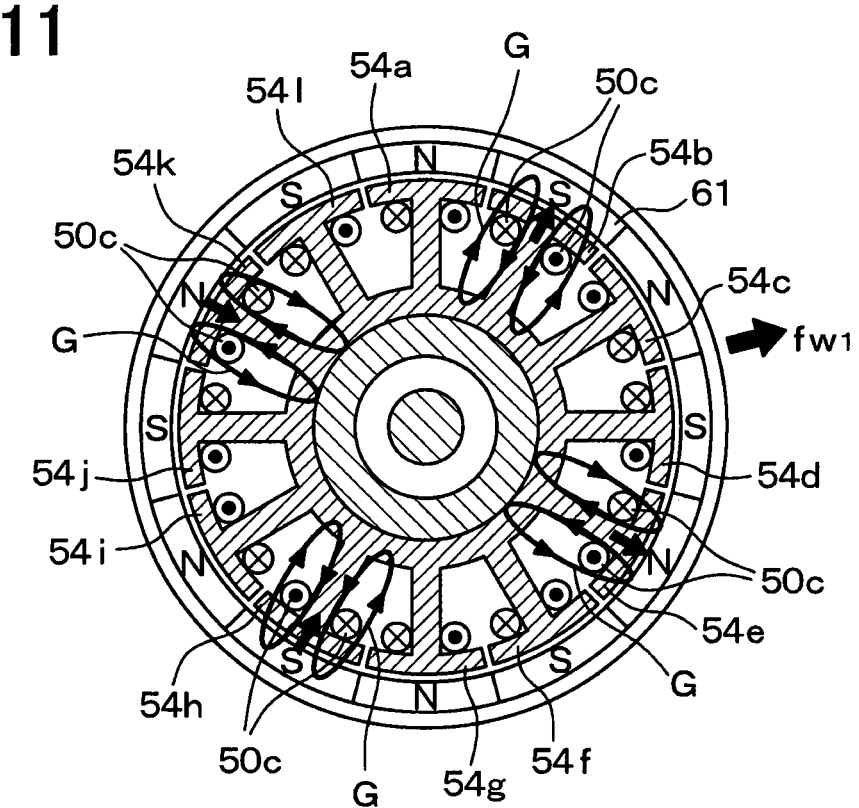
FIG. 11 is a view illustrating an electromagnetic force generated by a tilt-control w1-phase coil in the first embodiment.

In addition, in FIGS. 9, 10, and 11, an arrow oriented toward the radially outer side indicates the repulsive force, and an arrow oriented toward the radially inner side indicates the attracting force.

When the current is output to the coil 50b from the common connection terminals T1, T2, and T3, as illustrated in FIG. 10, the repulsive force and the attracting force which are an electromagnetic force are generated based on the magnetic flux G generated by the multiple permanent magnets 61 between the coil 50b and the multiple permanent magnets 61.

Specifically, the repulsive force and the attracting force which are an electromagnetic force are generated between the coil 50b wound around the teeth 54c, 54f, 54i, and 54l and the multiple permanent magnets 61. An electromagnetic force fv1 obtained by synthesizing the repulsive force and the attracting force which are generated between the coil 50b and the multiple permanent magnets 61 is generated. The electromagnetic force fv1 is a force for moving the rotor 36 in the second direction. The second direction is a direction rotated by 105° in the clockwise direction from the X-axis.

When the current is output to the coil 50c from the common connection terminals T1, T2, and T3, as illustrated in FIG. 11, the repulsive force which is the electromagnetic force and the attracting force are generated based on the magnetic flux G generated by the multiple permanent magnets 61 between the coil 50c and the multiple permanent magnets 61.

Specifically, the repulsive force and the attracting force which are an electromagnetic force are generated between the coil 50c wound around the teeth 54b, 54e, 54h, and 54k and the multiple permanent magnets 61. An electromagnetic force fw1 obtained by synthesizing the repulsive force and the attracting force which are generated between the coil 50c and the multiple permanent magnets 61 is generated. The electromagnetic force fw1 is a force for moving the rotor 36 in a third direction. The third direction is a direction rotated by 15° in a counterclockwise direction from the X-axis.

Here, the direction of the electromagnetic force fu1, the direction of the electromagnetic force fv1, and the direction of the electromagnetic force fw1 are aligned at the same interval in the circumferential direction around the rotation center line M1 of the rotation shaft 30. Specifically, the direction of the electromagnetic force fu1 is offset by 120° C. of the angle with respect to the direction of the electromagnetic force fv1. The direction of the electromagnetic force fv1 is offset by 120° C. of the angle with respect to the direction of the electromagnetic force fw1. The direction of the electromagnetic force fw1 is offset by 120° C. of the angle with respect to the direction of the electromagnetic force fu1. Here, each of the electromagnetic forces fu1, fv1, and fw1 is a unit vector.

By using the electromagnetic forces fu1, fv1, and fw1 and the coefficients K1, K2, and K3 multiplied to the electromagnetic forces fu1, fv1, and fw1, a supporting force Fa that causes an axis line M2 (refer to FIG. 7) of the rotation shaft 30 to approach the rotation center line M1 can be expressed by the following Equation 1.

$$Fa = K1 \cdot fu1 + K2 \cdot fv1 + K3 \cdot fw1 \qquad \text{(Equation 1)}$$

The control circuit 73 controls the transistors SW1, SW2, . . . , and SW6, and controls the current that flows to the coils 50a, 50b, and 50c from the common connection terminals T1, T2, and T3. Therefore, each of the magnitude and the direction of the supporting force Fa can be respectively controlled by controlling the coefficients K1, K2, and K3.

Figure 12:
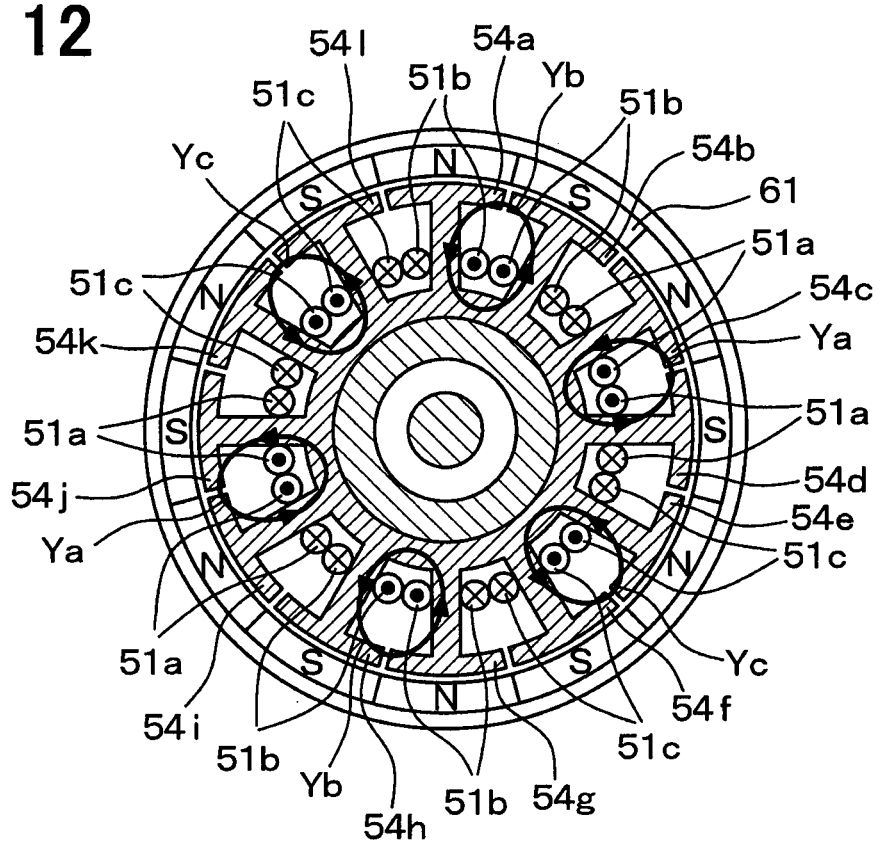
FIG. 12 is a view illustrating an electromagnetic force generated by the rotation-control coil in the first embodiment.

The control circuit 73 controls the transistors SY1, SY2, . . . , and SY6, and outputs the current to the coils 51a, 51b, and 51c from common connection terminals S1, S2, and S3. Therefore, rotating magnetic fields Ya, Yb, and Yc are consecutively generated from the coils 51a, 51b, and 51c (refer to FIG. 12). The rotating magnetic fields Ya, Yb, and Yc generate the rotating force to the multiple permanent magnets 61.

The rotating magnetic field Ya is generated from the coil 51a disposed between the teeth 54c and 54d and the coil 51a disposed between the teeth 54i and 54j. The rotating magnetic field Yb is generated from the coil 51b disposed between the teeth 54g and 54h and the coil 51b disposed between the teeth 54a and 54b. The rotating magnetic field Yc is generated from the coil 51c disposed between the teeth 54e and 54f and the coil 51c disposed between the teeth 54k and 54l.

Next, control processing of the control circuit 73 of the present embodiment will be described with reference to FIGS. 13 to 17.

Figure 13:
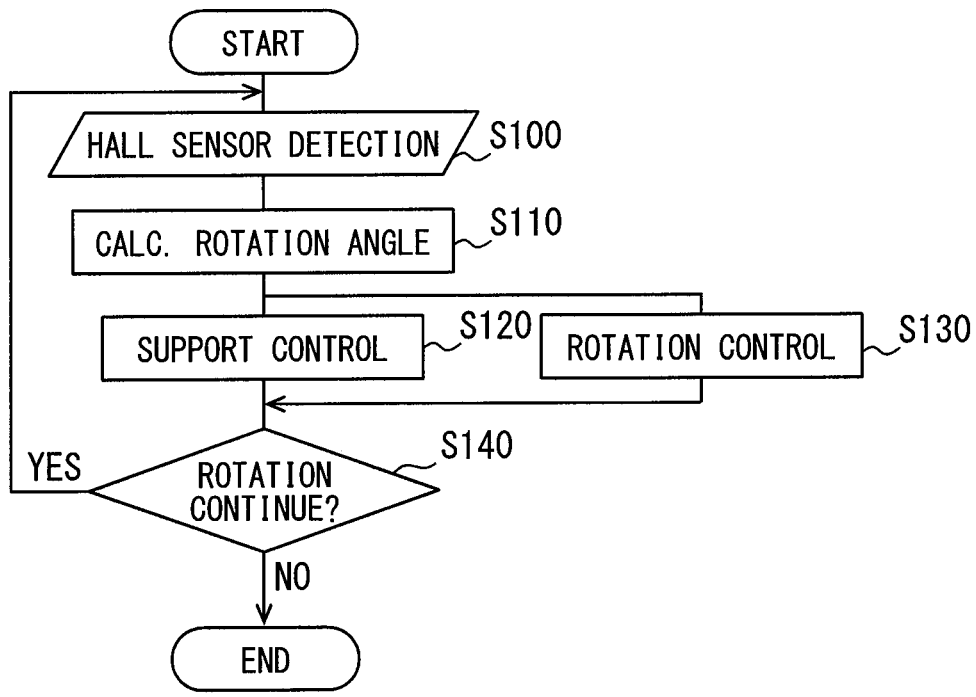
FIG. 13 is a flowchart illustrating control processing of an electronic control device in FIG. 1.
Figure 14:
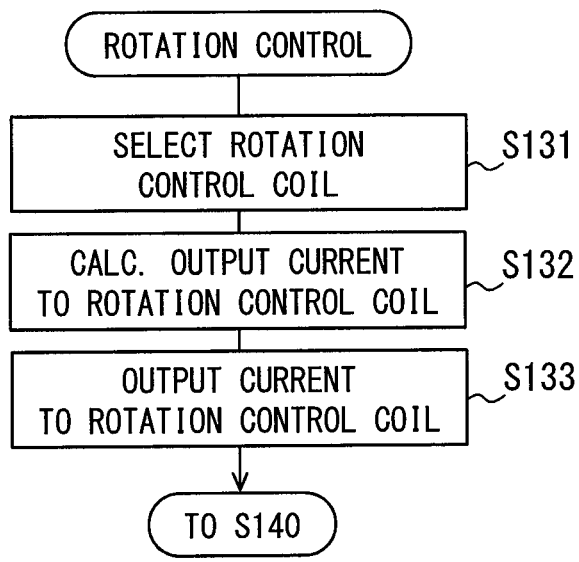
FIG. 14 is a flowchart specifically illustrating steps in FIG. 13.
Figure 15:
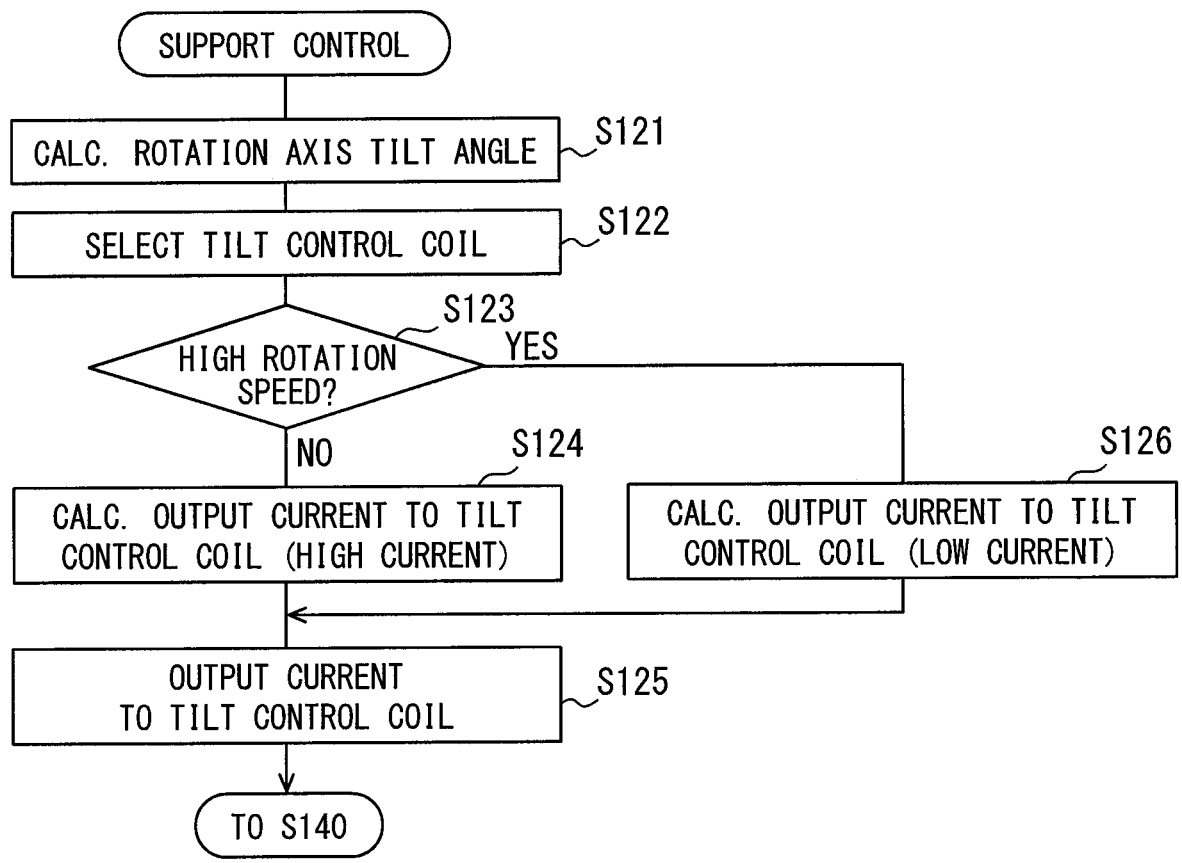
FIG. 15 is a flowchart specifically illustrating the steps in FIG. 13.

The control circuit 73 performs the control processing following the flowchart of FIGS. 13 to 15. FIG. 13 is a flowchart illustrating the control processing.

First, in Step 100 of FIG. 13, a magnetic field generated by the permanent magnets 34a and 34b is detected by the hall sensors 37a, 37b, 37c, and 37d.

Here, in the X-Y coordinates, the direction in which the hall sensors 37a and 37c are aligned is set to be an X-direction, and the direction in which the hall sensors 37b and 37d are aligned is set to be a Y-direction. A difference dS(=Ha−Hc: refer to FIG. 16) between an output signal Ha of the hall sensor 37a and an output signal Hc of the hall sensor 37c, is acquired. The difference dS indicates rotation angle information of the rotation shaft 30. In addition, a rotation angle (that is, rotation position) of the rotation shaft 30 at the current time is calculated based on the difference dS (Step 110).

Next, a supporting control (Step 120) of preventing the rotation shaft 30 from being inclined from a rotation center line 51, and a rotation control (Step 130) of rotating the rotation shaft 30, are performed in parallel. In addition, the supporting control (Step 120) and the rotation control (Step 130) will be described in detail. Next, it is determined whether or not the rotation of the rotation shaft 30 continues (Step 140). After this, when YES which means that the rotation of the rotation shaft 30 continues is determined in Step 140, the process returns to Step 110. Next, until a stop command for stopping the control processing is input from the outside, YES determination in Steps 100, 110, 120, and 130, and Step 140 is repeated. After this, when the stop command is input from the outside, NO is determined in Step 140, and the control processing is finished.

Next, the rotation control (Step 130) will be described with reference to FIG. 14. FIG. 14 is a flowchart specifically illustrating Step 130 in FIG. 13.

First, in Step 131, a coil to be excited is selected among the coils 51a, 51b, and 51c based on the rotation angle of the rotation shaft 30 at the current time calculated in the above-described Step 110. The current that flows to the selected coil is calculated based on the rotation angle of the rotation shaft 30 at the current time calculated in the Step 110 (Step 132). After this, the transistors SY1, SY2, SY3, SY4, SY5, and SY6 for outputting the calculated current to the selected coil are switching-controlled (Step 133). Accordingly, by switching the transistors SY1, SY2, SY3, SY4, SY5, and SY6 of the inverter circuit 71, the current is output to the selected coil from the common connection terminals D1, D2, and D3. The processing of Steps 131 to 133 can use known rotation control processing.

Selection processing of the coil (Step 131), calculation processing of a current value (Step 132), and current output processing (Step 133), and hall sensor detection processing (Step 100) and rotation angle calculation processing (Step 110) of FIG. 13, are repeated. Then, by switching the transistors SY1, SY2, SY3, SY4, SY5, and SY6, three-phase AC current is output to the coils 51a, 51b, and 51c from the common connection terminals D1, D2, and D3.

Therefore, the rotating magnetic field from the coils 51a, 51b, and 51c is generated. Therefore, in the multiple permanent magnets 61, the rotating force which rotates in synchronization with the rotating magnetic field is generated. According to this, the rotation shaft 30 rotates together with the rotor 36.

Next, the supporting control (Step 120) will be described with reference to FIG. 15. FIG. 15 is a flowchart specifically illustrating Step 120 in FIG. 13.

First, in Step 121, a tilt (or inclination) 8 (refer to FIG. 7) of the rotation shaft 30 with respect to the rotation center line M1 of the rotation shaft 30 is calculated based on the output signal of the hall sensors 37a, 37b, 37c, and 37d.

Figure 16:
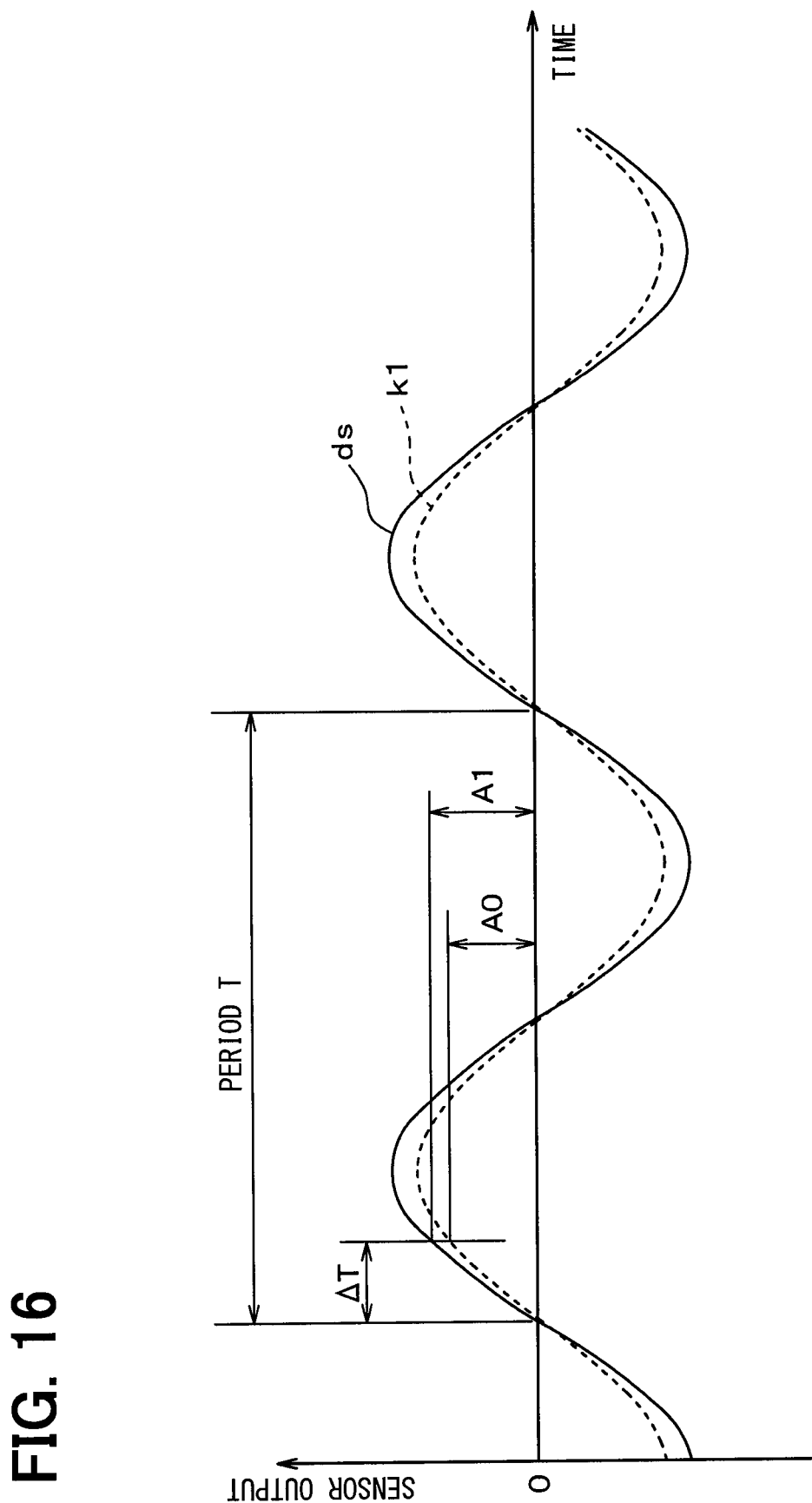
FIG. 16 is a view illustrating an output value or the like of a hall sensor in FIG. 1.

Specifically, the difference dS(=Ha−Hc) between the output signal Ha of the hall sensor 37a at the current time and the output signal Hc of the hall sensor 37c at the current time, is acquired. In addition, the X coordinate (X coordinate in the end portion on the other side of the rotation shaft 30 in the axis line direction) of the fan 20 is acquired by a difference dA (=A1−A0: FIG. 16) between an amplitude value A1 of the difference dS and an amplitude value A0 of a reference signal k1.

Here, the amplitude value A1 indicates the amplitude value of the difference dS at the current time. A time period between the timing at which the difference dS becomes zero and the current time is ΔT. The amplitude value A0 is an amplitude of the reference signal k1 when ΔT has elapsed after the timing at which the reference signal k1 becomes zero.

In addition, as a difference (A1−A0) increases, the X coordinate (X0) increases, and as a difference (A1−A0) decreases, the X coordinate (X0) increases. The reference signal k1 is a difference (=theoretical value of output signal Ha−theoretical value of output signal Hc) between the theoretical value of the output signal Ha of the hall sensor 37a and the theoretical value of the output signal Hc of the hall sensor 37c.

Here, the output signal Ha output from the hall sensor 37a when the rotation shaft 30 rotates in a state where the axis line of the rotation shaft 30 matches the rotation center line M1 of the rotation shaft 30 is considered as a theoretical value of the output signal Ha. The output signal Hc output from the hall sensor 37c when the rotation shaft 30 rotates in a state where the axis line of the rotation shaft 30 matches the rotation center line M1 of the rotation shaft 30 is considered as a theoretical value of the output signal Hc.

A difference dq (=Hb−Hd) between an output signal Hb of the hall sensor 37b at the current time and an output signal Hd of the hall sensor 37d at the current time is acquired, and the Y coordinate (that is, Y coordinate of the end portion on the other side of the rotation shaft 30 in the axis line direction) of the fan 20 is acquired based on a difference dB (=B1−B0) between an amplitude B1 of the difference dq and an amplitude value B0 of a reference signal k2.

The reference signal k2 is a difference (=theoretical value of output signal Hb−theoretical value of output signal Hd) between the theoretical value of the output signal Hb of the hall sensor 37b and the theoretical value of the output signal Hd of the hall sensor 37d. Here, the output signal Hb output from the hall sensor 37b when the rotation shaft 30 rotates in a state where the axis line of the rotation shaft 30 matches the rotation center line M1 of the rotation shaft 30 is considered as a theoretical value of the output signal Hb. The output signal Hd output from the hall sensor 37d when the rotation shaft 30 rotates in a state where the axis line of the rotation shaft 30 matches the rotation center line M1 of the rotation shaft 30 is considered as a theoretical value of the output signal Hd.

The amplitude value B1 indicates the amplitude value of the difference dq at the current time. The amplitude value B0 is an amplitude of the reference signal k2 when ΔT has elapsed from the timing at which the reference signal k1 becomes zero. In addition, as the difference dB increases, the Y coordinate (Y0) increases. As the difference dB decreases, the Y coordinate (Y0) decreases.

The tilt θ (angle) of the rotation shaft 30 with respect to the rotation center line M1 is calculated based on the XY coordinates (X0, Y0) of the fan 20 acquired in this manner. In addition, in the present embodiment, the tilt θ is an angle formed in the clockwise direction toward the axis line M2 of the rotation shaft 30 from the Z-axis between the Z-axis and the axis line M2 of the rotation shaft 30 (refer to FIG. 7).

Next, in step 122, the coil to be excited to cause the axis line M2 of the rotation shaft 30 to approach the rotation center line M1 is selected from the coils 50a, 50b, and 50c based on the XY coordinates (X0, Y0) of the fan 20. In other words, the coil to be excited to cause the axis line M2 of the inclined rotation shaft 30 to approach the rotation center line M1 is selected from the coils 50a, 50b, and 50c. Hereinafter, the coil selected in this manner is called a selected coil.

Next, in Step 123, it is determined whether or not the rotational speed of the rotation shaft 30 is a high speed.

Specifically, a difference (Ha−Hc) between the output signal Ha of the hall sensor 37a and the output signal Hc of the hall sensor 37c is acquired, and the rotational speed of the rotation shaft 30 is calculated based on a change of the acquired difference (Ha−Hc) with respect to the time. It is determined whether or not the calculated rotational speed (hereinafter, referred to as a calculated rotational speed V) is equal to or higher than a predetermined speed.

When the calculated rotational speed V is equal to or higher than the predetermined speed, YES which means that the rotational speed of the rotation shaft 30 is a high speed is determined in Step 123. In this case, in order to generate the supporting force Fa necessary to cause the axis line M2 of the rotation shaft 30 to approach the rotation center line M1 between the coils 50a, 50b, and 50c and the multiple permanent magnets 61, the current to be output to the selected coil is calculated based on (X0, Y0) and the tilt θ (Step 124).

Meanwhile, when the calculated rotational speed V is lower than the predetermined speed, NO which means that the rotational speed of the rotation shaft 30 is a low speed is determined in Step 123. In this case, in order to generate the supporting force Fa necessary to cause the axis line M2 of the rotation shaft 30 to approach the rotation center line M1 between the coils 50a, 50b, and 50c and the multiple permanent magnets 61, the current to be output to the selected coil is calculated based on (X0, Y0) and the tilt θ (Step 126).

Here, as the tilt θ increases, the supporting force Fa necessary to cause the axis line M2 of the rotation shaft 30 to approach the rotation center line M1 increases. According to this, as the rotational speed of the rotation shaft 30 increases, the supporting force Fa necessary to cause the axis line M2 of the rotation shaft 30 to approach the rotation center line M1 decreases. In other words, when the rotation shaft 30 rotates at a high speed, the supporting force Fa decreases compared to that when the rotation shaft 30 rotates at a low speed (refer to FIG. 17).

Figure 17:
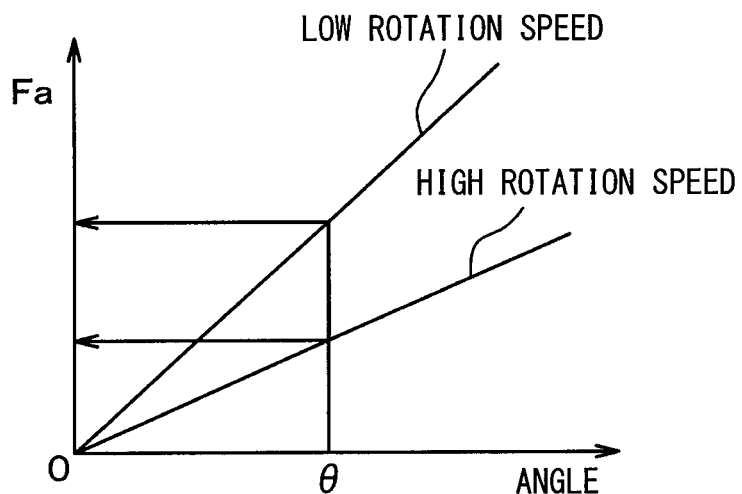
FIG. 17 is a view illustrating a relationship of supporting force Fa-angle-number of rotations of a rotation shaft of FIG. 1.

FIG. 17 is a graph illustrating a relationship between the supporting force Fa and the tilt angle θ in a case where a vertical axis is the supporting force Fa, a horizontal axis is the tilt angle θ, and the rotation shaft 30 rotates at a low speed or at a high speed. A gradient of the graph when the rotation shaft 30 rotates at a low speed is larger compared to that of the graph when the rotation shaft 30 rotates at a high speed.

Here, when the rotation shaft 30 rotates at a high speed, the current to be output to the selected coil is calculated based on the graph illustrating a relationship of supporting force Fa-tilt θ when rotating at a high speed in FIG. 17 (Step 126).

Meanwhile, when the rotation shaft 30 rotates at a low speed, the current to be output to the selected coil is calculated based on the graph illustrating a relationship of supporting force Fa-tilt θ when rotating at a low speed of FIG. 17 (Step 124).

In this manner, the current to be output to the selected coil is calculated based on the rotational speed of the rotation shaft 30, (X0, Y0), and the tilt θ. According to this, in order to output the calculated current to the selected coil, the transistors SW1, SW2, . . . , and SW6 of the inverter circuit 71 are controlled. Accordingly, the current is output to the selected coil from the common connection terminals T1, T2, and T3. Therefore, the supporting force Fa is generated between the selected coil and the permanent magnet 61. Accordingly, the rotation shaft 30 can approach the rotation center line M1 by the supporting force Fa.

Here, in a case where the rotation shaft 30 rotates at a low speed in a case of the same tilt angle θ, the supporting force Fa increases between the selected coil and the permanent magnet 61 compared to a case where the rotation shaft 30 rotates at a high speed.

According to the present embodiment described above, in the electric motor 10, the centerpiece 31 rotatably supports one side of the rotation shaft 30 in the axis line direction via the bearing 32. The rotor 36 is fixed to the rotation shaft 30. The coils 51a, 51b, and 51c are disposed on the centerpiece 31 side, and generate the magnetic field that causes the rotating force for rotating the rotor 36 together with the rotation shaft 30 to be generated. The multiple permanent magnets 61 are fixed to the rotation shaft 30 side together with the rotor case 60 and form the rotor 36. The coils 50a, 50b, and 50c are disposed on the centerpiece 31 side, generate the electromagnetic force between the multiple permanent magnets 61, and form the magnetic bearing which rotatably supports the other side of the rotation shaft 30 in the axis line direction. Accordingly, the rotation shaft 30 is configured to be capable of being inclined with respect to the rotation center line M1 using the bearing 32 side in the rotation shaft 30 as a fulcrum.

The electronic control device 70 controls the current output to the coils 50a, 50b, and 50c from the inverter circuit 71 for each coil such that the axis line M2 of the rotation shaft 30 approaches the rotation center line M1. Therefore, the supporting force Fa can be generated by the electromagnetic force between the multiple permanent magnets 61 and the coils 50a, 50b, and 50c. At this time, as the tilt θ formed between the axis line M2 of the rotation shaft 30 and the rotation center line M1 increases, the supporting force Fa necessary for the axis line M2 of the rotation shaft 30 to approach the rotation center line M1 increases.

Above, the rotation shaft 30 is rotatably supported from the magnetic bearing including the multiple permanent magnets 61 and the coils 50a, 50b, and 50c and the bearing 32. Accordingly, one magnetic bearing is used for supporting the rotation shaft 30. Therefore, the electric motor 10, the electronic control device 70, and the motor control system 1 can be provided to reduce the power consumption for supporting the rotation shaft 30.

In the present embodiment, when the rotation shaft 30 rotates at a high speed, the supporting force Fa becomes small compared to that when the rotation shaft 30 rotates at a low speed. Therefore, since the supporting force Fa is generated, the power consumed by the coils 50a, 50b, and 50c can be reduced.

Figure 18:
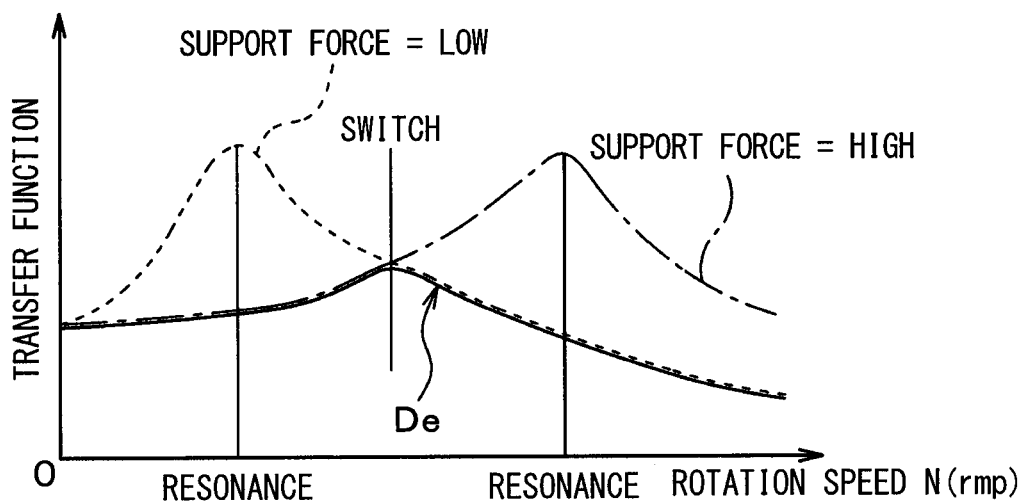
FIG. 18 is a view illustrating a relationship of transfer function-number of rotations of an electric motor of FIG. 1.

In FIG. 18, a horizontal axis is the number of rotations N (that is, the rotational speed) of the rotation shaft 30. A vertical axis is a transfer function indicating a vibration system of the electric motor 10. In the transfer function, a centrifugal force generated from the vibration source is input using tilt vibration of the rotation shaft 30 as a vibration source. The tilt vibration of the rotation shaft 30 is a phenomenon in which the rotation shaft 30 oscillates in the radial direction around the rotation center line M1 when the rotation shaft 30 rotates. In the transfer function, vibration acceleration at a predetermined portion (for example, centerpiece 31) other than the rotation shaft 30 and the rotor 36 in the electric motor 10, is output.

De illustrated by a solid line is the transfer function indicating the vibration system of the electric motor 10 of the present embodiment. A chain line indicates the transfer function that indicates the vibration system of the electric motor 10 when the supporting force Fa decreases, and one-dot chain line indicates the transfer function that indicates the vibration system of the electric motor 10 when the supporting force Fa increases.

Here, a peak of the transfer function in a case where the supporting force Fa is small is generated when the number of rotations of the rotation shaft 30 is a low speed. A peak of the transfer function in a case where the supporting force Fa is large is generated when the number of rotations of the rotation shaft 30 is a high speed (refer to FIG. 18). Therefore, in a case where the supporting force Fa is small, resonance is generated in the electric motor 10 when the number of rotations of the rotation shaft 30 is a low speed. Meanwhile, when the supporting force Fa is large, resonance is generated in the electric motor 10 when the number of rotations of the rotation shaft 30 is a high speed.

Here, in the present embodiment, the supporting force Fa decreases when the rotation shaft 30 rotates at a high speed, and the supporting force Fa increases when the rotation shaft 30 rotates at a low speed. In other words, the magnitude of the supporting force Fa is switched by the number of rotations of the rotation shaft 30. Therefore, in the vibration system of the electric motor 10, the transfer function De of which the peak is suppressed is formed. Accordingly, the resonance can be unlikely to be generated in the electric motor 10.

Figure 19:
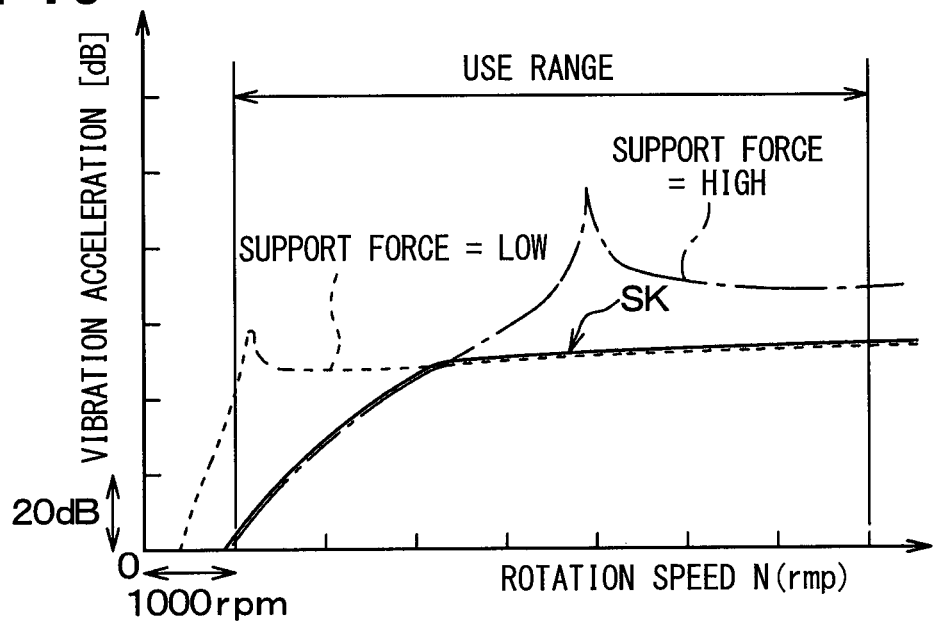
FIG. 19 is a view illustrating a relationship of vibration acceleration-number of rotations of the electric motor of FIG. 1.

Above, the tilt vibration of the rotation shaft 30 is caused, and vibration acceleration Sk generated in the electric motor 10 can be reduced across a use range of the rotational speed N (refer to FIG. 19). The use range is a range of the number of rotations N of the rotation shaft 30 to be practically used in the electric motor 10.

In addition, in FIG. 19, a horizontal axis is the number of rotations N of the rotation shaft 30. A vertical axis is the vibration acceleration generated at a predetermined portion (for example, centerpiece 31) other than the rotation shaft 30 and the rotor 36 in the electric motor 10. A chain line indicates the vibration acceleration generated at the predetermined portion in the electric motor 10 when the supporting force Fa is small, and a one-dot chain line indicates the vibration acceleration generated at the predetermined portion in the electric motor 10 when the supporting force Fa increases. SK illustrated by a solid line indicates the vibration acceleration generated at the predetermined portion in the electric motor 10 of the present embodiment.

Second Embodiment

In the above-described first embodiment, an example in which the supporting force Fa that causes the axis line M2 of the rotation shaft 30 to approach the rotation center line M1 is generated in order to prevent the axis line M2 of the rotation shaft 30 from being inclined from the rotation center line M1, is described, but instead of this, the second embodiment in which a restoring force Fb for moving the rotation shaft 30 in the rotation direction is generated will be described.

Figure 20:
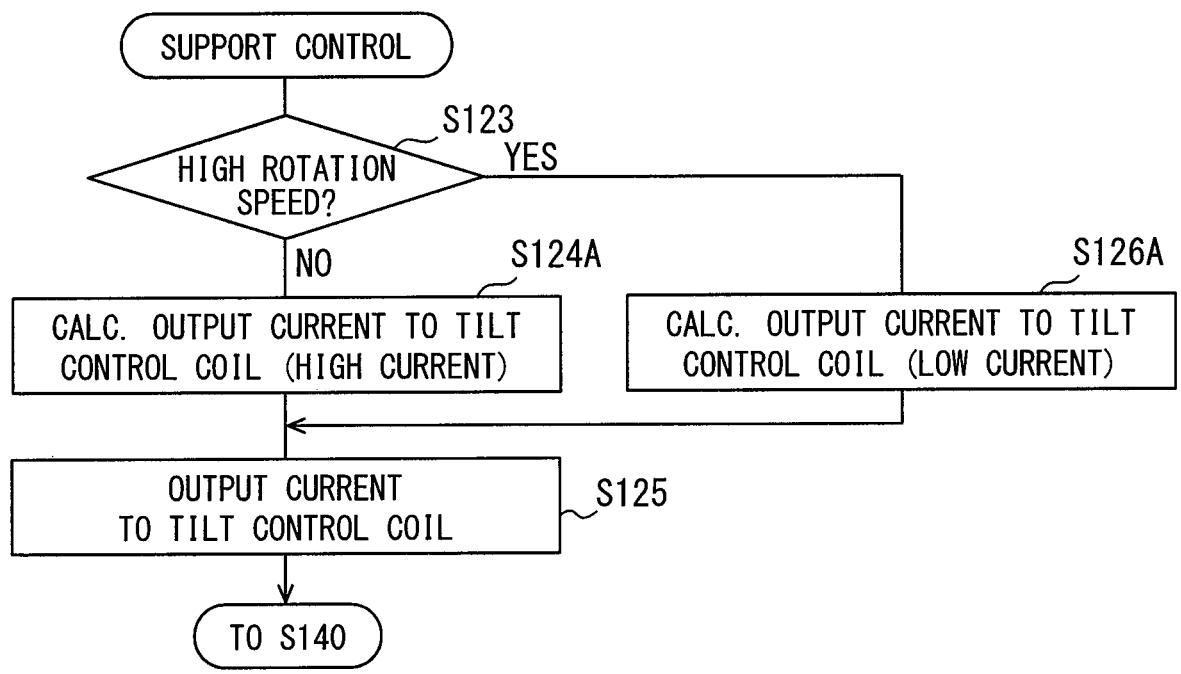
FIG. 20 is a flowchart illustrating supporting processing of a control circuit in a second embodiment of the present disclosure.
Figure 21:
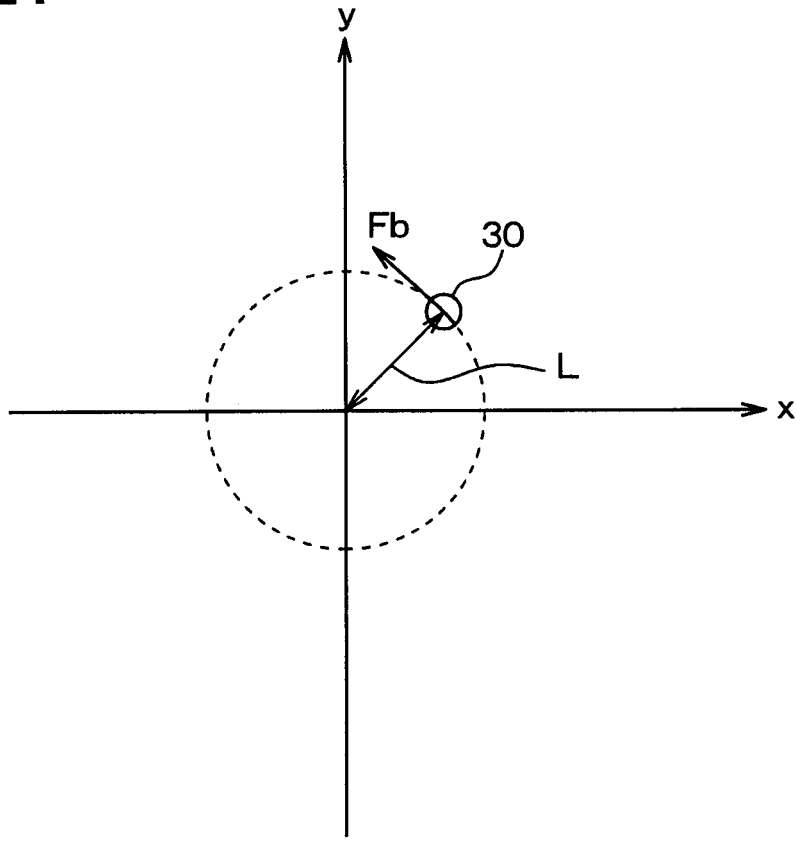
FIG. 21 is a view illustrating an electromagnetic force generated by a tilt-control coil in the second embodiment.

The present embodiment and the above-described first embodiment are different in a supporting control of the control circuit 73 (Step 120). Hereinafter, the supporting control (Step 120) of the present embodiment will be described. FIG. 20 is a flowchart specifically illustrating the supporting control of the control circuit 73.

First, in Step 123, it is determined whether or not the rotational speed of the rotation shaft 30 is a high speed.

Specifically, the rotational speed of the rotation shaft 30 is calculated based on the difference (Ha−Hc) between the output signal Ha of the hall sensor 37a and the output signal Hc of the hall sensor 37c. It is determined whether or not the calculated rotational speed (hereinafter, referred to as a calculated rotational speed V) is equal to or higher than a predetermined speed.

When the calculated rotational speed V is equal to or higher than the predetermined speed, YES which means that the rotational speed of the rotation shaft 30 is a high speed is determined in Step 123. In this case, in order to generate the restoring force Fb necessary for preventing the rotation shaft 30 from being inclined from the rotation center line M1 between the coils 50a, 50b, and 50c and the multiple permanent magnets 61, the current to be output to the coils 50a, 50b, and 50c is calculated (Step 126A).

Meanwhile, when the calculated rotational speed V is lower than the predetermined speed, NO which means that the rotational speed of the rotation shaft 30 is a low speed is determined in Step 123. In this case, since the restoring force Fb for preventing the rotation shaft 30 from being inclined from the rotation center line M1 is generated between the coils 50*a*, 50*b*, and 50*c* and the multiple permanent magnets 61, the current to be output to the coils 50*a*, 50*b*, and 50*c* is calculated (Step 124A).

The restoring force Fb of the present embodiment is the electromagnetic force for moving the fan 20 (that is, rotation shaft 30) in the rotation direction. Regarding the restoring force Fb, the restoring force Fb is an electromagnetic force determined from (L×V×C) when a distance between a shaft center of the fan 20 and the rotation center line M1 is set to be L, the number of rotations of the fan 20 (that is, rotation shaft 30) is set to be V, and an attenuation coefficient is set to be C (refer to FIG. 23). The shaft center of the fan 20 of the present embodiment is the shaft center of the end portion on the other end side in the axial direction of the rotation shaft 30.

Here, the distance L is acquired by the XY coordinates (x0, y0) of the shaft center of the fan 20. The X coordinate (x0) is acquired based on the difference ds (=Ha−Hc) between the output signal Ha of the hall sensor 37*a* and the output signal Hc of the hall sensor 37*c*, as described in the above-described first embodiment. The Y coordinate (y0) is acquired based on the difference dq (=Hb−Hd) between the output signal Hb of the hall sensor 37*b* and the output signal Hd of the hall sensor 37*d*. The number of rotations V is calculated based on the difference (Ha−Hc) between the output signal Ha of the hall sensor 37*a* and the output signal Hc of the hall sensor 37*c*, as described above. The rotation direction of the fan 20 (that is, rotation shaft 30) is acquired by the XY coordinates (x0, y0) of the shaft center of the fan 20.

Here, in the present embodiment, in Steps 124A and 126A, the current to be output to the coils 50*a*, 50*b*, and 50*c* is calculated based on the XY coordinates (x0, y0) of the fan 20 and (L×V×C). As the restoring force Fb increases, the current to be output to the coils 50*a*, 50*b*, and 50*c* increases.

In this manner, in order to output the current calculated in Steps 124A and 126A to the coil, the transistors SW1, SW2, . . . , and SW6 of the inverter circuit 71 are controlled. Accordingly, the current is output to the coils 50*a*, 50*b*, and 50*c* from the common connection terminals T1, T2, and T3 (Step 125). Therefore, the electromagnetic force which is the restoring force Fb for moving the fan 20 in the rotation direction of the fan 20 around the rotation center line M1 is generated between the coils 50*a*, 50*b*, and 50*c* and the multiple permanent magnets 61.

The restoring force Fb which acts in the rotation direction in this manner acts between the coils 50*a*, 50*b*, and 50*c* and the multiple permanent magnets 61. Therefore, the axis line M2 of the rotation shaft 30 is prevented from being inclined from the rotation center line M1 by disturbance or the like.

Here, as the number of rotations of the rotation shaft 30 increases, the restoring force Fb necessary for preventing the rotation shaft 30 from being inclined from the rotation center line M1 decreases. In other words, when the rotation shaft 30 rotates at a high speed, the above-described necessary restoring force Fb becomes small compared to that when the rotation shaft 30 rotates at a low speed.

Here, when YES which means that the rotation shaft 30 rotates at a high speed is determined in Step 123, the attenuation coefficient C decreases, and the current to be output to the coils 50*a*, 50*b*, and 50*c* decreases (Step 126A). Meanwhile, when NO which means that the rotation shaft 30 rotates at a low speed is determined in Step 123, the attenuation coefficient C increases, and the current to be output to the coils 50*a*, 50*b*, and 50*c* increases (Step 124A). In other words, when the rotation shaft 30 rotates at a high speed, compared to that when the rotation shaft 30 rotates at a low speed, the attenuation coefficient C can decrease, and the current that flows to the coils 50*a*, 50*b*, and 50*c* can decrease.

According to the present embodiment described above, the electronic control device 70 controls the inverter circuit 71, and generates the restoring force Fb (=L×V×C) for moving the fan 20 in the rotation direction between the coils 50*a*, 50*b*, and 50*c* and the multiple permanent magnets 61 when the distance between the fan 20 and the rotation center line M1 is set to be L and the attenuation coefficient is set to be C. Accordingly, even when the disturbance is generated, the axis line M2 of the rotation shaft 30 is prevented from being inclined from the rotation center line M1 of the rotation shaft 30.

Above, the rotation shaft 30 is rotatably supported from the magnetic bearing including the multiple permanent magnets 61 and the coils 50*a*, 50*b*, and 50*c* and the bearing 32. Accordingly, one magnetic bearing is used for supporting the rotation shaft 30. Therefore, the power consumption for supporting the rotation shaft 30 can be reduced.

In the present embodiment, when the rotation shaft 30 rotates at a high speed, the current output to the coils 50*a*, 50*b*, and 50*c* from the inverter circuit 71 becomes small compared to that when the rotation shaft 30 rotates at a low speed. Therefore, when the rotation shaft 30 rotates at a high speed, the restoring force Fb becomes small compared to that when the rotation shaft 30 rotates at a low speed. Therefore, since the restoring force Fb is generated, the power consumed by the coils 50*a*, 50*b*, and 50*c* can be reduced.

Figure 22:
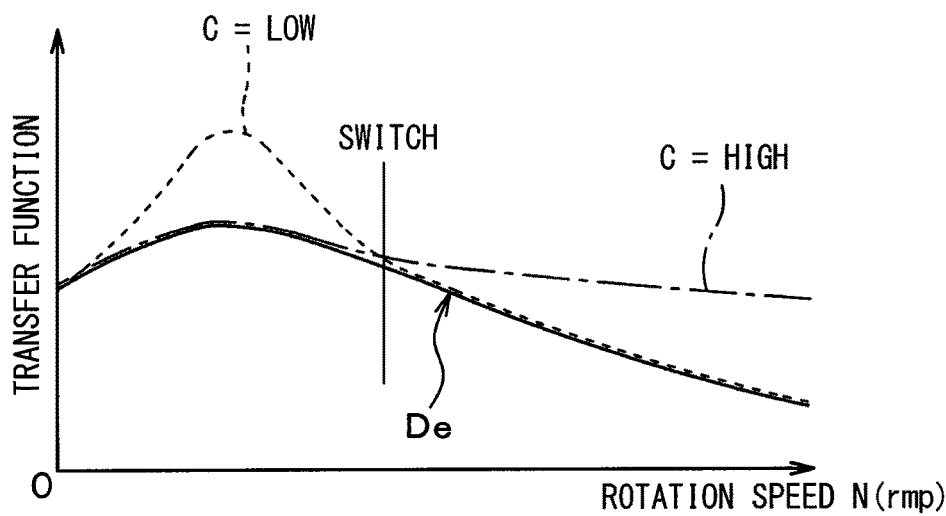
FIG. 22 is a view illustrating a relationship of transfer function-rotational speed of an electric motor in the second embodiment.

In FIG. 22, a graph in which the number of rotations N of the rotation shaft 30 is a horizontal axis and the transfer function indicating the vibration system of the electric motor 10 is a vertical axis, is illustrated. In the transfer function, a centrifugal force generated from the vibration source is input using tilt vibration of the rotation shaft 30 as a vibration source. In the transfer function, vibration acceleration at a predetermined portion (for example, centerpiece 31) other than the rotation shaft 30 and the rotor 36 in the electric motor 10, is output.

The graph De indicates the transfer function indicating the vibration system of the electric motor 10 of the present embodiment. The graph of a chain line indicates the transfer function in a case where the attenuation coefficient C is small, and a one-dot chain line indicates the transfer function in a case where the attenuation coefficient C is large.

Here, when the rotation shaft 30 rotates at a low speed, in a case where the attenuation coefficient C (that is, restoring force Fb) is small, the transfer function becomes large compared to a case where the attenuation coefficient C is large (refer to FIG. 22). Meanwhile, when the rotation shaft 30 rotates at a high speed, in a case where the attenuation coefficient C is large, the transfer function becomes large compared to a case where the attenuation coefficient C is small.

Here, in the present embodiment, the attenuation coefficient C decreases when the rotation shaft 30 rotates at a high speed, and the attenuation coefficient C increases when the rotation shaft 30 rotates at a low speed. In other words, by the number of rotations of the rotation shaft 30, by switching the size of the attenuation coefficient C (that is, restoring force Fb), an increase in transfer function is restricted. Accordingly, in the electric motor 10, the resonance can be unlikely to be generated.

Above, since the attenuation coefficient C is switched according to the number of rotations N, similar to the above-described first embodiment, the vibration acceleration can be reduced in the electric motor 10 across the use range of the number of rotations N. Accordingly, small vibration can be achieved.

Third Embodiment

In the above-described first and second embodiments, an example in which a portion on the fan 20 side is supported by the magnetic bearing with respect to the bearing 32 in the rotation shaft 30 is described, but instead of this, in the third embodiment, an example in which a portion on a side opposite to the fan 20 is supported by the magnetic bearing with respect to the bearing 32 in the rotation shaft 30 will be described.

Figure 23:
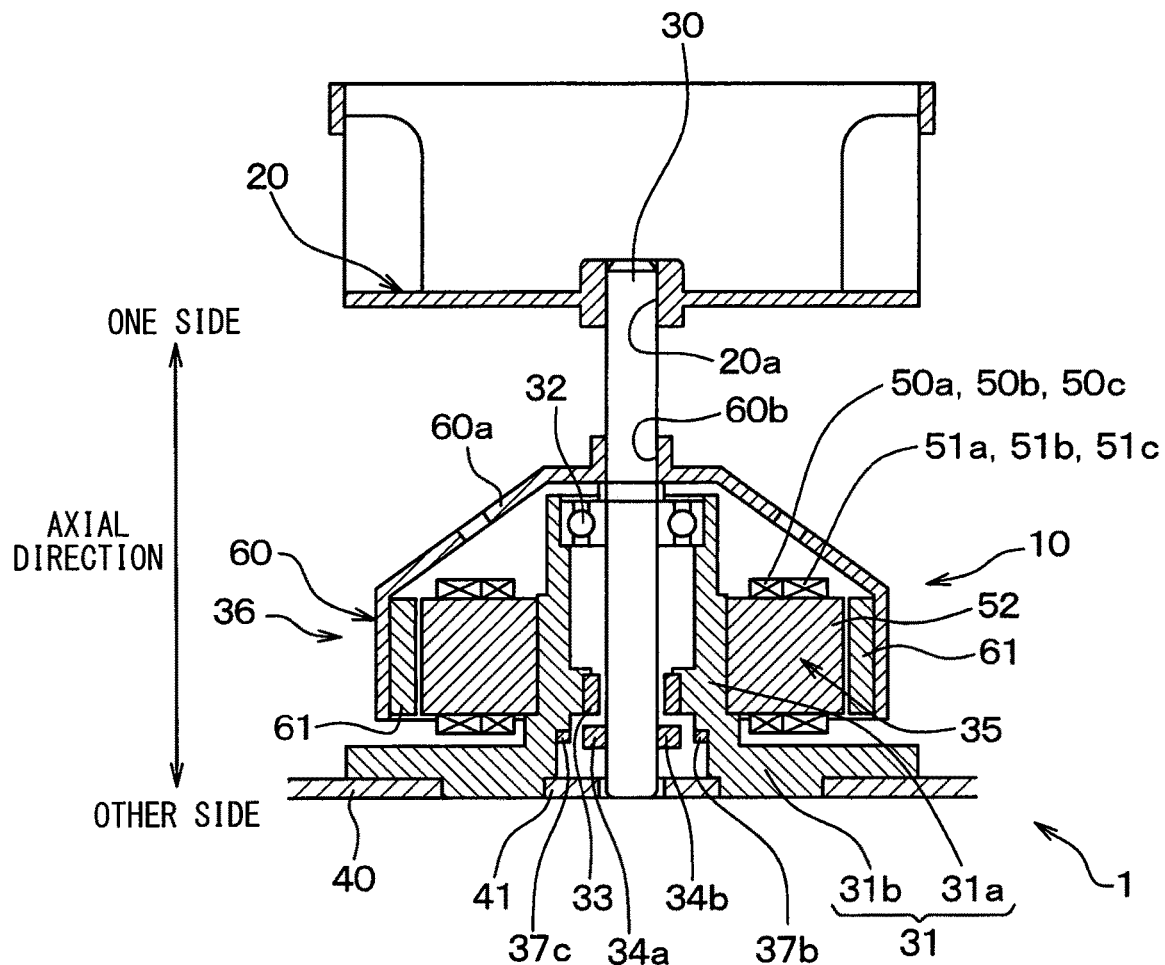
FIG. 23 is a view illustrating the entire configuration of a motor control system in a third embodiment of the present disclosure.

In FIG. 23, the entire configuration of the third embodiment of the motor control system 1 of the present disclosure is illustrated. In FIG. 23, the same reference numerals as those of FIG. 1 indicate the same configuration elements, and the description thereof will be omitted. The present embodiment and the above-described first embodiment are mainly different in the portion supported by the magnetic bearing and the bearing 32 in the rotation shaft 30.

In the present embodiment, the magnetic bearing supports the portion on the side opposite to the fan 20 with respect to the bearing 32 in the rotation shaft 30 by the magnetic bearing. The bearing 32 is disposed on the fan 20 side with respect to the stator 35. Therefore, the lid portion 60a of the rotor case 60 is formed to be projected toward the fan 20 side.

In the present embodiment, using the fan 20, the rotation shaft 30, and the rotor 36 including the multiple permanent magnets 61 as the rotating body, the bearing 32 supports the centroid side of the rotating body in the rotation shaft 30.

Here, when the fulcrum supported by the bearing 32 in the rotation shaft 30 and the centroid of the rotating body are separated from each other, it is necessary to increase the supporting force Fa for supporting the rotation shaft 30. Meanwhile, in the present embodiment, as described above, the bearing 32 supports the centroid side of the rotating body in the rotation shaft 30. Therefore, the fulcrum supported by the bearing 32 in the rotation shaft 30 and the centroid of the rotating body can approach each other. Therefore, the supporting force Fa can decrease. Accordingly, the power consumption consumed by the coils 50a, 50b, and 50c can be reduced.

In addition, for convenience of the description, the fan 20 side in the axis line direction of the rotation shaft 30 is set to be one side in the axis line direction, and the side opposite to the fan 20 in the axis line direction of the rotation shaft 30 is set to be the other side in the axis line direction.

Fourth Embodiment

In the above-described first and second embodiments, an example in which the tilt-control coil (50a, 50b, 50c) is disposed on the rotor 36 side with respect to the rotation-driving coil (51a, 51b, 51c) is described, but instead of this, a fourth embodiment in which the rotation-driving coil (51a, 51b, 51c) is disposed on the rotor 36 side with respect to the tilt-control coil (50a, 50b, 50c) will be described.

Figure 24:
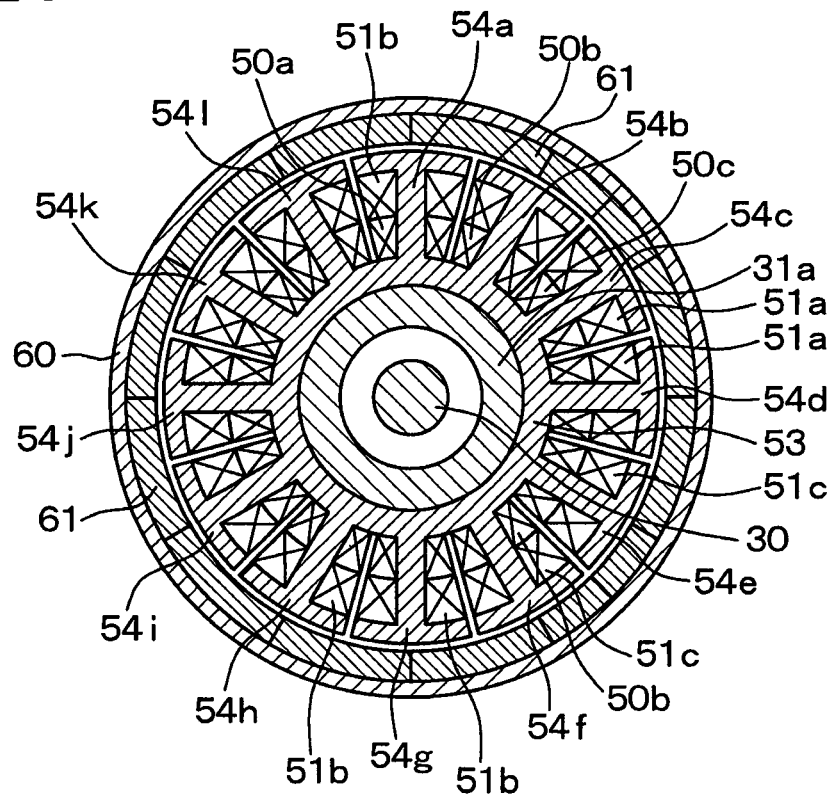
FIG. 24 is a cross-sectional view illustrating disposition of a tilt-control coil and a rotation-control coil in a fourth embodiment of the present disclosure, and corresponds to FIG. 3.

FIG. 24 is a cross-sectional view orthogonal to the axis line of the rotation shaft 30 in the electric motor 10 of the present embodiment.

Figure 25:
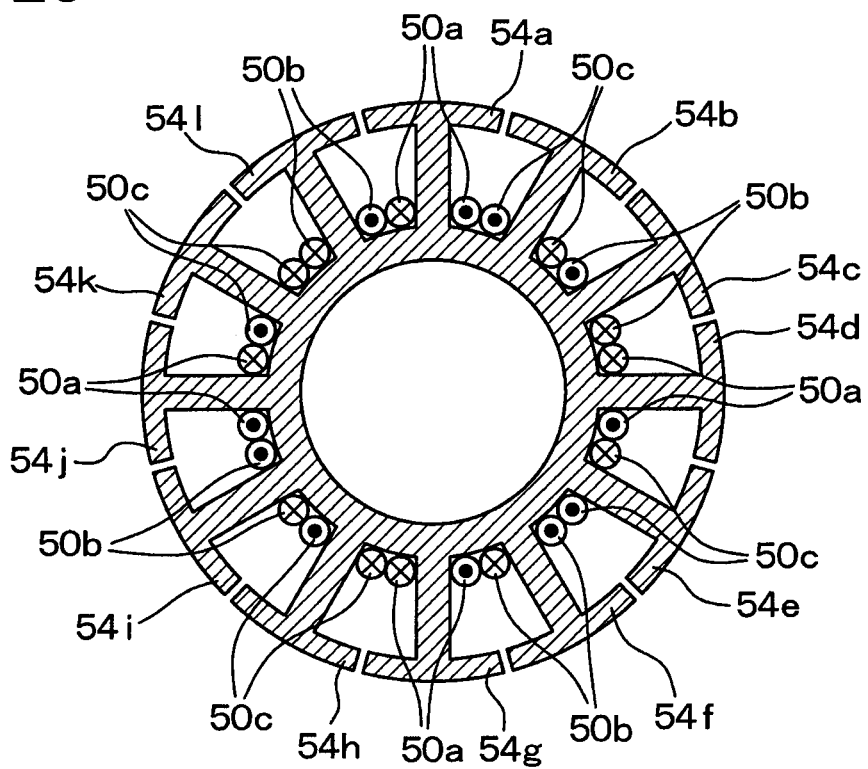
FIG. 25 is a cross-sectional view illustrating arrangement of the tilt-control coil in the fourth embodiment.
Figure 26:
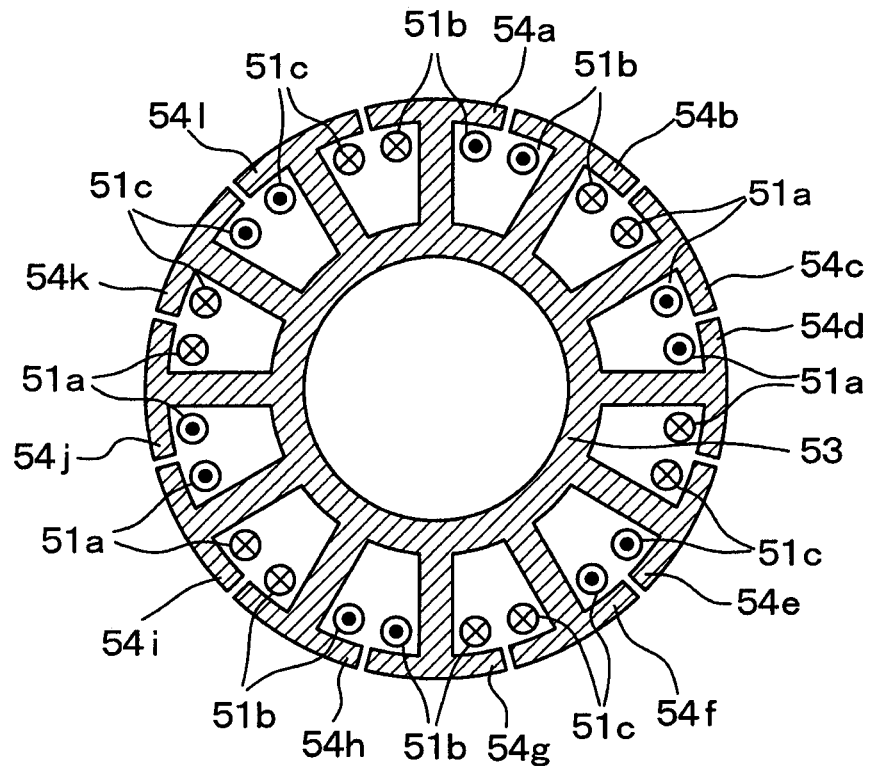
FIG. 26 is a cross-sectional view illustrating arrangement of the rotation-control coil in the fourth embodiment.

In the present embodiment, similar to the above-described first embodiment, as illustrated in FIGS. 24 to 26, the coil 50a is wound around the teeth 54a, 54d, 54g, and 54j. The coil 50b is wound around the teeth 54c, 54f, 54i, and 54l. The coil 50c is wound around the teeth 54b, 54e, 54h, and 54k.

The coil 51a is wound around the teeth 54c, 54d, 54i, and 54j. The coil 51b is wound around the teeth 54a, 54b, 54g, and 54h. The coil 51c is wound around the teeth 54e, 54f, 54k, and 54l.

In the present embodiment, the rotation-driving coil (51a, 51b, 51c) is disposed on the rotor 36 side with respect to the tilt-control coil (50a, 50b, 50c) in each of the teeth of the stator 35.

For example, the coil 51b wound around the tooth 54a is disposed on the rotor 36 side with respect to the coil 50a. The coil 51a wound around the tooth 54c is disposed on the rotor 36 side with respect to the coil 50c. The coil 51c wound around the tooth 54f is disposed on the rotor 36 side with respect to the coil 50b.

In the present embodiment and the above-described first embodiment, only the arrangement in the radial direction between the coils 50a, 50b, and 50c and the coils 51a, 51b, and 51c is different, and other configurations are the same.

Figure 27:
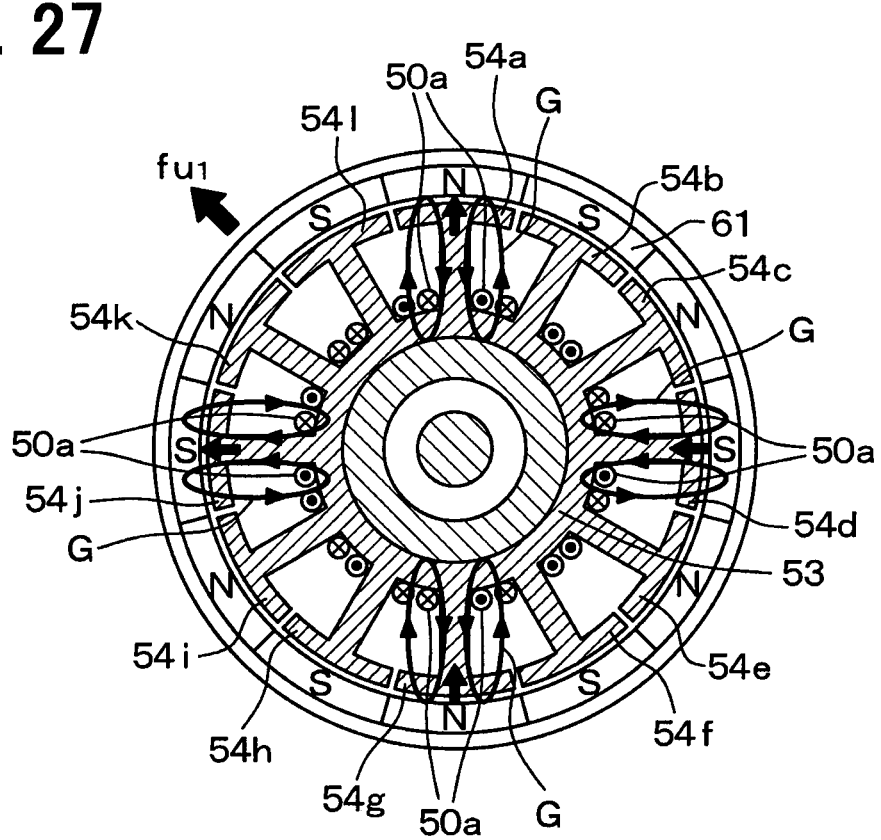
FIG. 27 is a cross-sectional view illustrating an electromagnetic force generated by a tilt-control u1-phase coil in the fourth embodiment.
Figure 28:
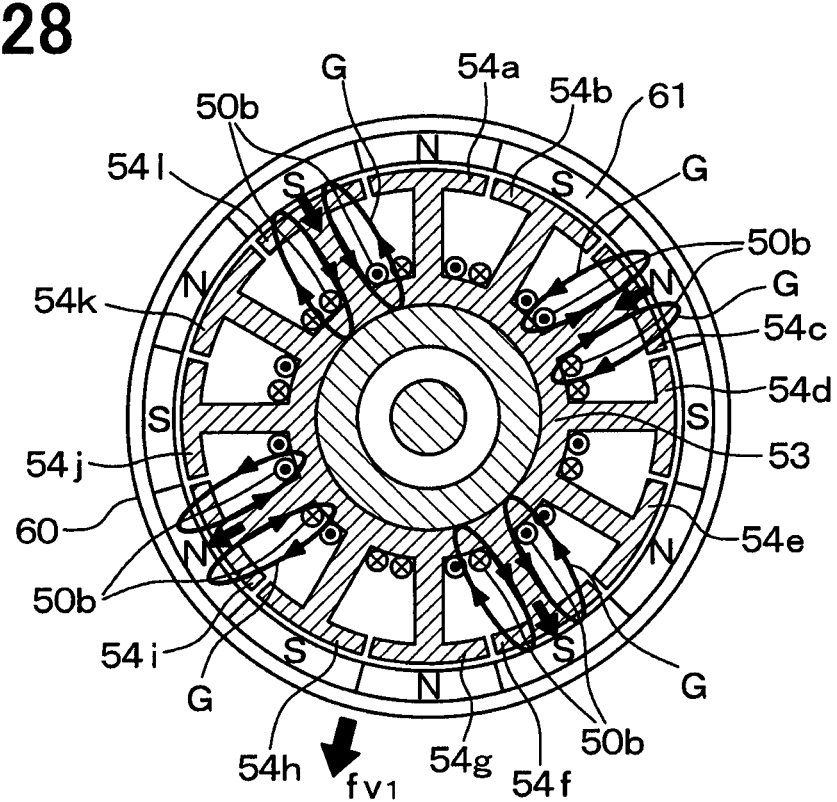
FIG. 28 is a cross-sectional view illustrating an electromagnetic force generated by a tilt-control v1-phase coil in the fourth embodiment.
Figure 29:
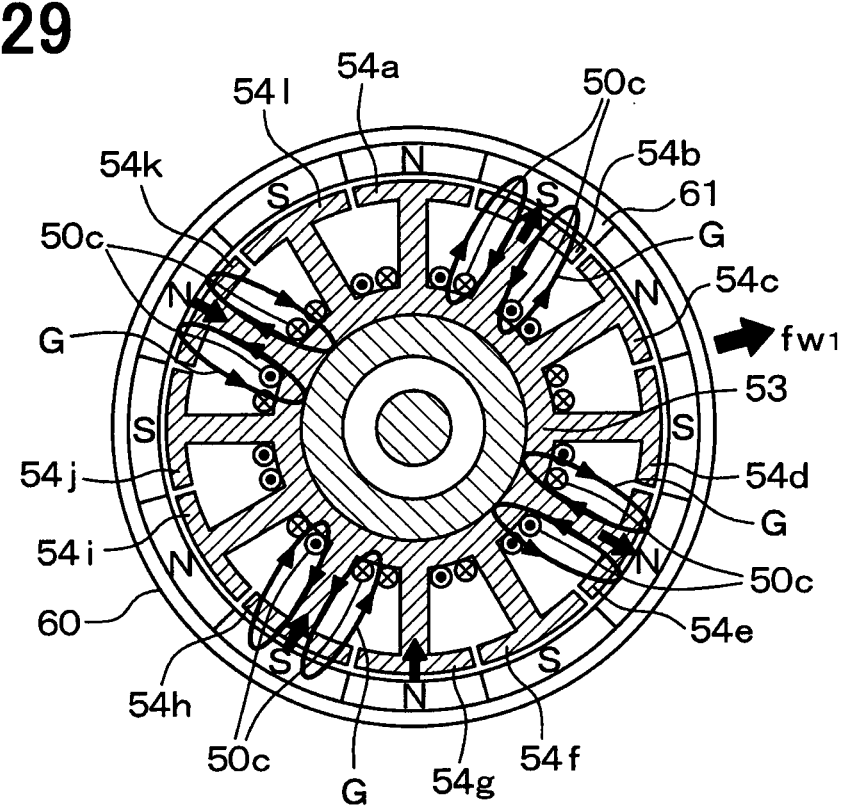
FIG. 29 is a cross-sectional view illustrating an electromagnetic force generated by a tilt-control w1-phase coil in the fourth embodiment.
Figure 30:
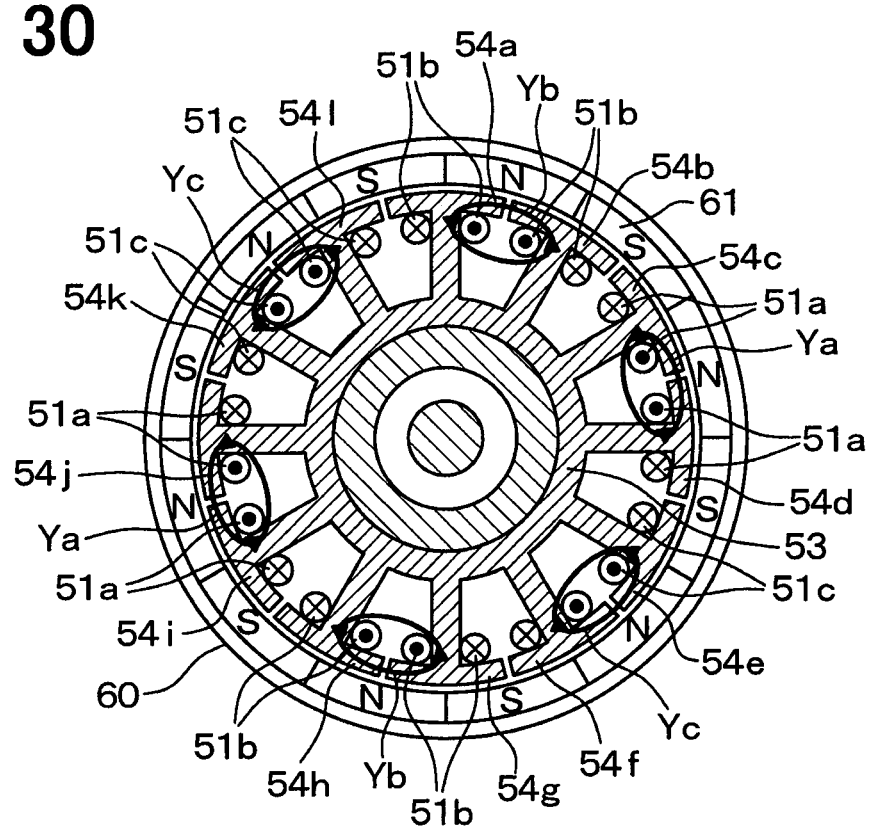
FIG. 30 is a cross-sectional view illustrating an electromagnetic force generated by the rotation-control coil in the fourth embodiment.

Therefore, similar to the above-described first embodiment, the electromagnetic force fu1 (refer to FIG. 27) is generated based on the magnetic flux G generated by the coil 50a, between the coil 50a and the multiple permanent magnets 61. The electromagnetic force fv1 (refer to FIG. 28) is generated based on the magnetic flux G generated by the coil 50a, between the coil 50b and the multiple permanent magnets 61. The electromagnetic force fw1 (refer to FIG. 29) is generated based on the magnetic flux G generated by the coil 50a, between the coil 50c and the multiple permanent magnets 61.

Here, similar to the above-described first embodiment, the control circuit 73 controls the electric current output to the coils 50a, 50b, and 50c from the inverter circuit 71. Therefore, as the electromagnetic force between the multiple permanent magnets 61 and the coils 50a, 50b, and 50c, the supporting force Fa for the axis line M2 of the rotation shaft 30 to approach the rotation center line M1 can be generated.

Furthermore, in the coils 51a, 51b, and 51c of the present embodiment, the rotating magnetic fields Ya, Yb, and Yc (refer to FIG. 29) for generating the rotating force in the multiple permanent magnets 61 can be consecutively generated, similar to the above-described first embodiment.

Here, as the control circuit 73 controls the current output to the coils 51a, 51b, and 51c from the inverter circuit 72, the rotating magnetic fields Ya, Yb, and Yc are consecutively generated from the coils 51a, 51b, and 51c. Therefore, in the multiple permanent magnets 61, the rotating force which rotates in synchronization with the rotating magnetic field is generated. According to this, the rotation shaft 30 rotates together with the rotor 36.

According to the present embodiment described above, the rotation-driving coil (51a, 51b, 51c) is disposed on the rotor 36 side with respect to the tilt-control coil (50a, 50b, 50c) in each of the teeth of the stator 35. Therefore, compared to a case where the tilt-control coil (50a, 50b, 50c) is disposed on the rotor side (that is, the radially outer side) with respect to the rotation-driving coil (51a, 51b, 51c), since the distance between the rotation-driving coil (51a, 51b, 51c) and the rotor 36 can be reduced, a rotational torque for rotating the rotational torque can be efficiently increased. Therefore, a large rotational torque is obtained by the same number of turns. Accordingly, the power consumption consumed by the rotation-driving coil (51a, 51b, 51c) can be reduced.

In the above-described fourth embodiment, an example in which the rotation-driving coil (51a, 51b, 51c) is disposed on the rotor 36 side (that is, the radially outer side) with respect to the tilt-control coil (50a, 50b, 50c) is described, but in addition to this, the following first to fourth modification examples may be employed.

First Modification Example

Figure 31:
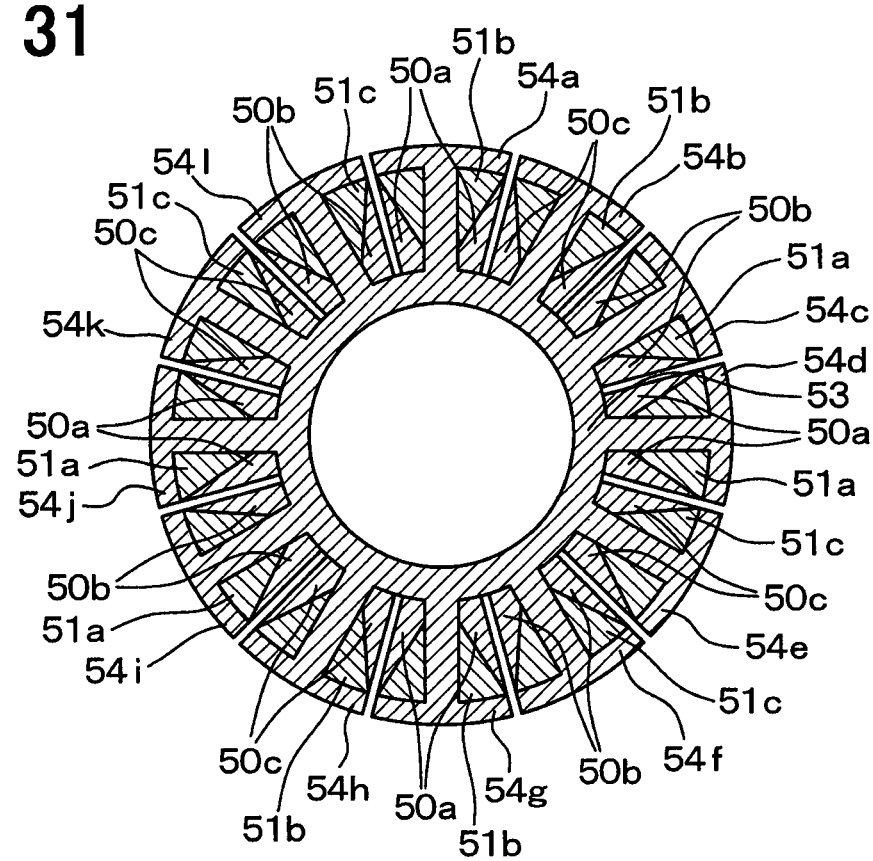
FIG. 31 is a cross-sectional view illustrating disposition of a tilt-control coil and a rotation-control coil in a first modification example of the fourth embodiment of the present disclosure.

In the first modification example, as illustrated in FIG. 31, the rotation-driving coil (51a, 51b, 51c) is formed such that a cross-sectional area orthogonal to the radial direction decreases as approaching the radially inner side in each of the teeth (54a, . . . , and 54l). The rotation-driving coil (51a, 51b, 51c) is wound around the tilt-control coil (50a, 50b, 50c) and the teeth, in each of the teeth. Therefore, the tilt-control coil (50a, 50b, 50c) is formed such that the cross-sectional area orthogonal to the radial direction decreases as approaching the radially outer side, in each of the teeth (54a, . . . , and 54l).

For example, the coil 51b wound around the tooth 54a is disposed on the rotor 36 side (that is, the radially outer side) with respect to the coil 50a. The coil 51b is wound around the coil 50a and the tooth 54a. The coil 51b is formed such that the cross-sectional area decreases as approaching the radially inner side. The coil 50a is formed such that the cross-sectional area decreases as approaching the radially outer side.

For example, the coil 51a wound around the tooth 54c is disposed on the rotor 36 side (that is, the radially outer side) with respect to the coil 50b. The coil 51a is wound around the coil 50b and the tooth 54c. The coil 51a is formed such that the cross-sectional area decreases as approaching the radially inner side. In addition, the coil 50b is formed such that the cross-sectional area decreases as approaching the radially outer side.

Second Modification Example

Figure 32:
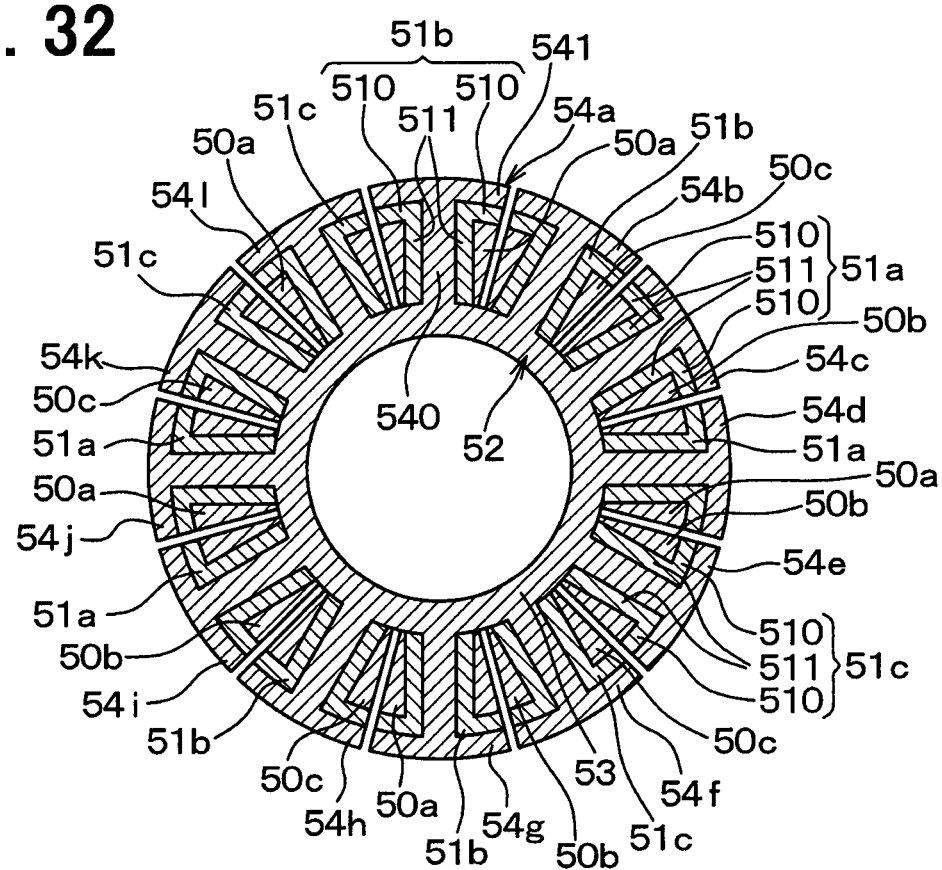
FIG. 32 is a cross-sectional view illustrating disposition of an tilt-control coil and a rotation-control coil in a second modification example of the fourth embodiment of the present disclosure.

In the second modification example, as illustrated in FIG. 32, the rotation-driving coil (51a, 51b, 51c) is wound along the teeth, in each of the teeth (54a, . . . , and 54l).

Specifically, the rotation-driving coil (51a, 51b, 51c) includes a coil portion 511 formed along an extending portion 540 of the teeth, and a coil portion 510 formed along a tip end arc portion 54l of the teeth, in each of the teeth (54a, . . . , and 54l).

The extending portion 540 of the teeth is a portion formed to extend to the radially outer side from the ring portion 53. The tip end arc portion 54l of the teeth is a portion formed to extend in the circumferential direction from the tip end side of the extending portion.

In this case, the tilt-control coil (50a, 50b, 50c) is wound around the extending portion 540 of the teeth and the coil portion 511, in each of the teeth. Accordingly, the coil portion 510 in the rotation-driving coil is disposed on the rotor 36 side (that is, the radially outer side) with respect to the tilt-control coil, in each of the teeth. In addition to this, the rotation-driving coil is disposed on the teeth side (that is, the stator core 52 side) with respect to the tilt-control coil, in each of the teeth.

For example, the coils 50a and 51b wound around the tooth 54a are formed as follows.

The coil portion 510 of the coil 51b is formed along the tip end arc portion 54l of the tooth 54a. The coil portion 511 of the coil 51b is formed along the extending portion 540 of the tooth 54a. The coil 50a is wound around the extending portion 540 and the coil portion 511 of the tooth 54a. Accordingly, the coil portion 510 of the coil 51b is disposed on the rotor 36 side (that is, the radially outer side) with respect to the coil 50a. In addition to this, the coil 51b is disposed on the tooth 54a side (that is, the stator core 52 side) with respect to the coil 50a.

Third Modification Example

Figure 33:
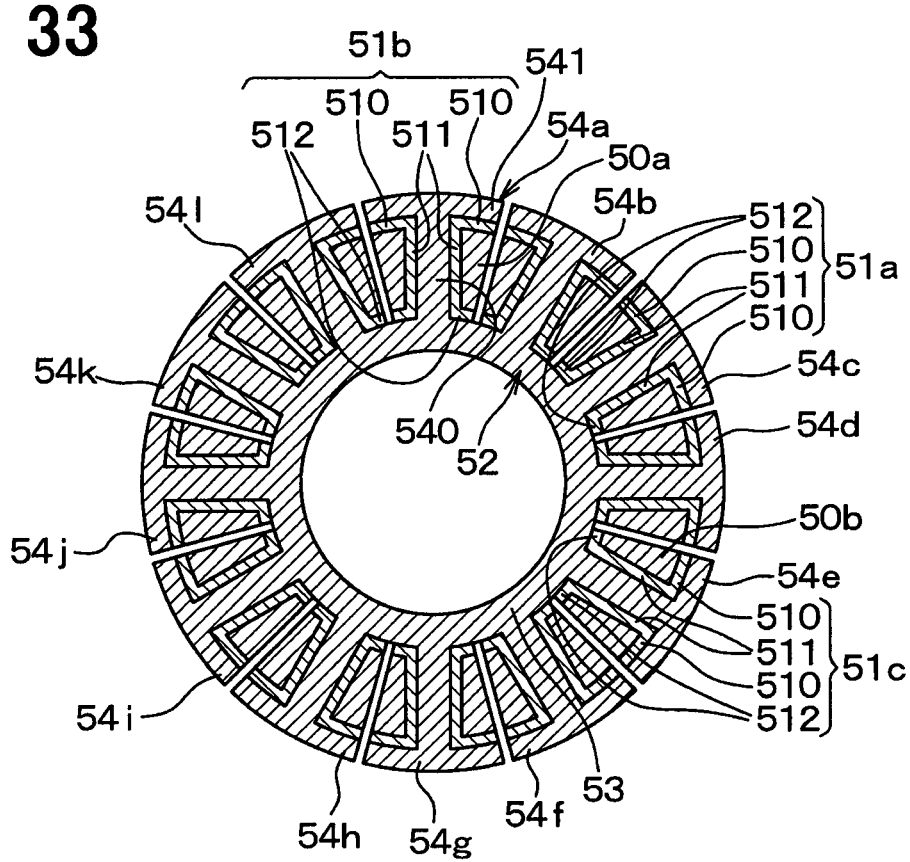
FIG. 33 is a cross-sectional view illustrating disposition of a tilt-control coil and a rotation-control coil in a third modification example of the fourth embodiment of the present disclosure.

In the third modification example, as illustrated in FIG. 33, the rotation-driving coil (51a, 51b, 51c) includes a coil portion 512 in addition to the coil portions 510 and 511, in each of the teeth (54a, . . . , and 54l).

Here, the coil portion 510 is formed along the tip end arc portion 54l of the teeth. The coil portion 511 is formed along the extending portion 540 of the teeth. The coil portion 512 is formed to be along the outer circumference of the ring portion 53. The coil portion 512 is disposed on the radially inner side with respect to the tilt-control coil.

In this case, similar to the above-described (b), the tilt-control coil (50a, 50b, 50c) is wound around the extending portion 540 of the teeth and the coil portion 511, in each of the teeth. Accordingly, the coil portion 510 in the rotation-driving coil is disposed on the rotor 36 side (that is, the radially outer side) with respect to the tilt-control coil, in each of the teeth. In addition to this, the rotation-driving coil is disposed on the stator core 52 side with respect to the tilt-control coil, in each of the teeth.

For example, the coils 50a and 51b wound around the tooth 54a are formed as follows.

The coil portion 510 of the coil 51b is formed along the tip end arc portion 54l of the tooth 54a. The coil portion 511 of the coil 51b is formed along the extending portion 540 of the tooth 54a. The coil 50a is wound around the extending portion 540 and the coil portion 511 of the tooth 54a. The coil portion 512 is formed to be along the outer circumference of the ring portion 53. In other words, the coil portion 512 is disposed on the radially inner side with respect to the coil 50a.

Accordingly, the coil portion 510 of the coil 51b is disposed on the rotor 36 side (that is, the radially outer side) with respect to the coil 50a. In addition to this, the coil 51b is disposed on the stator core 52 side with respect to the coil 50a.

Fourth Modification

Figure 34:
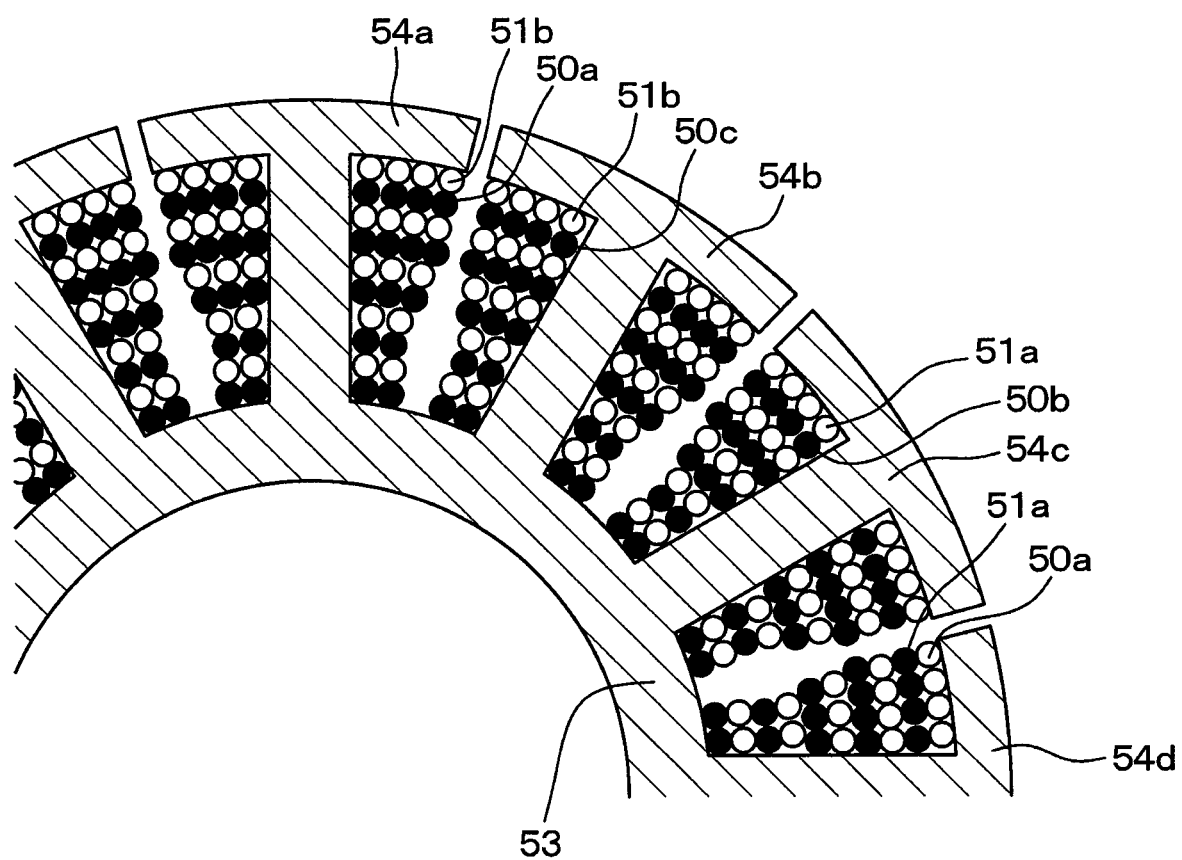
FIG. 34 is a partially enlarged view illustrating disposition of a tilt-control coil and a rotation-control coil in a fourth modification example of the fourth embodiment of the present disclosure.

In the fourth modification, as illustrated in FIG. 34, the rotation-driving coil (51a, 51b, 51c) and the tilt-control coil (50a, 50b, 50c) are wound around the teeth (54a, . . . , and 54l) in pair, in each of the teeth (54a, . . . , and 54l).

For example, the coils 50c and 51b wound around the tooth 54b are formed as follows. In other words, the coils 50c and 51b are wound around the tooth 54b in pair. The coil 51b is disposed on the rotor 36 side (that is, the radially outer side) with respect to the coil 50c.

For example, the coils 50b and 51a wound around the tooth 54c are formed as follows. In other words, the coils 50b and 51a are wound around the tooth 54c in pair. The coil 51a is disposed on the rotor 36 side (that is, the radially outer side) with respect to the coil 50b.

Fifth Embodiment

In the above-described first embodiment, an example in which the rotation shaft 30 is rotatably supported by the mechanical bearing and the magnetic bearing is described, but instead of this, an example in which the rotation shaft 30 is rotatably supported only by the magnetic bearing among the mechanical bearing and the magnetic bearing, will be described.

Figure 35:
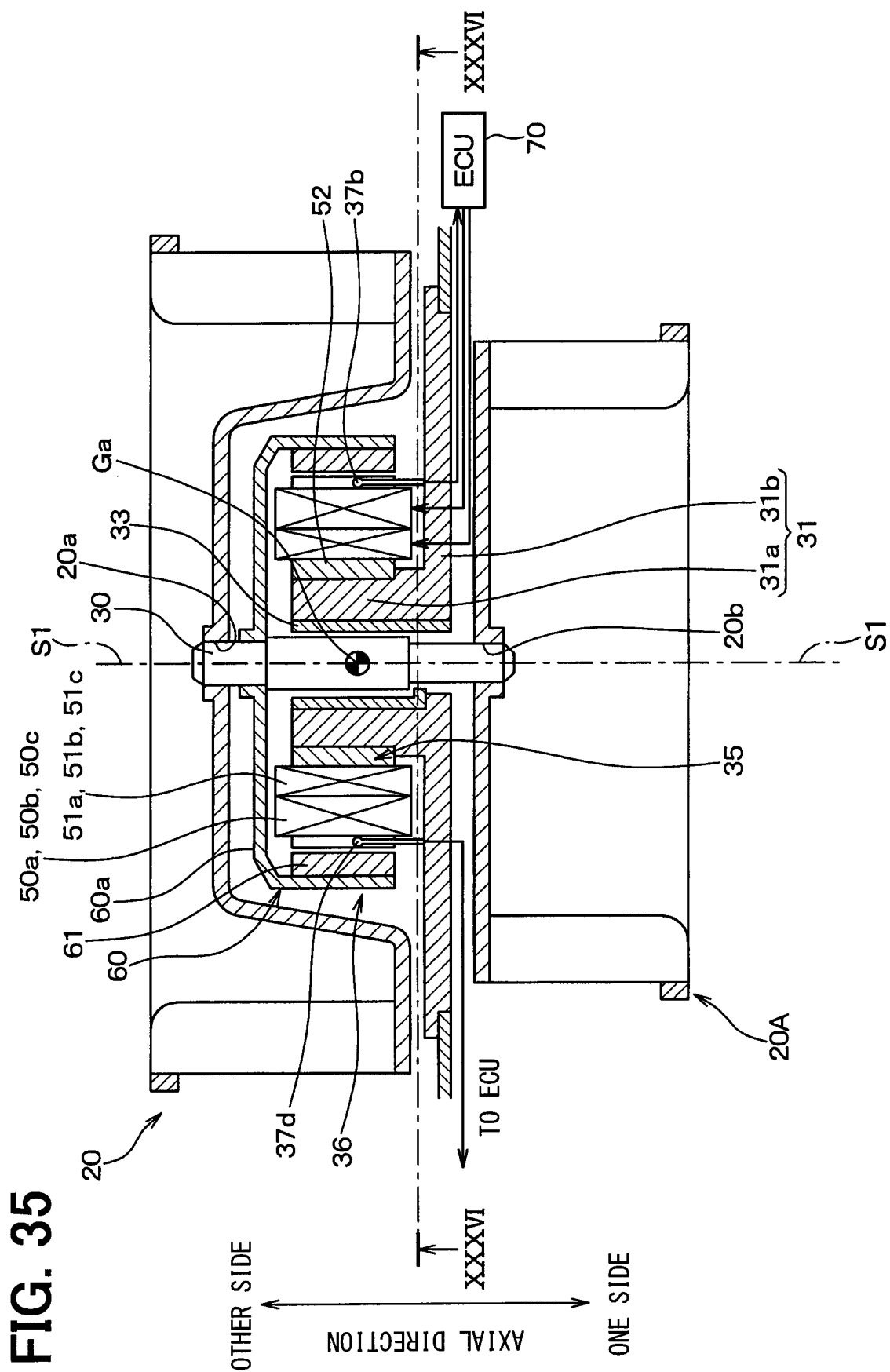
FIG. 35 is a view illustrating the entire configuration of a motor control system in a fifth embodiment of the present disclosure.
Figure 36:
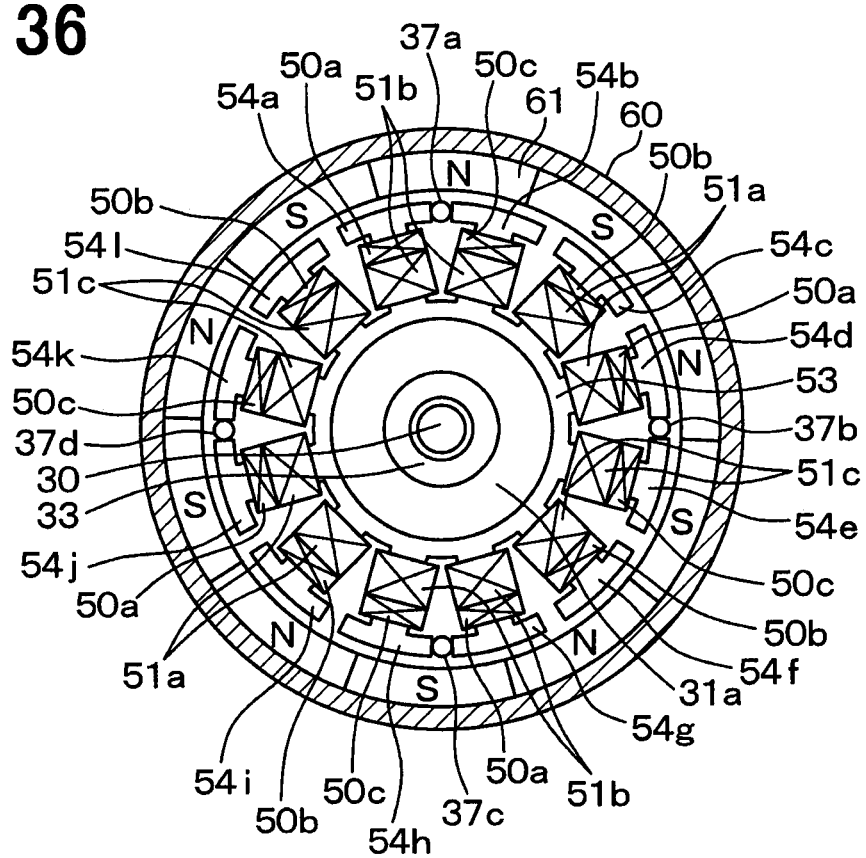
FIG. 36 is a cross-sectional view taken along a line XXXVI-XXXVI in FIG. 35.

In FIG. 35, the entire configuration of the motor control system 1 of a fifth embodiment of the present disclosure will be described. FIG. 36 is a cross-sectional view taken along a line XXXVI-XXXVI in FIG. 35. In FIG. 35, the same reference numerals as those of FIG. 1 indicate the same configuration elements, and the description thereof will be omitted.

The motor control system 1 of the present embodiment is a system achieved by removing the bearing 32 from the motor control system 1 of the above-described first embodiment.

In addition, the coils 50a, 50b, and 50c of the present embodiment generate the electromagnetic force between the multiple permanent magnets 61, and form the magnetic bearing that rotatably supports the rotation shaft 30 centered on the rotation center line M1 by raising up the rotation shaft 30.

In the motor control system 1 of the present embodiment and the motor control system 1 of the above-described first embodiment, positions of the hall sensors 37a, 37b, 37c, and 37d are different from each other.

The hall sensors 37a, 37b, 37c, and 37d of the present embodiment are located on the radially inner side around the rotation center line M1 with respect to the multiple permanent magnets 61 and on the radially outer side around the rotation center line M1 with respect to the rotation shaft 30.

In other words, the hall sensors 37a, 37b, 37c, and 37d are disposed between the multiple permanent magnets 61 and the rotation shaft 30. The distance between the hall sensors 37a, 37b, 37c, and 37d and the rotation shaft 30 is greater than the distance between the hall sensors 37a, 37b, 37c, and 37d and the multiple permanent magnets 61.

The hall sensors 37a, 37b, 37c, and 37d of the present embodiment are disposed to be orthogonal to the rotation center line M1 and along the section including a centroid Ga. The centroid Ga means a mass center of the motor control system 1.

The hall sensors 37a, 37b, 37c, and 37d are aligned at an equivalent interval in the circumferential direction around the rotation center line M1. The hall sensors 37a, 37b, 37c, and 37d respectively output the output signal in accordance with the magnetic field from the multiple permanent magnets 61. The hall sensors 37a, 37b, 37c, and 37d are disposed being dispersed between tip end sides of each of two teeth that correspond to the teeth 54a, 54b, . . . , and 54l.

The hall sensor 37a is disposed between the teeth 54a and 54b. The hall sensor 37b is disposed between the teeth 54d and 54e. The hall sensor 37c is disposed between the teeth 54g and 54h. The hall sensor 37d is disposed between the teeth 54j and 54k.

In the motor control system 1 of the present embodiment configured in this manner, similar to the above-described first embodiment, the control circuit 73 acquires the rotation angle of the rotation shaft 30 based on the output signals of the hall sensors 37a, 37b, 37c, and 37d, and performs the rotation control (Step 130) based on the acquired rotation angle. In parallel with this, similar to the above-described first embodiment, the control circuit 73 acquires the XY coordinates (X0, Y0) of the fan 20 and the tilt θ based on the output signal of the hall sensors 37a, 37b, 37c, and 37d, and controls the current that flows to the coils 50a, 50b, and 50c based on the acquired XY coordinates (X0, Y0) and the tilt θ. Accordingly, the electromagnetic force is generated between the multiple permanent magnets 61, and the magnetic bearing which rotatably supports the rotation shaft 30 is formed by raising up the rotation shaft 30.

According to the present embodiment described above, the magnetic bearing which rotatably supports the rotation shaft 30 centered on the rotation center line M1 is formed by generating the electromagnetic force between the coils 50a, 50b, and 50c and the multiple permanent magnets 61 and by magnetically raising up the rotation shaft 30. According to this, without using the mechanical bearing, the rotation shaft 30 can be rotatably supported by the magnetic bearing including the coils 50a, 50b, and 50c and the multiple permanent magnets 61. Therefore, similar to the above-described first embodiment, the power consumption required for supporting the rotation shaft 30 can be reduced.

In particular, the hall sensors 37a, 37b, 37c, and 37d of the present embodiment are disposed to be orthogonal to the rotation center line M1 and along the section (hereinafter, simply referred to the section) including the centroid Ga. Therefore, by controlling the current that flows to the coils 50a, 50b, and 50c, the control can be performed such that the centroid Ga in the motor control system 1 approaches the rotation center line M1. Therefore, the axis line of the rotation shaft 30 can approach the rotation center line M1 by magnetically excellently raising up the rotation shaft 30.

In the present embodiment, the multiple permanent magnets 61 achieve a role of acquiring the rotation angle of the rotation shaft 30 or the XY coordinates (X0, Y0) of the fan 20, and the tilt θ, in addition to a role of generating the rotating force of the rotation shaft 30. Therefore, compared to a case where the permanent magnet for generating the rotating force of the rotation shaft 30 and the permanent magnets 61 for acquiring the rotation angle of the rotation shaft 30 or the XY coordinates (X0, Y0) of the fan 20 and the tilt θ, are separately provided, a small size of a body frame of the motor control system 1 can be achieved.

In the present embodiment, the hall sensors 37a, 37b, 37c and 37d are disposed between the multiple permanent magnets 61 and the rotation shaft 30. The distance between the hall sensors 37a, 37b, 37c, and 37d and the rotation shaft 30 is greater than the distance between the hall sensors 37a, 37b, 37c, and 37d and the multiple permanent magnets 61.

In other words, the hall sensors 37a, 37b, 37c and 37d are disposed in the vicinity of the multiple permanent magnets 61. Therefore, the hall sensors 37a, 37b, 37c and 37d can excellently detect the magnetic flux from the multiple permanent magnets 61. Accordingly, the hall sensors 37a, 37b, 37c and 37d can detect the rotation angle or positional deviation of the rotation shaft 30 with high accuracy.

The hall sensors 37a, 37b, 37c and 37d of the present embodiment are disposed being dispersed between the tip end sides of each of two teeth that correspond to the teeth 54a, 54b, . . . , and 54l. Therefore, the body frame of the motor control system 1 can be further reduced.

First Modification Example of Fifth Embodiment

Figure 37:
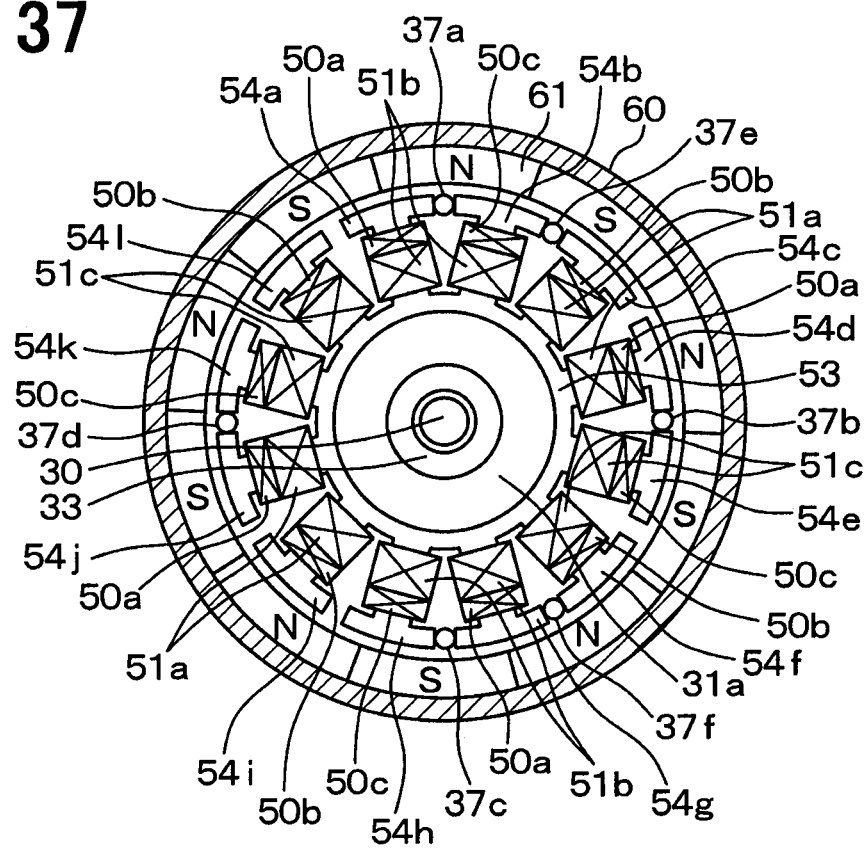
FIG. 37 is a cross-sectional view in a first modification example of the fifth embodiment of the present disclosure, and corresponds to FIG. 36.

The motor control system 1 of the first modification example is a system achieved by adding the hall sensors 37e and 37f to the motor control system 1 of the above-described first embodiment as illustrated in FIG. 37.

In the motor control system 1 of the present embodiment, the control circuit 73 calculates the XY coordinates (X0, Y0) of the fan 20 based on the output signal of the hall sensors 37a, 37b, 37c, and 37d. The control circuit 73 acquires the rotation angle of the rotation shaft 30 based on the output signal of the hall sensors 37d, 37e, and 37f.

The hall sensor 37e of the present embodiment is disposed between the tip end sides of each of the teeth 54b and 54c. The hall sensor 37e is disposed between the tip end sides of each of the teeth 54f and 54g. The hall sensor 37d is disposed between the tip end sides of each of the teeth 54j and 54k. The hall sensors 37d, 37e, and 37f are aligned at an equivalent interval in the circumferential direction around the rotation center line M1.

The hall sensors 37a, 37b, 37c, 37d, 37e, and 37f of the present embodiment are disposed to be orthogonal to the rotation center line M1 and along the section including the centroid Ga.

In the present embodiment, the hall sensors 37a, 37b, 37c, 37d, 37e, and 37f are disposed between the multiple permanent magnets 61 and the rotation shaft 30. The distance between the hall sensors 37a, 37b, 37c, 37d, 37e, and 37f and the rotation shaft 30 is greater than the distance between the hall sensors 37a, 37b, 37c, 37d, 37e, and 37f and the multiple permanent magnets 61.

In other words, the hall sensors 37a, 37b, 37c, 37d, 37e, and 37f are disposed in the vicinity of the multiple permanent magnets 61. Therefore, the hall sensors 37a, 37b, 37c, 37d, 37e, and 37f can excellently detect the magnetic flux from the multiple permanent magnets 61. Accordingly, the hall sensors 37a, 37b, 37c and 37d can detect the rotation angle or positional deviation of the rotation shaft 30 with high accuracy.

Second Modification Example of Fifth Embodiment

Figure 38:
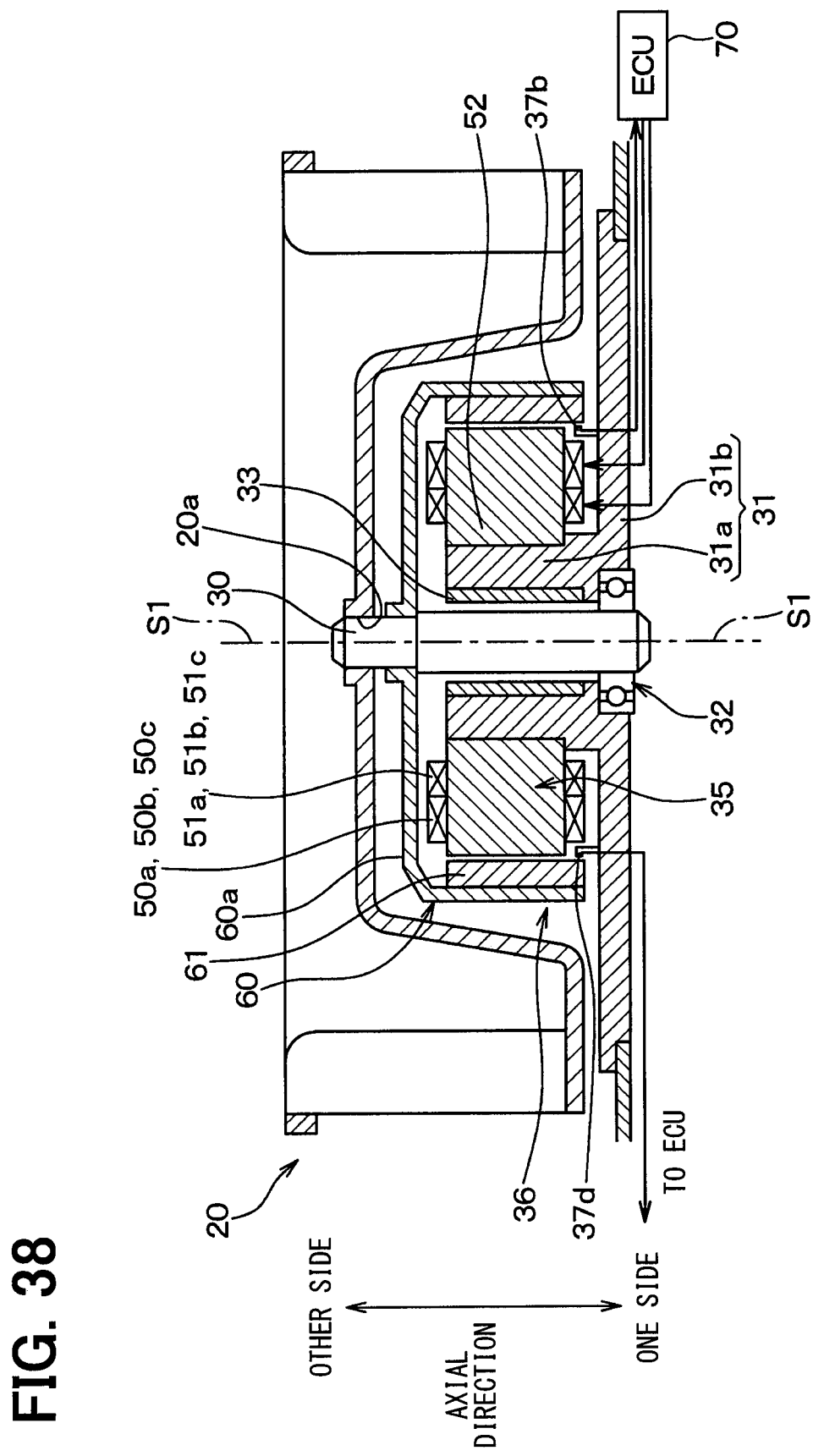
FIG. 38 is a view illustrating the entire configuration of a motor control system in a second modification example of the fifth embodiment of the present disclosure.

The motor control system 1 of the first modification example is a system achieved by adding the bearing 32 to the motor control system 1 of the above-described fifth embodiment. In FIG. 38, the entire configuration of the motor control system 1 of the first modification example is illustrated. The bearing 32 is supported by the centerpiece 31, and rotatably supports the rotation shaft 30.

Sixth Embodiment

In the above-described first embodiment, an example in which the permanent magnet 61 of the rotor 36 is disposed on the radially outer side of the stator 35 is described, but instead of this, the motor control system 1 in which the permanent magnet 61 of the rotor 36 is disposed on the other side of the stator 35 in the axis line direction will be described.

Figure 39:
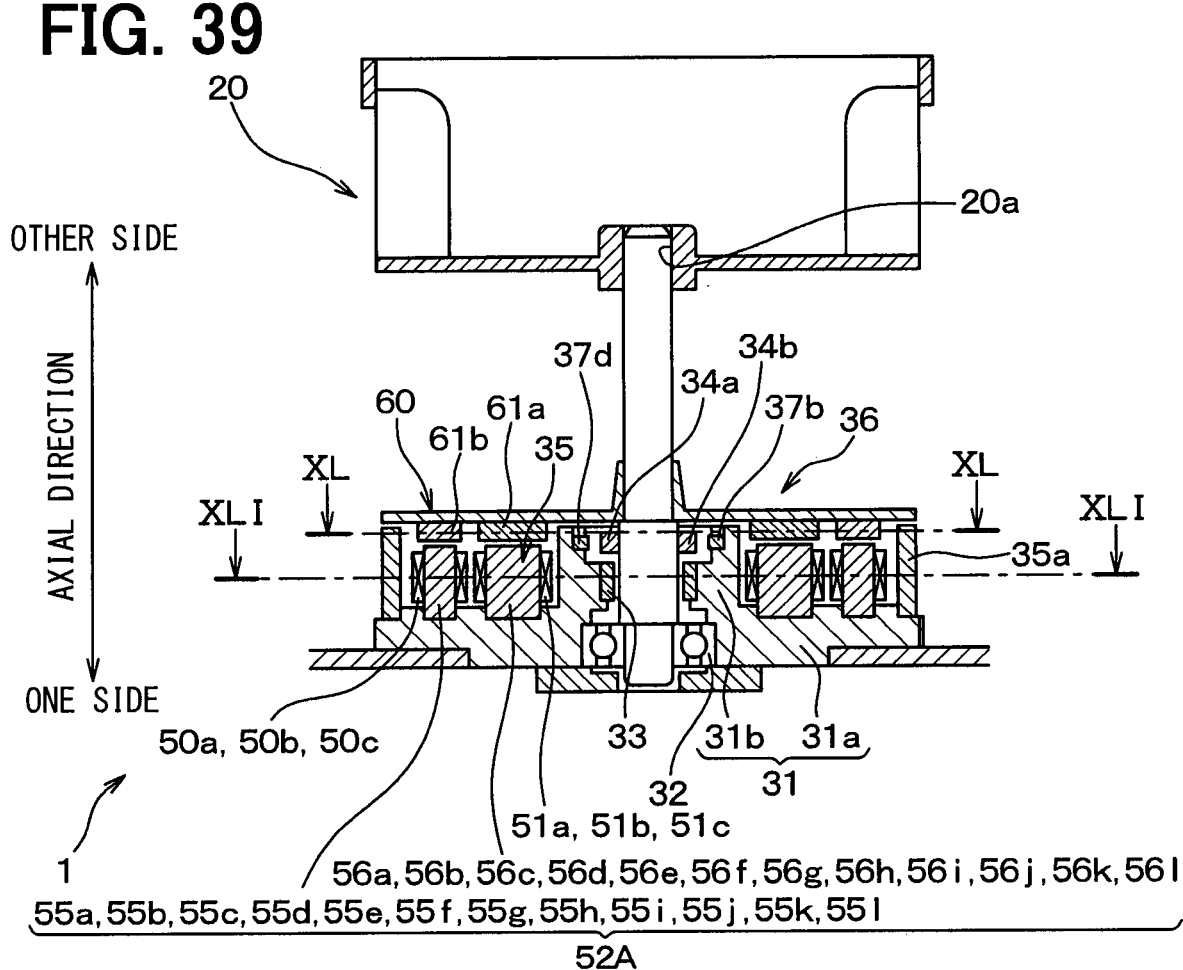
FIG. 39 is a view illustrating the entire configuration of a motor control system in a sixth embodiment of the present disclosure.
Figure 40:
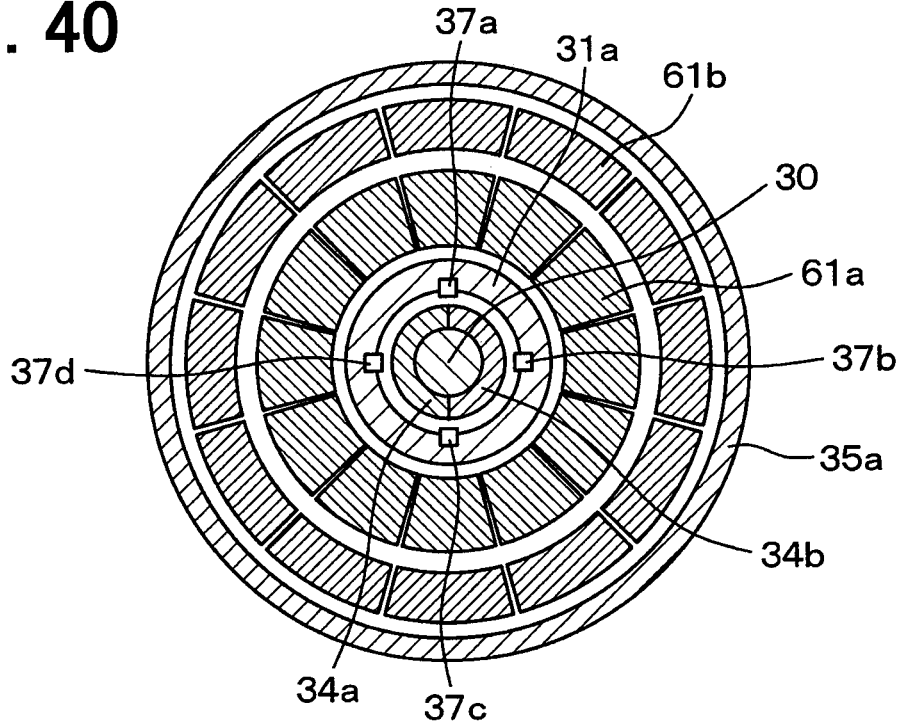
FIG. 40 is a cross-sectional view taken along a line XL-XL in FIG. 39.

In FIG. 39, the entire configuration of a sixth embodiment of the motor control system 1 of the present disclosure is illustrated. FIG. 40 is a cross-sectional view taken along a line XXXX-XXXX in FIG. 39. FIG. 40 is a cross-sectional view taken along a line XXXXI-XXXXI in FIG. 39. In FIG. 39, the same reference numerals as those of FIG. 1 indicate the same configuration elements, and the description thereof will be omitted.

In the motor control system 1 of the present embodiment, the rotor 36 includes the rotor case 60, multiple permanent magnets 61a, and multiple permanent magnets 61b.

As illustrated in FIG. 39, the rotor case 60 is formed in a disk shape around the axis line of the rotation shaft 30. The rotor case 60 supports each of the multiple permanent magnets 61a and the multiple permanent magnets 61b. The multiple permanent magnets 61a and the multiple permanent magnets 61b are employed instead of the multiple permanent magnets 61 of FIG. 1. The multiple permanent magnets 61a and the multiple permanent magnets 61b are disposed on one side in the axis line direction with respect to the rotor case 60.

The multiple permanent magnets 61a are respectively aligned in the circumferential direction around the axis line of the rotation shaft 30. The multiple permanent magnets 61b are respectively aligned in the circumferential direction around the rotation center line M1. The multiple permanent magnets 61a are disposed on the radially inner side around the axis line of the rotation shaft 30 with respect to the multiple permanent magnets 61b.

The multiple permanent magnets 61a are disposed such that each of magnetic poles is oriented to one side in the axis line direction. Regarding the magnetic poles of each of the multiple permanent magnets 61a, the multiple permanent magnets 61a are disposed such that the S pole and the N pole are alternately aligned in the circumferential direction. In the present embodiment, twelve permanent magnets 61a are disposed.

The multiple permanent magnets 61b are disposed such that each of the magnetic poles is oriented to one side in the axis line direction. Regarding the magnetic poles of each of the multiple permanent magnets 61b, the multiple permanent magnets 61b are disposed such that the S pole and the N pole are alternately aligned in the circumferential direction. In the present embodiment, twelve permanent magnets 61b are disposed.

Figure 41:
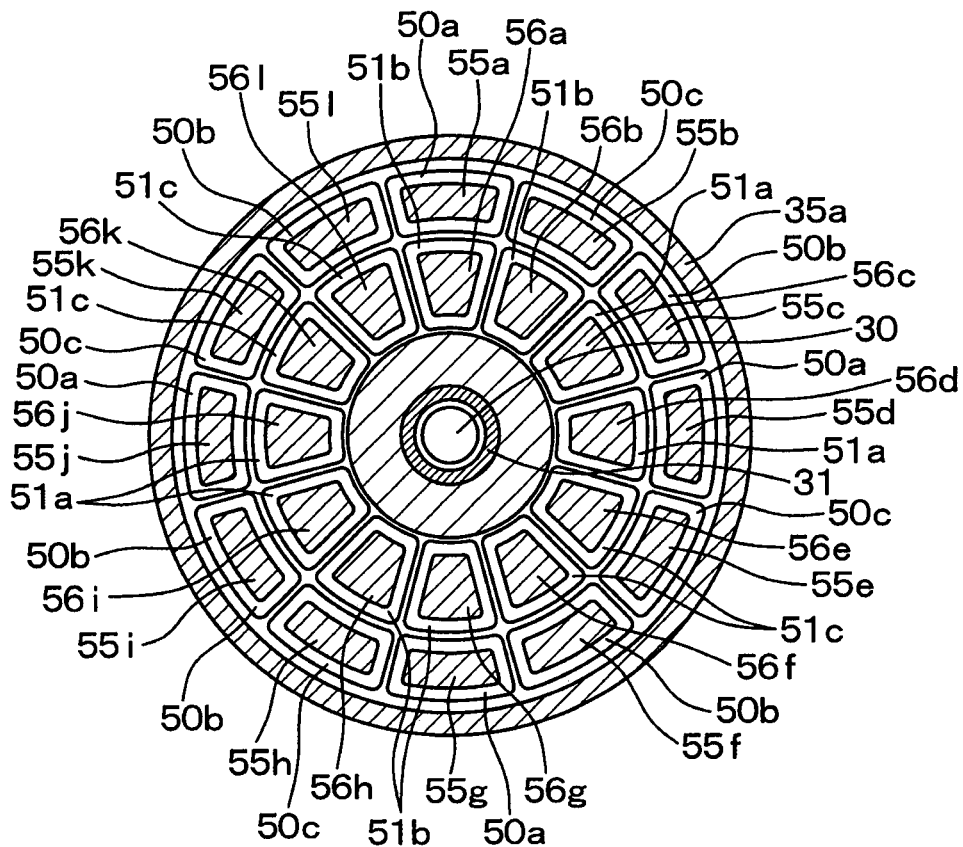
FIG. 41 is a cross-sectional view taken along line XLI-XLI in FIG. 39.

As illustrated in FIGS. 39 and 41, the stator 35 of the present embodiment includes the coils 50a, 50b, and 50c, the coils 51a, 51b, and 51c, and a stator core 52A.

The stator core 52A is employed instead of the stator core 52 of FIG. 1. The stator core 52A includes teeth 55a, 55b, 55c, 55d, 55e, 55f, 55g, 55h, 55i, 55j, 55k, and 55l, and teeth 56a, 56b, 56c, 56d, 56e, 56f, 56g, 56h, 56i, 56j, 56k, and 56l.

The teeth 56a, 56b, . . . , and 56l are first stator cores formed in a columnar shape of which each of the axis line directions is parallel to the rotation center line M1. The teeth 55a, 55b, . . . , and 55l are second stator cores which are aligned at the same interval in the circumferential direction around the rotation center line M1 of the rotation shaft 30. The teeth 56a, 56b, . . . , and 56l are disposed on the radially inner side around the axis line of the rotation shaft 30 with respect to the teeth 55a, 55b, . . . , and 55l.

On the other side in the axis line direction with respect to the teeth 55a, 55b, . . . , and 55l, the multiple permanent magnets 61b are disposed. On the other side in the axis line direction with respect to the teeth 56a, 56b, . . . , and 56l, the multiple permanent magnets 61a are disposed.

The teeth 56a, 56b, . . . , and 56l are disposed on the radially inner side with respect to the teeth 55a, 55b, . . . , and 55l. The teeth 56a, 56b, . . . , and 56l and the teeth 55a, 55b, . . . , and 55l are supported by the centerpiece 31.

In the present embodiment, the teeth 56a, 56b, . . . , and 56l allow the magnetic flux generated from the coils 51a, 51b, and 51c to pass therethrough. The teeth 55a, 55b, . . . , and 55l allow the magnetic flux generated from the coils 50a, 50b, and 50c to pass therethrough.

Here, the teeth 56a, 56b, . . . , and 56l and the teeth 55a, 55b, . . . , and 55l are configured independently from each other. Therefore, the teeth 56a, 56b, . . . , and 56l which allow the magnetic flux from the coils 51a, 51b, and 51c to pass therethrough, and the teeth 55a, 55b, . . . , and 55l which allow the magnetic flux generated from the coils 50a, 50b, and 50c to pass therethrough, are separated from each other.

The coil 51a is a U2-phase coil and is wound around the teeth 56c, 56d, 56i, and 56j as illustrated in FIG. 41. The teeth 56c and 56d and the teeth 56i and 56j are disposed being offset by 180 degrees of an angle centered on the rotation center line M1 of the rotation shaft 30.

Here, the coil 51a wound around the tooth 56c and the coil 51a wound around the tooth 56d are wound in different directions. The coil 51a wound around the tooth 56i and the coil 51a wound around the tooth 56j are wound in the different directions.

The coil 51b is a V2-phase coil and is wound around the teeth 56a, 56b, 56g, and 56h. The teeth 56a and 56b and the teeth 56g and 56h are disposed being offset by 180 degrees of an angle centered on the rotation center line M1 of the rotation shaft 30.

Here, the coil 51b wound around the tooth 56a and the coil 51b wound around the tooth 56b are wound in different directions. The coil 51b wound around the tooth 56g and the coil 51b wound around the tooth 56h are wound in different directions.

The coil 51c is a W2-phase coil and is wound around the teeth 56e, 56f, 56k, and 56l. The teeth 56e, 56f and the teeth 56k and 56l are disposed being offset by 180 degrees of an angle centered on the rotation center line M1 of the rotation shaft 30.

Here, the coil 51c wound around the tooth 56e and the coil 51c wound around the tooth 56f are wound around in different directions. The coil 51c wound around the tooth 56k and the coil 51c wound around the tooth 56l are wound in different directions.

The coil 50a is a U1-phase coil and is wound around the teeth 55a, 55d, 55g, and 55j. The teeth 55a, 55d, 55g, and 55j are aligned at the same interval in the circumferential direction around the rotation center line M1 of the rotation shaft 30.

The coil 50b is a V1-phase coil and is wound around the teeth 55c, 55f, 55i, and 55l. The teeth 55c, 55f, 55i, and 55l are aligned at the same interval in the circumferential direction around the rotation center line M1 of the rotation shaft 30.

The coil 50c is a W1-phase coil and is wound around the teeth 55b, 55e, 55h, and 55k. The teeth 55b, 55e, 55h, and 55k are aligned at the same interval in the circumferential direction around the rotation center line M1 of the rotation shaft 30.

In addition, the coil 50a forms the U1-phase coil, the coil 50b forms the V1-phase coil, and the coil 50c forms the W1-phase coil.

In the present embodiment configured in this manner, in the multiple permanent magnets 61b, the rotating force for rotating the rotation shaft 30 is generated in synchronization with the rotating magnetic field from the coils 50a, 50b, and 50c. The coils 51a, 51b, and 51c rotatably support the rotation shaft 30 t by the electromagnetic force which acts between the multiple permanent magnets 61a.

In the present embodiment, the teeth 56a, 56b, . . . , and 56l that allow the magnetic flux from the coils 51a, 51b, and 51c to pass therethrough, and the teeth 55a, 55b, . . . , and 55l that allow the magnetic flux generated from the coils 50a, 50b, and 50c to pass therethrough, are separated from each other. Therefore, in a case where the current that flows to the coils 51a, 51b, and 51c which are rotation coils having a large load torque is excessive, a situation in which the magnetic flux is saturated and the supporting force of the rotation shaft 30 deteriorates in the stator core can be avoided. Therefore, in a case where the load torque is large, stability control becomes possible and there is no case where the vibration increases.

Figure 42:
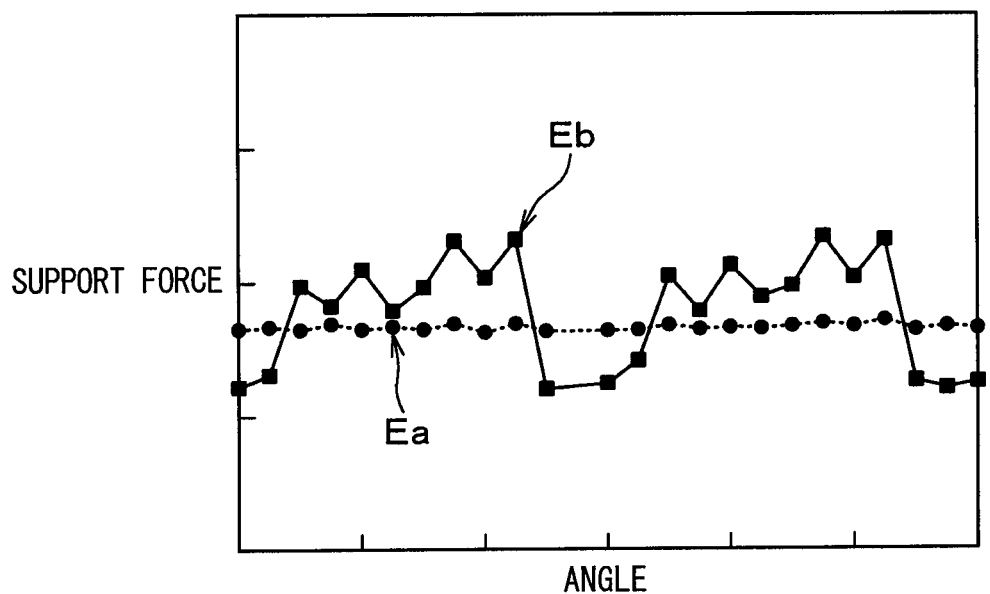
FIG. 42 is a view illustrating a fluctuation reduction effect of a supporting force in the sixth embodiment of the present disclosure.

In FIG. 42, a vertical axis is a supporting force and a horizontal axis is a rotation angle of the rotation shaft 30. Eb in FIG. 42 is a supporting force of the motor control system 1 of the present embodiment. Ea in FIG. 42 is a supporting force of a motor control system of the related art in which the coils 50a, 50b, and 50c and the coils 51a, 51b, and 51c are wound around a common stator core. As is ascertained from FIG. 42, the supporting force of the motor control system 1 of the present embodiment is stable.

In addition, the motor control system 1 of the present embodiment includes an axial gap type motor in which the stator core 52 is disposed via a void in the axis line direction of the rotation shaft 30 with respect to the multiple permanent magnets 61a and the multiple permanent magnets 61b. The coils 50a, 50b, and 50c which generate the supporting force of the rotation shaft 30 are disposed on the radially outer side with respect to the coils 51a, 51b, and 51c.

Therefore, in a case where a tilt of the rotation shaft 30 is generated by the centrifugal force by unbalance of the fan 20, at a restoring moment with respect to the inclination of the rotation shaft 30, a time span becomes long compared to that of a radial gap type motor of the related art. The time span is a distance between the rotation center line M1 and the coils 50a, 50b, and 50c. Therefore, the supporting force of the rotation shaft 30 may be small, and the supporting current that flows to the coils 50a, 50b, and 50c can be reduced. Therefore, small size of the coils 50a, 50b, and 50c can be achieved.

Furthermore, as an advantage of the axial gap type motor, it is advantageous in motor flattening for making it possible to shorten the length in the axis line direction of the rotation shaft 30, and in a case of being used in an air blower, a degree of freedom of layout increases and it is advantageous in reducing the size of the entire device.

Seventh Embodiment

In the motor control system 1 of the seventh embodiment, in the motor control system 1 of the above-described first embodiment, an example in which the current flows to the coils 50a, 50b, and 50c is independently controlled is described.

Figure 43:
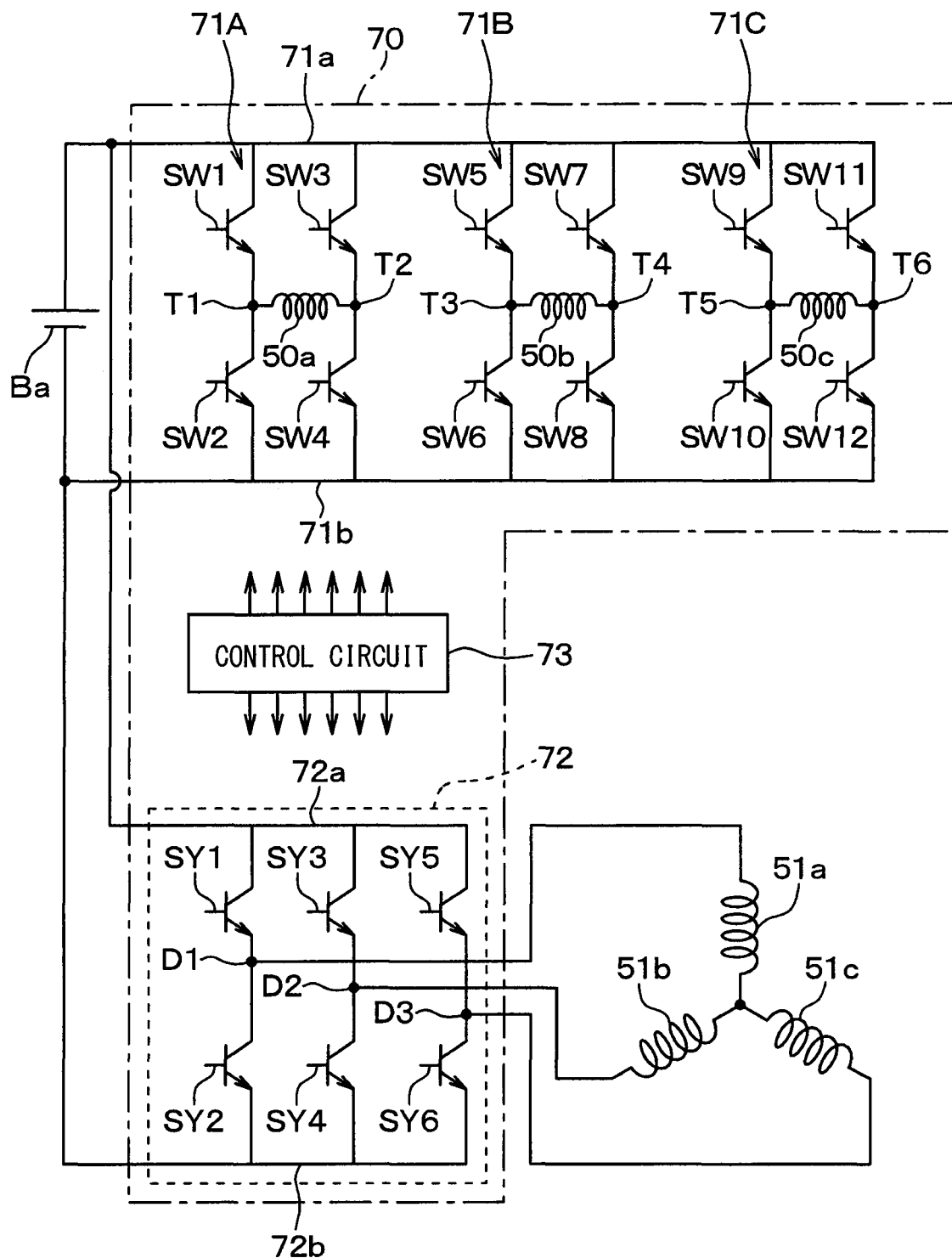
FIG. 43 is a view illustrating the entire configuration of an electronic control device in a seventh embodiment of the present disclosure.

In FIG. 43, the entire configuration of the electronic control device 70 of the present embodiment is illustrated. In FIG. 43, the same reference numerals as those of FIG. 8 indicate the same configuration elements.

The electronic control device 70 of the present embodiment includes inverter circuits 71A, 71B, and 71C instead of the inverter circuit 71 in the electronic control device 70 of the above-described first embodiment.

The inverter circuit 71A is a bridge circuit including the transistors SW1, SW2, SW3, and SW4. The coil 50a connects the common connection terminal T1 of the transistors SW1 and SW2 and the common connection terminal T2 of the transistors SW3 and SW4 to each other.

The inverter circuit 718 is a bridge circuit including the transistors SW5, SW6, SW7, and SW8. The coil 50b connects the common connection terminal T3 of the transistors SW5 and SW6 and a common connection terminal T4 of the transistors SW7 and SW8 to each other.

The inverter circuit 71C is a bridge circuit including transistors SW9, SW10, SW11, and SW12. The coil 50c connects a common connection terminal T5 of the transistors SW9 and SW10 and a common connection terminal T6 of the transistors SW11 and SW12.

The control circuit 73 controls a current value that flows to the coil 50a and orientation of the current that flows to the coil 50a by controlling the transistors SW1, SW2, SW3, and SW4.

The control circuit 73 controls a current value that flows to the coil 50*b* and orientation of the current that flows to the coil 50*b* by controlling the transistors SW5, SW6, SW7, and SW8.

The control circuit 73 controls a current value that flows to the coil 50*c* and orientation of the current that flows to the coil 50*c* by controlling the transistors SW9, SW10, SW11, and SW12.

In this manner, as the control circuit 73 controls the transistors SW1, SW2, . . . , and SW11, and SW12, the control circuit 73 controls the current that flows to the coils 50*a*, 50*b*, and 50*c* independently for each coil.

Figure 44:
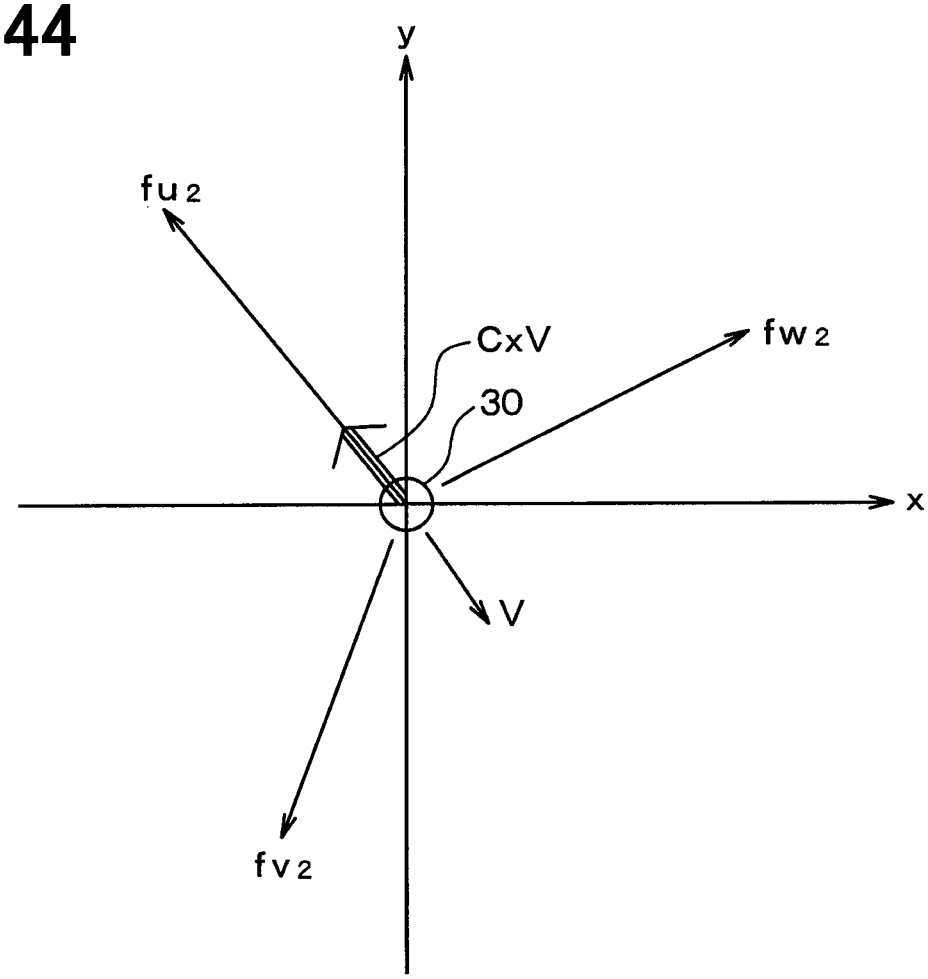
FIG. 44 is a view illustrating an electromagnetic force between a tilt-control coil and multiple permanent magnets in the seventh embodiment.

Above, the electromagnetic force between the coil 50*a* and the multiple permanent magnets 61 is set to be an electromagnetic force fu2 (refer to FIG. 44), the electromagnetic force between the coil 50*b* and the multiple permanent magnets 61 is set to be an electromagnetic force fv2, and the electromagnetic force between the coil 50*c* and the multiple permanent magnets 61 is set to be an electromagnetic force fw2. At this time, the electromagnetic force fu2, the electromagnetic force fv2, and the electromagnetic force fw2 can be controlled independently.

Figure 45:
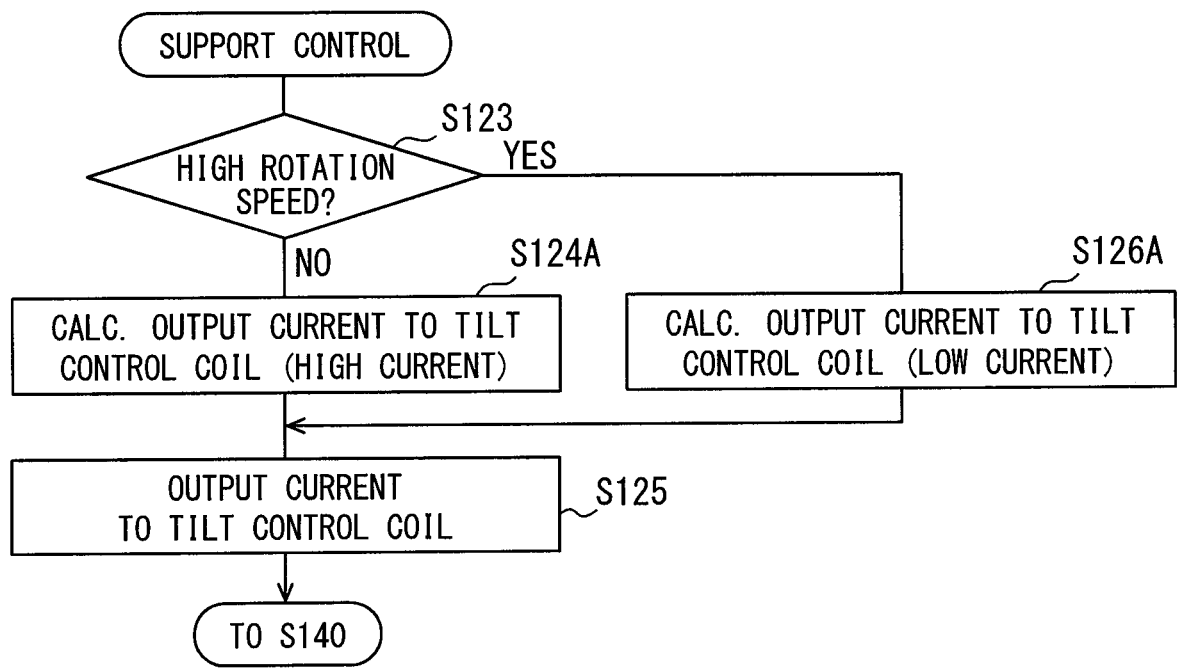
FIG. 45 is a flowchart illustrating a supporting control by the electronic control device in the seventh embodiment.

In the present embodiment configured in this manner, the supporting control (Step 120) of the control circuit 73 can be realized as follows. Hereinafter, the supporting control (Step 120) of the present embodiment will be described. FIG. 45 is a flowchart specifically illustrating the supporting control of the control circuit 73.

First, in Step 123, it is determined whether or not the rotational speed of the rotation shaft 30 is a high speed.

Specifically, the rotational speed of the rotation shaft 30 is calculated based on the difference (Ha−Hc) between the output signal Ha of the hall sensor 37*a* and the output signal Hc of the hall sensor 37*c*. It is determined whether or not the calculated rotational speed (hereinafter, referred to as a calculated rotational speed NS) is equal to or higher than a predetermined speed.

When the calculated rotational speed NS is equal to or higher than the predetermined speed, YES which means that the rotational speed of the rotation shaft 30 is a high speed is determined in Step 123. In this case, in order to generate the restoring force Fb for preventing the rotation shaft 30 from being inclined from the rotation center line 51 between the coils 50*a*, 50*b*, and 50*c* and the multiple permanent magnets 61, the current to be output to the coils 50*a*, 50*b*, and 50*c* is calculated (Step 126A).

Meanwhile, when the calculated rotational speed NS is lower than the predetermined speed, NO which means that the rotational speed of the rotation shaft 30 is a low speed is determined in Step 123. In this case, in order to generate the restoring force Fb for preventing the rotation shaft 30 from being inclined from the rotation center line 51 between the coils 50*a*, 50*b*, and 50*c* and the multiple permanent magnets 61, the current to be output to the coils 50*a*, 50*b*, and 50*c* is calculated (Step 124A).

In this manner, in order to output the current calculated in Steps 124A and 126A to the coil, the transistors SW1, SW2, . . . , and SW12 are controlled. Accordingly, the current is output to the coils 50*a*, 50*b*, and 50*c* from the inverter circuits 71A, 71B, and 71C (Step 125). Therefore, the electromagnetic force which is an attracting force is generated between the coils 50*a*, 50*b*, and 50*c* and the multiple permanent magnets 61.

In the above-described Steps 124A and 126A, the same current value flows to each of the coils 50*a*, 50*b*, and 50*c* by the inverter circuits 71A, 71B, and 71C. Therefore, the magnitude of the electromagnetic force fu2, the magnitude of the electromagnetic force fv2, and the magnitude of the electromagnetic force fw2 are the same as each other.

At this time, the direction of the electromagnetic force fu2, the direction of the electromagnetic force fv2, and the direction of the electromagnetic force fw2 are aligned at the same interval in the circumferential direction around the rotation center of the rotation shaft 30. Therefore, the electromagnetic force fu2, the electromagnetic force fv2, and the electromagnetic force fw2 are reduced. Therefore, in a state where an axis line S2 of the rotation shaft 30 matches the rotation center line S1, the rotation shaft 30 rotates.

At this time, by the disturbance, in a case where the axis line S2 of the rotation shaft 30 is inclined from the rotation center line S1 of the rotation shaft 30 using the bearing 32 side in the rotation shaft 30 as a fulcrum, the restoring force Fb determined from "V×C" is generated when the speed of the rotation shaft 30 in the direction in which the rotation shaft 30 is inclined from the rotation center line S1 is set to be V and the attenuation coefficient is set to be C. Accordingly, even when the disturbance is generated, the axis line S2 of the rotation shaft 30 is prevented from being inclined from the rotation center line S1 of the rotation shaft 30.

Here, as the rotational speed of the rotation shaft 30 increases, the restoring force Fb necessary for the axis line S2 of the rotation shaft 30 to approach the rotation center line S1 decreases. In other words, when the rotation shaft 30 rotates at a high speed, the above-described necessary restoring force Fb becomes small compared to that when the rotation shaft 30 rotates at a low speed.

Here, when YES which means that the rotation shaft 30 rotates at a high speed is determined in Step 123, the current to be output to the coils 50*a*, 50*b*, and 50*c* decreases (Step 126A). Meanwhile, when NO which means that the rotation shaft 30 rotates at a low speed is determined in Step 123, the current to be output to the coils 50*a*, 50*b*, and 50*c* increases (Step 124A). In other words, when the rotation shaft 30 rotates at a high speed, the current that flows to the coils 50*a*, 50*b*, and 50*c* can become small compared to that when the rotation shaft 30 rotates at a low speed. Accordingly, when the rotation shaft 30 rotates at a high speed, the attenuation coefficient C which regulates the restoring force Fb (=V×C) can be small compared to that when the rotation shaft 30 rotates at a low speed.

According to the present embodiment described above, the electronic control device 70 controls the inverter circuits 71A, 71B, and 71C, and outputs the same current value to the coils 50*a*, 50*b*, and 50*c* from the inverter circuits 71A, 71B, and 71C. Therefore, the restoring force Fb determined from "V×C" can be generated between the multiple permanent magnets 61 and the coils 50*a*, 50*b*, and 50*c* when the speed in the direction in which the rotation shaft 30 is inclined from the rotation center line 51 is set to be V and the attenuation coefficient is set to be C. Accordingly, even when the disturbance is generated, the axis line S2 of the rotation shaft 30 is prevented from being inclined from the rotation center line 51 of the rotation shaft 30.

Above, the rotation shaft 30 is rotatably supported from the magnetic bearing including the multiple permanent magnets 61 and the coils 50*a*, 50*b*, and 50*c* and the bearing 32. Accordingly, one magnetic bearing is used for supporting the rotation shaft 30. Therefore, the power consumption for supporting the rotation shaft 30 can be reduced.

In the present embodiment, when the rotation shaft 30 rotates at a high speed, the current output to the coils 50*a*, 50*b*, and 50*c* from the inverter circuits 71A, 71B, and 71C becomes small compared to that when the rotation shaft 30 rotates at a low speed. Therefore, when the rotation shaft 30 rotates at a high speed, the restoring force Fb becomes small compared to that when the rotation shaft 30 rotates at a low speed. Therefore, since the restoring force Fb is generated, the power consumed by the coils 50*a*, 50*b*, and 50*c* can be reduced.

Other Embodiments (1) When realizing the present disclosure, the above-described first and second embodiments may be combined and realized. In other words, the supporting control processing of Step 120 in the above-described first embodiment and the supporting control processing of Step 120 in the above-described second embodiment are performed in parallel. Therefore, as the electronic control device 70 controls the current that flows to the coils 50*a*, 50*b*, and 50*c*, the supporting force Fa for the axis line M2 of the rotation shaft 30 to approach the rotation center line M1 and the restoring force Fb (=L×V×C) for moving the rotation shaft 30 in the rotation direction, are generated.

At this time, when the rotation shaft 30 rotates at a high speed, the supporting force Fa becomes small compared to those when the rotation shaft 30 rotates at a low speed. In addition to this, when the rotation shaft 30 rotates at a high speed, the attenuation coefficient C becomes small and the current that flows to the coils 50*a*, 50*b*, and 50*c* becomes small compared to that when the rotation shaft 30 rotates at a low speed. In other words, both of the supporting force Fa and the attenuation coefficient C (that is, the restoring force Fb) are switched by the rotational speed of the rotation shaft 30.

(2) In the above-described third embodiment, an example in which the bearing 32 supports the centroid side of the rotating body in the rotation shaft 30 is described, but instead of this, in the above-described first and second embodiments, the bearing 32 may support the centroid side of the rotating body in the rotation shaft 30.

(3) In the above-described first to fourth embodiments and the first to fourth modification examples, an example in which a synchronization type three-phase AC motor is configured as the electric motor 10 of the present disclosure is described, but instead of this, an induction type electric moor or a DC motor may be employed as the electric motor 10 of the present disclosure.

(4) In the above-described first to fourth embodiments and the first to fourth modification examples, an example in which rolling bearing is used as the bearing 32 which is a mechanical bearing is described, but instead of this, a plain bearing and a fluid bearing may be used as the bearing 32. The plain bearing is a bearing which receives a shaft on a sliding surface. The fluid bearing is a bearing supported by liquid or gas.

(5) In the above-described first to fourth embodiments and the first to fourth modification examples, an example in which the permanent magnet 61 is disposed on the rotation shaft 30 side and the coils 50*a*, 50*b*, and 50*c* and the coils 51*a*, 51*b*, and 51*c* are disposed on the centerpiece 31 side is described, but instead of this, the following may be employed.

In other words, the permanent magnet 61 is disposed on the centerpiece 31 side, and the coils 50*a*, 50*b*, and 50*c* and the coils 51*a*, 51*b*, and 51*c* may be disposed on the rotation shaft 30 side.

(6) In the above-described first to fourth embodiments and the first to fourth modification examples, an example in which the common permanent magnet 30 is used as the permanent magnet for generating the rotating force by the coils 51*a*, 51*b*, and 51*c* to the rotor 36 and the permanent magnet for generating the supporting force or the restoring force by the coils 50*a*, 50*b*, and 50*c* to the rotation shaft 30, is described, but instead of this, the following may be employed. In other words, the permanent magnet for generating the rotating force by the coils 51*a*, 51*b*, and 51*c* to the rotor 36 and the permanent magnet for generating the supporting force or the restoring force by the coils 50*a*, 50*b*, and 50*c* to the rotation shaft 30 may be respectively and independently provided.

(7) In the above-described first to fourth embodiments and the first to fourth modification examples, an example in which the coils 50*a*, 50*b*, and 50*c* are connected to each other by a star-connection, but instead of this, the coils 50*a*, 50*b*, and 50*c* may be connected to each other by a delta-connection.

Otherwise, the coils 50*a*, 50*b*, and 50*c* may be connected to each other such that the current that flows to the coils independently for each coil with respect to the coils 50*a*, 50*b*, and 50*c* from the DC power supply Ba is controlled.

(8) In the above-described first to fourth embodiments and the first to fourth modification examples, an example in which the coils 51*a*, 51*b*, and 51*c* are connected to each other by a star-connection is described, but instead of this, the coils 51*a*, 51*b*, and 51*c* may be connected to each other by a delta-connection.

(9) In the above-described first to fourth embodiments and the first to fourth modification examples, an example in which the rotational speed or the rotation angle of the rotation shaft 30 is acquired by the hall sensors 37*a*, 37*b*, 37*c*, and 37*d* is described, but instead of this, the following may be employed. (a) A sensor (for example, optical encoder) for acquiring the rotational speed or the rotation angle of the rotation shaft 30 is provided in addition to the hall sensors 37*a*, 37*b*, 37*c*, and 37*d*. (b) By detecting the three-phase AC current I that flows to the coils 51*a*, 51*b*, and 51*c* from the inverter circuit 72 and the output voltage V to the inverter circuit 72 from the DC power supply Ba, the rotation angle or the rotational speed of the rotation shaft 30 may be acquired based on a three-phase AC current I and an output voltage V which are detected.

(10) In the above-described first to fourth embodiments and the first to fourth modification examples, an example in which the tilt angle θ of the rotation shaft 30 with respect to the rotation center line M1, the XY coordinates of the end portion (that is, fan 20) on the other side of the rotation shaft 30 in the axis line direction, and the rotation angle of the rotation shaft 30 are detected by the hall sensors 37*a*, 37*b*, 37*c*, and 37*d* and the permanent magnets 34*a* and 34*b* is described, but instead of this, the following may be employed.

In other words, the tilt angle θ of the rotation shaft 30 with respect to the rotation center line M1 and the XY coordinates of the end portion on the other side of the rotation shaft 30 in the axis line direction are detected by the hall sensors 37*a*, 37*b*, 37*c*, and 37*d* and the permanent magnets 34*a* and 34*b*.

Furthermore, the rotation angle of the rotation shaft 30 may be detected by the other rotation sensor in addition to the hall sensors 37*a*, 37*b*, 37*c*, and 37*d* and the permanent magnets 34*a* and 34*b*. In the case, another rotation sensor may be disposed on the bearing 32 side in the rotation shaft 3.

(11) In the above-described first to fourth embodiments and the first to fourth modification examples, an example in which the rotational speed of the rotation shaft 30 is calculated based on the difference (Ha−Hc) between the output signal Ha of the hall sensor 37a and the output signal Hc of the hall sensor 37c is described but instead of this, the following may be employed.

In other words, the rotational speed of the rotation shaft 30 may be calculated from the change of the XY coordinates (X0, Y0) with respect to the time by acquiring the XY coordinates (X0, Y0) of the fan 20 based on the output signal from the hall sensors 37a, 37b, 37c, and 37d.

(12) In the above-described fourth embodiment, an example in which the supporting force Fa for the axis line M2 of the rotation shaft 30 to approach the rotation center line M1 is generated as the electromagnetic force between the multiple permanent magnets 61 and the coils 50a, 50b, and 50c is described, but instead of this, the following (a) and (b) may be employed.

(a) In the above-described fourth embodiment, the supporting control processing of Step 120 in the above-described second embodiment is realized. Therefore, the electromagnetic force which is not the supporting force Fa but the restoring force Fb for moving the rotation shaft 30 (that is, fan 20) in the rotation direction of the fan 20 is generated.

Similarly, in the above-described first to fourth modification examples, the supporting control processing of Step 120 in the above-described second embodiment is realized.

(b) In the above-described fourth embodiment, the supporting control processing of Step 120 in the above-described first embodiment and the supporting control processing of Step 120 in the above-described second embodiment are performed in parallel. Therefore, the rotation shaft 30 (that is, fan 20) generates both of the supporting force Fa and the restoring force Fb. In other words, both of the supporting force Fa and the attenuation coefficient C (that is, the restoring force Fb) are switched by the rotational speed of the rotation shaft 30.

Similarly, in the above-described first to fourth modification examples, the supporting control processing of Step 120 in the above-described first embodiment and the supporting control processing of Step 120 in the above-described second embodiment are performed in parallel.

(13) When realizing the present disclosure, in the motor control system 1 of the above-described third embodiment, the supporting control processing of Step 120 in the above-described first embodiment is performed.

(14) When realizing the present disclosure, in the motor control system 1 of the above-described third embodiment, the supporting control processing of Step 120 in the above-described second embodiment is performed.

(15) When realizing the present disclosure, in the motor control system 1 of the above-described third embodiment, the supporting control processing of Step 120 in the above-described first embodiment and the supporting control processing of Step 120 in the above-described second embodiment are performed in parallel.

(16) In the above-described seventh embodiment, an example in which the current that flows to the coils 50a, 50b, and 50c is independently controlled in the motor control system 1 of the above-described first embodiment is described, but in the above-described second to sixth motor control systems 1, the current that flows to the coils 50a, 50b, and 50c may be independently controlled.

(17) In the above-described seventh embodiment, an example in which the teeth 55a to 55l, and 56a to 56l, the coils 50a, 50b, 50c, 51a, 51b, and 51c, and the permanent magnets 61a and 61b include twelve poles and twelve slots is described, but instead of this, the following may be employed.

Figure 46:
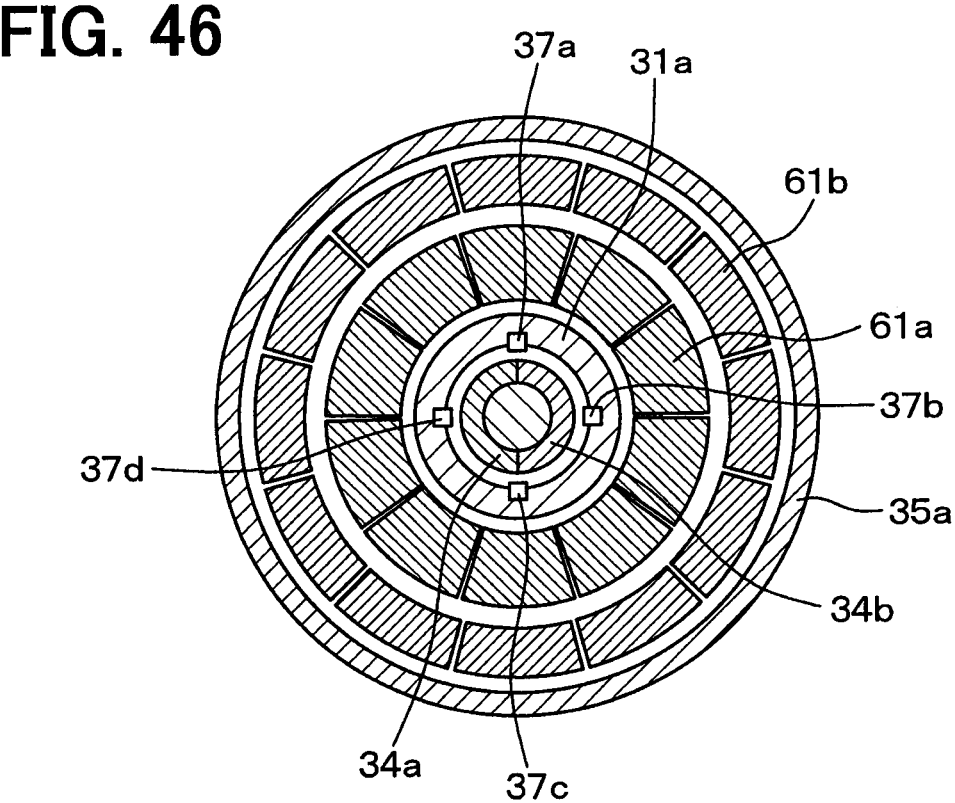
FIG. 46 is a cross-sectional view which corresponds to FIG. 40 in another embodiment of the present disclosure.
Figure 47:
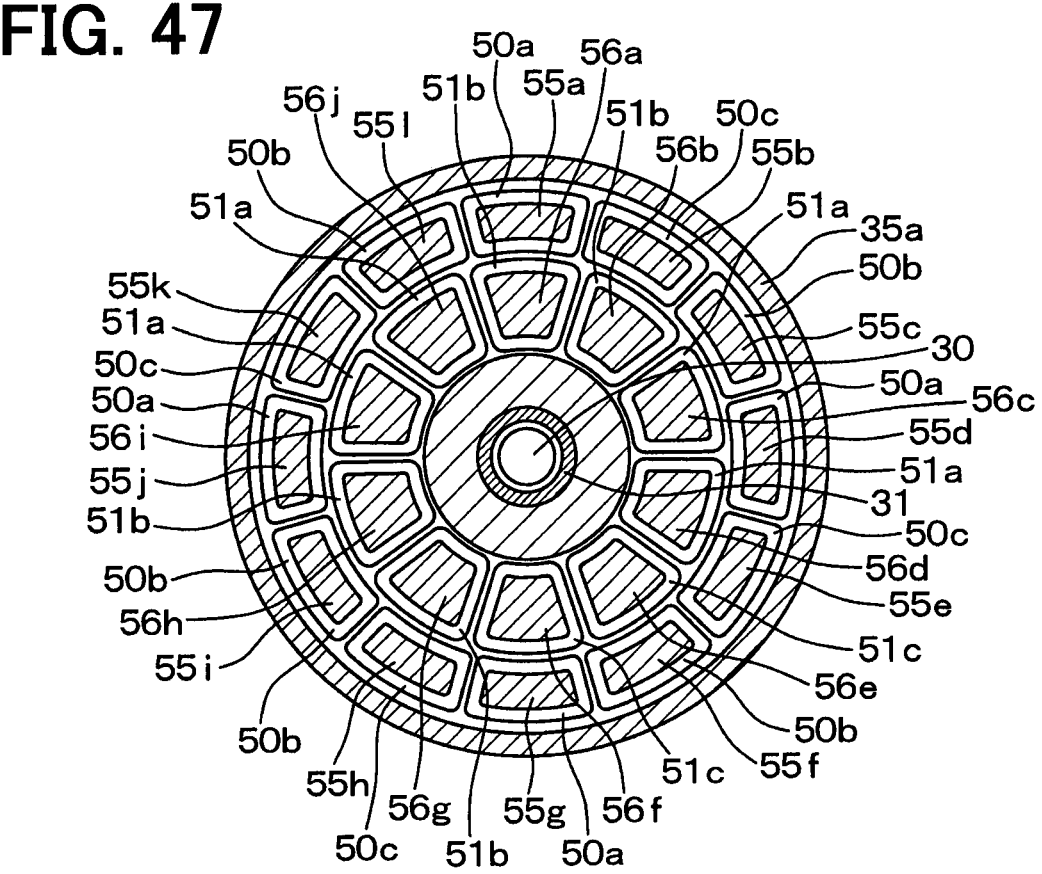
FIG. 47 is a cross-sectional view which corresponds to FIG. 41 in another embodiment.

In other words, as illustrated in FIGS. 46 and 47, the teeth 55a to 55l, the coils 50a, 50b, and 50c, and the permanent magnet 61b may include twelve poles and twelve slots, and the teeth 56a to 56j, the coils 51a, 51b, and 51c, and the permanent magnet 61a may include ten poles and ten slots.

According to this, the number of poles of the coils 50a, 50b, and 50c which are tilt-control coils that generate the supporting force of the rotation shaft 30, and the number of poles of the coils 51a, 51b, and 51c which are rotation-driving coils that generate the rotating magnetic field for rotating the rotor 36, are different from each other.

In addition, twelve poles mean that there are twelve magnetic poles of the coil or magnetic poles of the permanent magnet. The slot means a void between two adjacent teeth in multiple teeth. The twelve slots mean that the stator core is set to have twelve slots.

Accordingly, the phase of vibration of the teeth around which the coils 50a, 50b, and 50c are wound and the phase of vibration of the teeth around which the coils 51a, 51b, and 51c are wound are shifted, overlap of vibration peak of high-order components can be avoided, and thus, the torque variation and magnetic sound can be reduced.

In addition, not being limited to a case where the number of poles of the coils 50a, 50b, and 50c becomes large compared to the number of poles of the coils 51a, 51b, and 51c, the number of poles of the coils 50a, 50b, and 50c may become small compared to the number of poles of the coils 51a, 51b, and 51c.

Next, a correspondence relationship between the configuration elements of the above-described first to fourth embodiments and the present disclosure will be described.

First, Step 120 corresponds to a rotation shaft control unit, Steps 124, 125, and 126 correspond to a first current control unit, Step 123 corresponds to a determination unit, and Steps 124A, 125, and 126A include a second current control unit.

Eighth Embodiment

Figure 48:
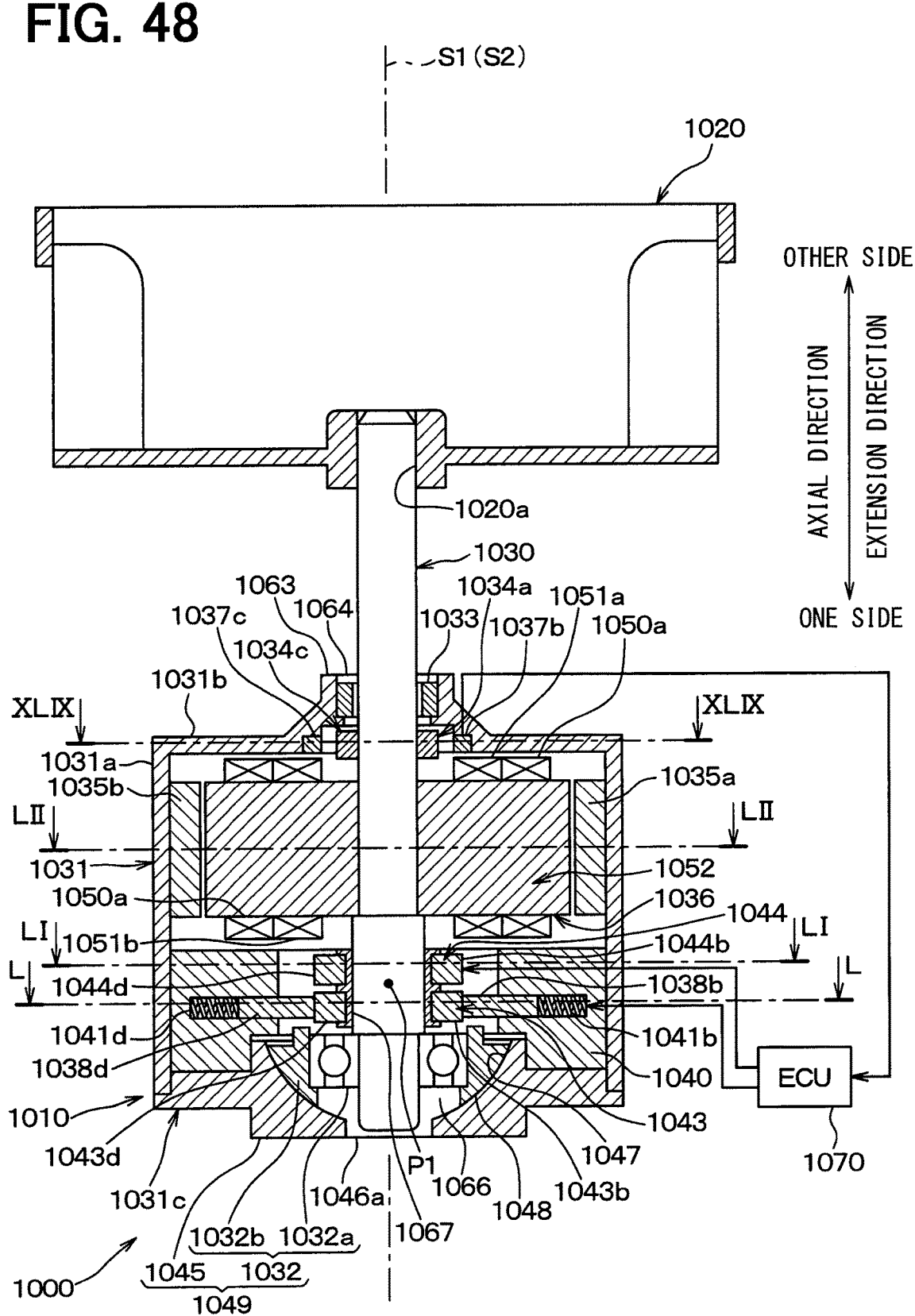
FIG. 48 is a view illustrating the entire configuration of a motor control system in an eighth embodiment of the present disclosure.

In FIG. 48, the entire configuration of an eighth embodiment of a motor control system 1000 of the present disclosure is illustrated.

As illustrated in FIG. 48, the motor control system 1000 of the present embodiment includes an electric motor 1010 and a fan 1020.

Figure 49:
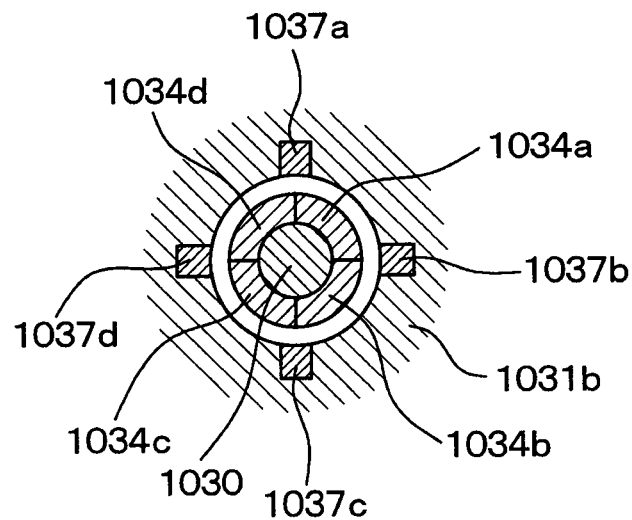
FIG. 49 is a cross-sectional view taken along a line XLIX-XLIX in FIG. 48.
Figure 52:
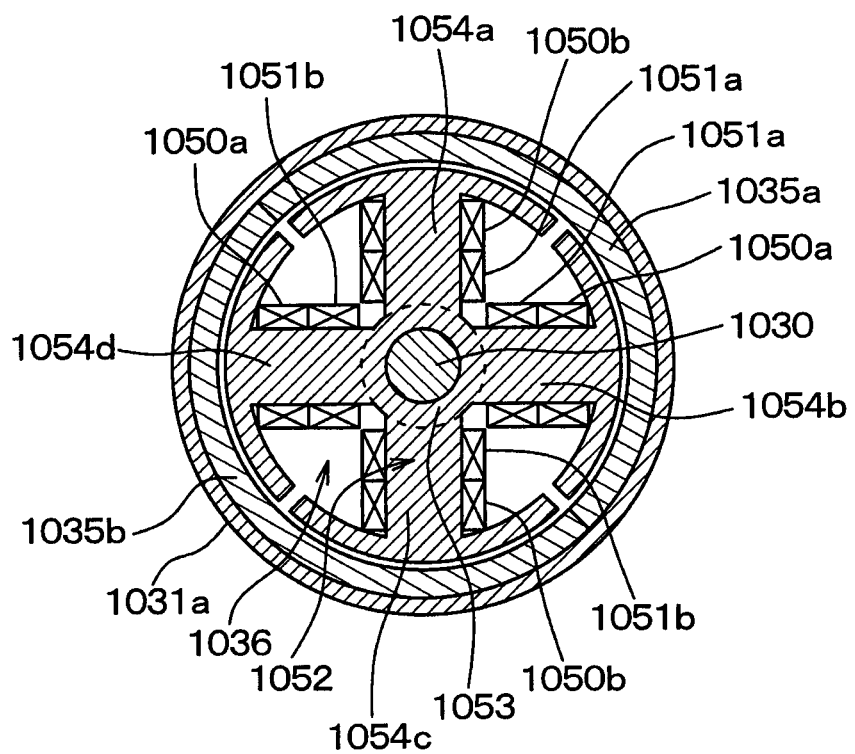
FIG. 52 is a cross-sectional view taken along a line LII-LII in FIG. 48.

As illustrated in FIGS. 48, 49, and 52, the electric motor 1010 includes a rotation shaft 1030, a stator 1031, a bearing main body 1032a, a pressing portion 1033, permanent magnets 1035a and 1035b, and an armature 1036.

In the electric motor 1010, as illustrated in FIGS. 48 and 49, the permanent magnets 1034a, 1034b, 1034c, and 1034d, and hall sensors 1037a, 1037b, 1037c, and 1037d, are provided.

Figure 50:
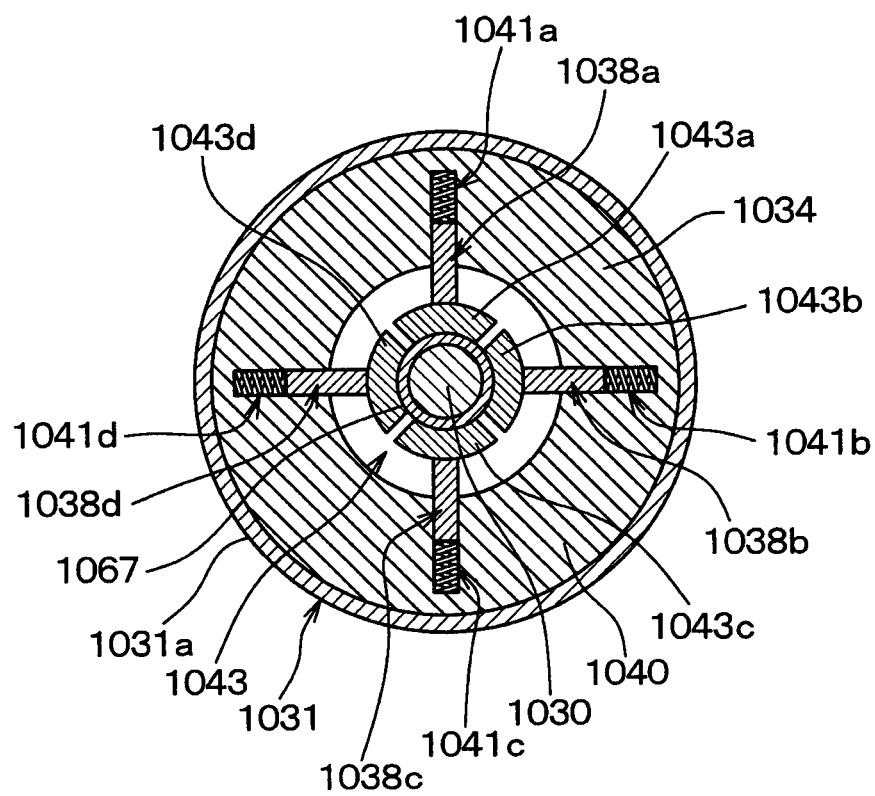
FIG. 50 is a cross-sectional view taken along a line L-L in FIG. 48.
Figure 51:
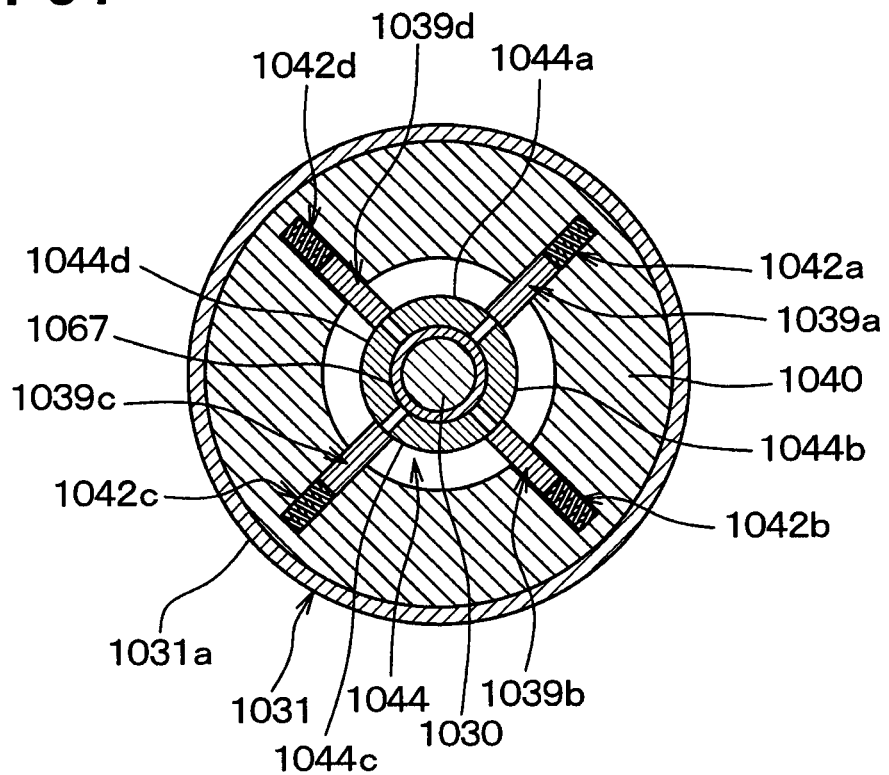
FIG. 51 is a cross-sectional view taken along a line LI-LI in FIG. 48.

As illustrated in FIGS. 50 and 51, the electric motor 1010 includes brushes 1038a, 1038b, 1038c, 1038d, 1039a, 1039b, 1039c, and 1039d, a brush holder 1040, springs 1041a, 1041b, 1041c, 1041d, 1042a, 1042b, 1042c, and 1042d, and commutators 1043 and 1044.

The rotation shaft 1030 of FIG. 48 is a rotation shaft that outputs a rotating force of the armature 1036 to the fan 1020. In the fan 1020, as the end portion on the other side of the rotation shaft 1030 in the axis line direction is fitted to a hole portion 1020a thereof, the rotation shaft 1030 is linked to the fan 1020. In the present embodiment, as the fan 1020, for example, a centrifugal fan is used.

In addition, in FIG. 48, one side in the axial direction is a lower side in the drawing, and the other side in the axial direction is an upper side in the drawing.

The stator 1031 forms a stator together with the permanent magnets 1035a and 1035b. The axis line of the stator 1031 is formed to match the rotation center line S1 of the rotation shaft 1030. The stator 1031 is a housing body including a tubular portion 1031a, a lid portion 1031b, and a bottom portion 1031c. The tubular portion 1031a is formed in a shape of a tube around the rotation center line S1 of the rotation shaft 1030. In a hollow portion of the tubular portion 1031a, the armature 1036, the permanent magnets 1034a, 1034b, 1034c, and 1034d, the permanent magnets 1035a and 1035b, the brushes 1038a, 1038b, 1038c, 1038d, 1039a, 1039b, 1039c, and 1039d, the brush holder 1040, and the springs 1041a, 1041b, . . . , and 1042d, are accommodated.

As illustrated in FIG. 52, the permanent magnets 1035a and 1035b are disposed between the inner peripheral surface of the tubular portion 1031a and the armature 1036. The permanent magnets 1035a and 1035b are fixed on an inner peripheral surface of the tubular portion 1031a. The permanent magnets 1035a and 1035b are formed in a shape of a fan from the axial direction. The permanent magnets 1035a and 1035b are respectively provided with the magnetic poles toward the radially inner side. A magnetic pole of one of the permanent magnets 1035a and 1035b becomes an S pole, and a magnetic pole of the other permanent magnet becomes an N pole.

The lid portion 1031b of FIG. 48 is formed to block the other side in the axial direction of the tubular portion 1031a. On the axis line side in the lid portion 1031b, a protrusion 1063 which is projected toward the other side in the axial direction is provided. In the protrusion 1063, a through hole 1064 which penetrates in the axial direction is provided. The rotation shaft 1030 penetrates the through hole 1064.

The bottom portion 1031c is formed to block one side in the axial direction of the tubular portion 1031a. On the axis line side in the bottom portion 1031c, a rotation shaft supporting member 1045 that supports the bearing main body 1032a which will be described later is provided.

The rotation shaft supporting member 1045 includes a through hole 1066 which is formed in an annular shape around the rotation center line S1 and penetrates in the extension direction of the rotation center line S1. The through hole 1066 is formed such that the axis line thereof matches the rotation center line S1. In the through hole 1066, one side in the axial direction of the rotation shaft 1030 is located. The through hole 1066 includes an opening portion (hereinafter, referred to as a lower opening portion 1046a) which is open on one side in the extension direction of the rotation center line S1, and an opening portion (hereinafter, referred to as an upper opening portion) which opens on the other side in the extension direction of the rotation center line S1.

In addition, the extension direction of the rotation center line S1 is the direction in which the rotation center line S1 extends. One side in the extension direction of the rotation center line S1 is a lower side in FIG. 48, and the other side in the extension direction of the rotation center line S1 is a lower side in FIG. 48.

Between the upper opening portion and the lower opening portion 1046a in the rotation shaft supporting member 1045, an inner peripheral surface 1047 including the through hole 1066 is provided. The inner peripheral surface 1047 is formed in an annular shape around the rotation center line S1, and slidably supports the bearing main body 1032a which will be described later. In the inner peripheral surface 1047, the section including the rotation center line S1 is formed in an arc shape around a fulcrum P1 which will be described later.

The fulcrum P1 is located on the other side in the axial direction with respect to the bearing main body 1032a in the axis line of the rotation shaft 1030.

The bearing main body 1032a is a mechanical bearing which rotatably supports one side of the rotation shaft 1030 in the axis line direction. The bearing main body 1032a is disposed on the inner side of the through hole 1066 of the rotation shaft supporting member 1045. In the present embodiment, as the bearing main body 1032a, for example, a rolling bearing is used. The rolling bearing is a known bearing which includes a track disposed on an outer peripheral side of the rotation shaft 1030, and a rolling body disposed between the rotation shaft 1030 and the track, and supports the rotation shaft 1030 by a rolling motion of the rolling body.

A brush 1032b forms a bearing 1032 which rotatably supports the rotation shaft 1030 together with the bearing main body 1032a. The brush 1032b is a rotation shaft supporting member that supports the bearing main body 1032a. The brush 1032b is formed in an annular shape around the rotation center line S1. The brush 1032b includes a side surface 1048 that slides on the inner peripheral surface 1047 of the rotation shaft supporting member 1045. In the side surface 1048, the section including the rotation center line S1 is formed in an arc shape around the fulcrum P1.

In the present embodiment, a radius of curvature r1 of the inner peripheral surface 1047 and a radius of curvature r2 of the side surface 1048 are the same as each other. The radius of curvature r1 is a distance between the fulcrum P1 and the inner peripheral surface 1047 on the section including the rotation center line S1. The radius of curvature r2 is a distance between the fulcrum P1 and the side surface 1048 on the section including the axis line of the rotation shaft 1030.

The bearing 1032 and the rotation shaft supporting member 1045 in the present embodiment form a bearing mechanism 1049 which oscillatably supports the rotation shaft 1030 around the fulcrum P1 via the bearing 1032.

The pressing portion 1033 of FIG. 48 is disposed on an inner peripheral side of the through hole 1064. The pressing portion 1033 is formed in an annular shape around the rotation center line S1 of the rotation shaft 1030. Between the pressing portion 1033 and the rotation shaft 1030, a void is provided. As will be described later, the pressing portion 1033 is a bearing portion that supports the rotation shaft 1030 in a state where the rotation shaft 1030 is largely inclined from the rotation center line S1 of the rotation shaft 1030. The pressing portion 1033 is supported by the lid portion 1031b. The pressing portion 1033 of the present embodiment is formed of a resin material having lubricity.

The permanent magnets 1034a, 1034b, 1034c, and 1034d are disposed between the armature 1036 and the pressing portion 1033 in the rotation shaft 1030. The permanent magnets 1034a, 1034b, 1034c, and 1034d are located on a base portion side of the protrusion 1063. The permanent magnets 1034a, 1034b, 1034c, and 1034d are fixed to the rotation shaft 1030.

As illustrated in FIG. 49, the permanent magnets 1034a, 1034b, 1034c, and 1034d are respectively formed in a shape of a fan. The permanent magnets 1034a, 1034b, 1034c, and 1034d are combined to cover the outer circumference of the rotation shaft 1030. The permanent magnets 1034a, 1034b, 1034c, and 1034d respectively include magnetic poles on the radially outer side around the axis line of the rotation shaft 1030. In the permanent magnets 1034a, 1034b, 1034c, and 1034d, each of the magnetic poles is disposed to be alternately aligned in an order of S pole→N pole→S pole→N pole. The permanent magnets 1034a, 1034b, 1034c, and 1034d impart the magnetic flux to the hall sensors 1037a, 1037b, 1037c, and 1037d.

The hall sensors 1037a, 1037b, 1037c, and 1037d are disposed on the radially outer side around the rotation center line S1 of the rotation shaft 1030, with respect to the permanent magnets 1034a, 1034b, 1034c, and 1034d. A void is provided between the hall sensors 1037a, 1037b, 1037c and 1037d and the permanent magnets 1034a, 1034b, 1034c, and 1034d. The hall sensors 1037a, 1037b, 1037c, and 1037d are aligned at the same interval in the circumferential direction around the rotation center line S1 of the rotation shaft 1030. The hall sensors 1037a, 1037b, 1037c, and 1037d are fixed to the tubular portion 1031a of the stator 1031. The hall sensors 1037a, 1037b, 1037c, and 1037d detect the rotational speed and the tilt angle of the rotation shaft 1030 and include a hall element that detects the magnetic field generated from the permanent magnets 1034a, 1034b, 1034c, and 1034d.

The brushes 1038a, 1038b, 1038c, and 1038d of FIG. 50 are disposed between the armature 1036 and the bearing 1032. The brushes 1038a, 1038b, 1038c, and 1038d are aligned at the same interval in the circumferential direction around the rotation center line S1.

The brushes 1038a, 1038b, 1038c, and 1038d are respectively configured to be disposed in a long hole portion of the brush holder 1040 and to be movable in the radial direction. The brushes 1038a, 1038b, 1038c, and 1038d are pressed toward the radially inner side (specifically, the commutator 1043 side) by an elastic force of the corresponding spring among the springs 1041a, 1041b, 1041c, and 1041d. The springs 1041a, 1041b, 1041c, and 1041d are respectively disposed in the long hole portion of the brush holder 1040. The brush holder 1040 is supported by the stator 1031. The brushes 1038a, 1038b, 1038c, and 1038d slide to segments 1043a to 1043d of the commutator 1043 according to the rotation of the rotation shaft 1030.

The brushes 1039a 1039b, 1039c, and 1039d of FIG. 51 are respectively configured to be disposed in the long hole portion of the brush holder 1040 and to be movable in the radial direction. The brushes 1039a, 1039b, 1039c, and 1039d are pressed toward the radially inner side (specifically, the commutator 1044 side) by an elastic force of the corresponding spring among the springs 1042a, 1042b, 1042c, and 1042d. The springs 1042a, 1042b, 1042c, and 1042d are respectively disposed in the long hole portion of the brush holder 1040.

Here, the brushes 1039a, 1039b, 1039c, and 1039d are disposed on the other side in the axial direction with respect to a fulcrum P, and the brushes 1038a, 1038b, 1038c, and 1038d are disposed on one side in the axial direction with respect to the fulcrum P.

The commutator 1043 includes the segments 1043a, 1043b, 1043c, and 1043d. The segments 1043a, 1043b, 1043c, and 1043d are aligned at the equivalent interval in an arc shape around the axis line of the rotation shaft 1030. A coil 1051a connects the segments 1043a and 1043c to each other. One end portion of the coil 1051a is connected to the segment 1043a, and the other end portion of the coil 1051a is connected to the segment 1043c.

A coil 1051b connects the segment 1043b and 1043d to each other. In other words, one end portion of the coil 1051b is connected to the segment 1043b, and the other end portion of the coil 1051b is connected to the segment 1043d.

The segments 1043a, 1043b, 1043c, and 1043d are fixed to the rotation shaft 1030 via a cylinder member 1067. The segments 1043a, 1043b, 1043c, and 1043d are respectively formed in a shape of a fan from the axial direction of the rotation shaft 1030. The brushes 1039a, 1039b, 1039c, and 1039d slide to segments 1044a to 1044d of the commutator 1043 according to the rotation of the rotation shaft 1030.

The cylinder member 1067 is disposed on the radially outer side around the axis line of the rotation shaft 1030. The cylinder member 1067 is formed in a shape of a tube around the axis line of the rotation shaft 1030. The axis line of the cylinder member 1067 is formed to match the axis line of the rotation shaft 1030. The cylinder member 1067 is supported by the rotation shaft 1030.

The commutator 1044 includes the segments 1044a, 1044b, 1044c, and 1044d. The segments 1044a, 1044b, 1044c, and 1044d are aligned at the equivalent interval in an arc shape around the axis line of the rotation shaft 1030. A coil 1050a connects the segments 1044a and 1044c to each other. In other words, one end portion of the coil 1050a is connected to the segment 1044a, and the other end portion of the coil 1050a is connected to the segment 1044c.

A coil 1050b connects the segments 1044b and 1044d to each other. In other words, one end portion of the coil 1050b is connected to the segment 1044b, and the other end portion of the coil 1050b is connected to the segment 1044d.

The segments 1044a, 1044b, 1044c, and 1044d are fixed to the rotation shaft 1030 via the cylinder member 1067. The segments 1044a, 1044b, 1044c, and 1044d are respectively formed in a shape of a fan when viewed from the axial direction of the rotation shaft 1030.

In the present embodiment, the commutators 1043 and 1044 are disposed on the fulcrum P1 side with respect to the bearing 1032. The commutator 1044 is located further on the other side in the axial direction than the fulcrum P1. The commutator 1043 is located further on one side in the axial direction than the fulcrum P1. The fulcrum P1 is an intermediate point between the rotation center of the commutator 1044 and the rotation center of the commutator 1043, in the axis line of the rotation shaft 1030.

As illustrated in FIG. 52, the armature 1036 includes the coils 1050a, 1050b, 1051a, and 1051b and a rotor core 1052.

The rotor core 1052 allows the magnetic flux (that is, magnetic field) generated from the coils 1050a and 1050b to pass therethrough. Furthermore, the rotor core 1052 allows the magnetic flux (that is, magnetic field) generated from the coils 1051a and 1051b to pass therethrough. The rotor core 1052 forms the magnetic circuit together with the permanent magnets 1035a and 1035b.

Specifically, the rotor core 1052 includes a ring portion 1053 and teeth 1054a, 1054b, 1054c, and 1054d. The ring portion 1053 is disposed on the radially inner side with respect to the tubular portion 1031a of the stator 1031. The ring portion 1053 is fixed to the rotation shaft 1030.

The teeth 1054a, 1054b, 1054c, and 1054d are formed to protrude to the radially outer side from the ring portion 1053. The teeth 1054a, 1054b, 1054c, and 1054d are respectively aligned at the same interval in the circumferential direction around the axis line of the rotation shaft 1030. Each of the tip end portion sides of the teeth 1054a, 1054b, 1054c, and 1054d is formed to extend in the circumferential direction.

Figure 53:
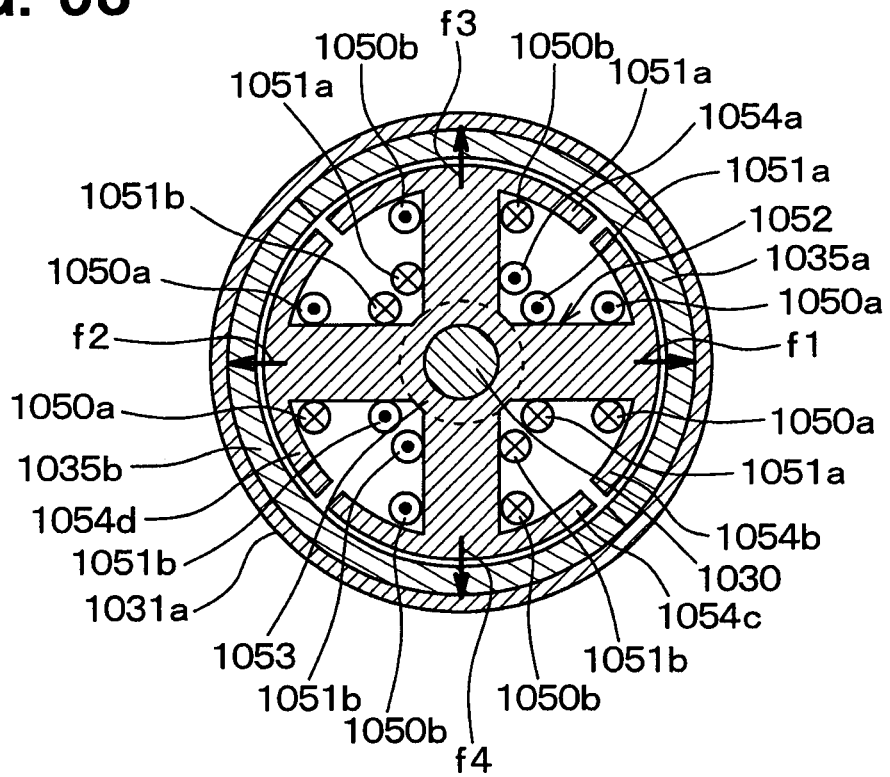
FIG. 53 is a cross-sectional view illustrating disposition of a tilt-control coil and a rotation-control coil in FIG. 48.

The coils 1050a and 1050b of the present embodiment are tilt-control coils which generate the supporting force of the rotation shaft 1030. In FIG. 53, in the coils 1050a and 1050b, X arrows indicate a state where the current flows toward a far side in the paper surface vertical direction, and black dots indicate a state where the current flows toward the near side in the paper surface vertical direction.

First, as illustrated in FIG. 53, the coil 1050*b* is wound around the teeth 1054*a* and 1054*c*. The direction in which the coil 1050*b* is wound around the tooth 1054*a* and the direction in which the coil 1050*b* is wound around the tooth 54*c* are the same as each other. The teeth 1054*a* and 1054*c* are disposed being offset by 180 degrees of an angle centered on the axis line of the rotation shaft 1030.

The coil 1050*a* is wound around the teeth 1054*b* and 1054*d*. The direction in which the coil 1050*a* is wound around the tooth 54*b* and the direction in which the coil 1050*a* is wound around the tooth 54*d* are the same as each other. The teeth 1054*b* and 1054*d* are disposed being offset by 180 degrees of an angle centered on the axis line of the rotation shaft 1030.

The coils 1051*a* and 1051*b* of the present embodiment are rotation-driving coils which generate the rotating magnetic field for rotating the armature 1036.

In FIG. 53, in the coils 1051*a* and 1051*b*, X arrows indicate a state where the current flows toward a far side in the paper surface vertical direction, and black dots indicate a state where the current flows toward the near side in the paper surface vertical direction.

The coil 1051*a* is wound around the teeth 1054*a* and 54*b*. The teeth 1054*a* and 54*b* are disposed being offset by 90 degrees of an angle centered on the axis line of the rotation shaft 1030.

The coil 1051*b* is wound around the teeth 1054*c* and 1054*d*. The teeth 1054*c* and 1054*d* are disposed being offset by 90 degrees of an angle centered on the axis line of the rotation shaft 1030.

In the present embodiment, the coils 1050*a* and 1050*b* are disposed on the stator 1031 side (that is, the radially outer side) with respect to the coils 1051*a* and 1051*b*.

In this manner, the coils 1050*a* and 1050*b* and the coils 1051*a* and 1051*b* are wound around the common rotor core 1052. In other words, the coils 1050*a* and 1050*b* and the coils 1051*a* and 1051*b* are attached to the rotation shaft 1030 via the rotor core 1052. In addition, the current that flows to the coils 1050*a* and 1050*b* and the current that flows to the coils 1051*a* and 1051*b* are controlled by an electronic control device (written an ECU in FIG. 48) 1070.

Figure 54:
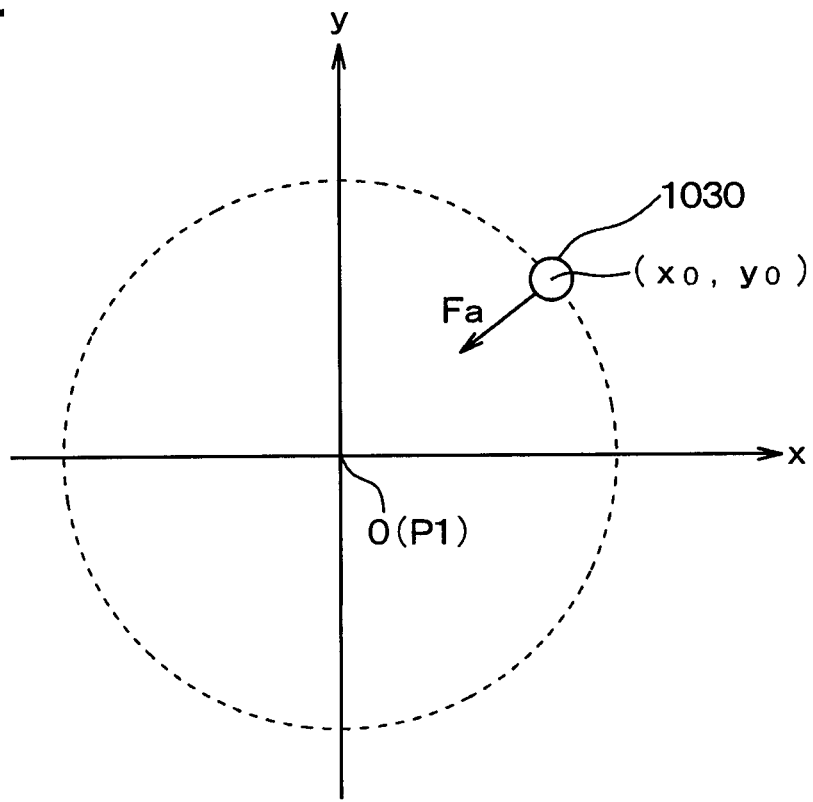
FIG. 54 is a view illustrating tilt of a rotation shaft by X-Y coordinates.
Figure 55:
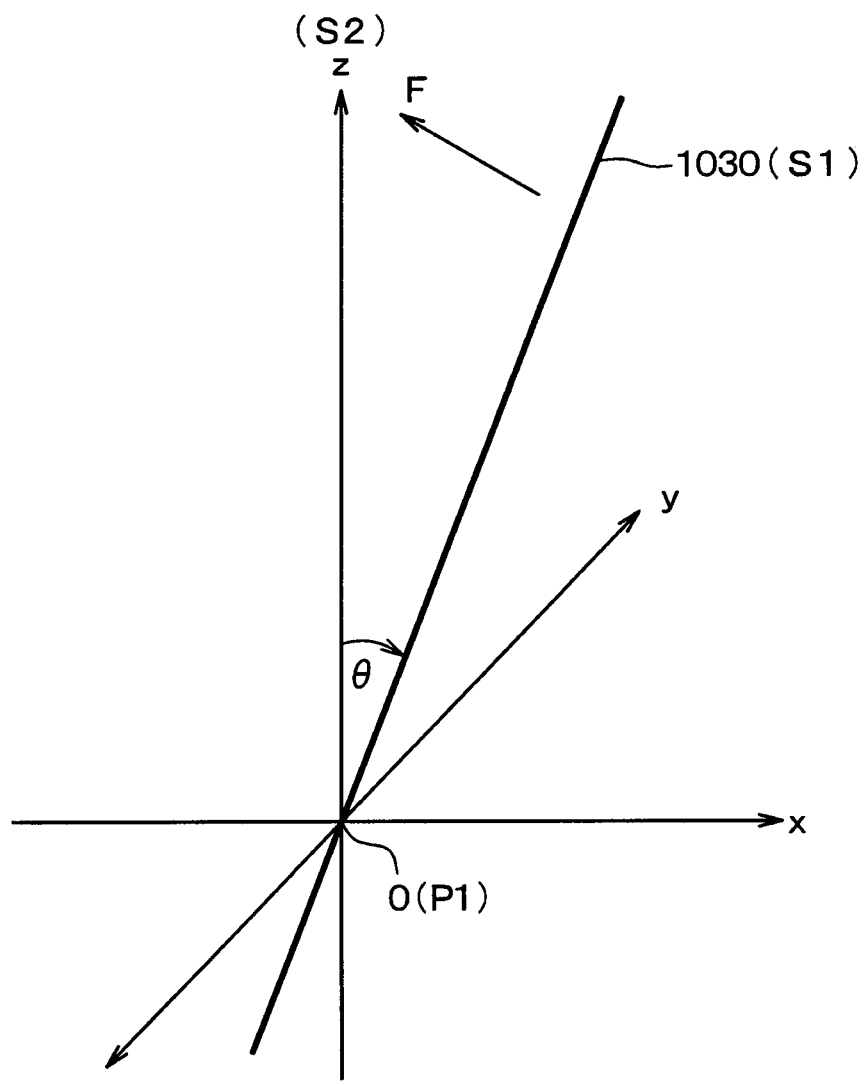
FIG. 55 is a view illustrating tilt of the rotation shaft by X-Y-Z coordinates.

In the electric motor 1010 configured in this manner, the rotation shaft 1030 is configured to be capable of being inclined from the rotation center line S1 of the rotation shaft 1030 using the fulcrum P1 between the commutators 1043 and 1044 in the axis line of the rotation shaft 1030 as a fulcrum (refer to FIGS. 54 and 55).

In FIGS. 54 and 55, an example in which the axis line of the rotation shaft 1030 with respect to the Z-axis (that is, the rotation center line S1) is inclined by the angle θ by setting the X-axis and the Y-axis which are orthogonal to the rotation center line S1 when the fulcrum is set to be an original point 0 and the rotation center line S1 of the rotation shaft 1030 is set to be Z-axis, is illustrated. (x0, y0) of FIG. 54 indicates the X-Y coordinates of the end portion (that is, fan 1020) on the other side in the axis line direction in the rotation shaft 1030.

Next, an electric configuration of the motor control system 1000 of the present embodiment will be described with reference to FIG. 56.

Figure 56:
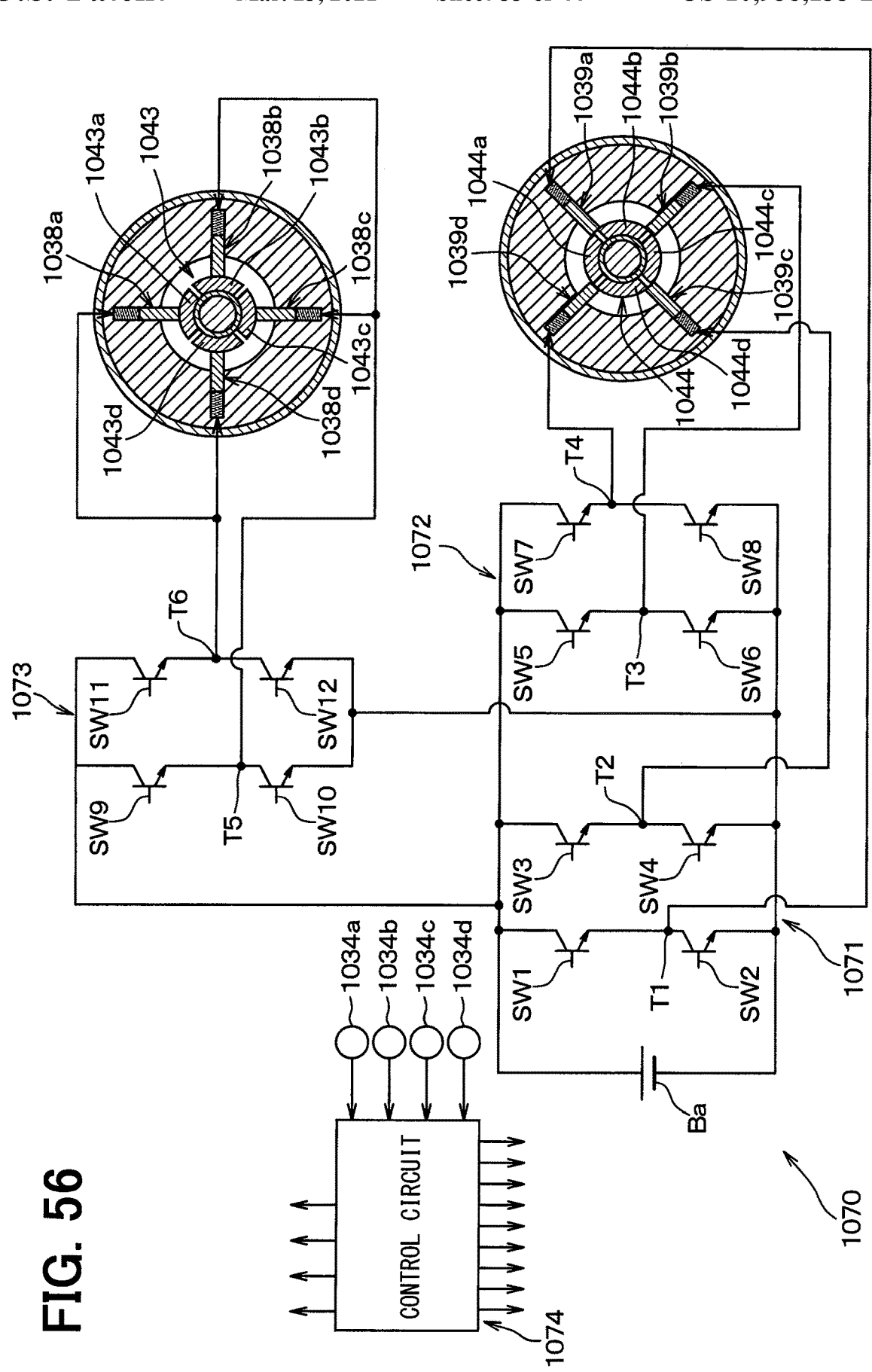
FIG. 56 is an electric circuit diagram illustrating an electric circuit configuration of an electronic control device in FIG. 48.

As illustrated in FIG. 56, the electronic control device 1070 includes bridge circuits 1071, 1072, and 1073 and a control circuit 1074. The bridge circuit 1071 includes the transistors SW1, SW2, SW3, and SW4. The transistors SW1 and SW2 are serially connected to each other between a positive electrode and a negative electrode of a battery Ba. The common connection terminal T1 of the transistors SW1 and SW2 is connected to the brush 1039*a*.

The transistors SW3 and SW4 are serially connected to each other between the positive electrode and the negative electrode of the battery Ba. The common connection terminal T2 of the transistors SW3 and SW4 is connected to the brush 1039*c*.

Accordingly, by turning On and OFF the transistors SW1, SW2, SW3, and SW4, the direction of the current that flows to the coil 1050*a* (or 1050*b*) through the commutator 1044 and the current value are controlled.

The bridge circuit 1072 includes the transistors SW5, SW6, SW7, and SW8. The transistors SW5 and SW6 are serially connected to each other between the positive electrode and the negative electrode of the battery Ba. The common connection terminal T3 of the transistors SW5 and SW6 is connected to the brush 1039*b*. The transistors SW7 and SW8 are serially connected to each other between the positive electrode and the negative electrode of the battery Ba. The common connection terminal T4 of the transistors SW7 and SW8 is connected to the brush 1039*d*.

Accordingly, by turning On and OFF the transistors SW5, SW6, SW7, and SW8, the direction of the current that flows to the coil 1050*b* (or 1050*a*) through the commutator 1044 and the current value can be controlled.

The bridge circuit 1073 includes the transistors SW9, SW10, SW11, and SW12. The transistors SW9 and SW10 are serially connected to each other between the positive electrode and the negative electrode of the battery Ba. The common connection terminal T5 of the transistors SW11 and SW12 is connected to the brushes 1038*b* and 1038*c*.

The transistors SW11 and SW12 are serially connected to each other between the positive electrode and the negative electrode of the battery Ba.

The common connection terminal T6 of the transistors SW11 and SW12 is connected to the brushes 1038*a* and 1038*d*.

Accordingly, by turning On and OFF the transistors SW9, SW10, SW11, and SW12, the direction of the current that flows to the coils 1051*a* or 1051*b* through the commutator 1043 and the current value are controlled.

The control circuit 1074 includes a microcomputer or a memory, and according to a computer program stored in the memory, a rotating force is generated in the armature 1036, and control processing for outputting the supporting force for supporting the rotation shaft 1030 is performed. The control circuit 1074 switching-controls the transistors SW1, SW2, SW3, SW4, SW5, SW6, SW7, SW8, SW9, SW10, SW11, and SW12 based on an output signal of the hall sensors 1037*a*, 1037*b*, 1037*c*, and 1037*d*, according to the performance of the control processing.

The control circuit 1074 outputs the current to the coils 1051*a* and 52*b* through the brushes 1038*a*, 1038*b*, 1038*c*, and 1038*d* and the commutator 1043 from the common connection terminals T5 and T6 by controlling the transistors SW9, SW10, SW11, and SW12.

For example, the control circuit 1074 turns ON the transistors SW9 and SW12 and turns OFF the transistors SW10 and SW11. Therefore, between the common connection terminals T5 and T6, the current flows to the coil 1051*a* (or 51*b*) through the brushes 1038*b* and 1038*d* and the segments 1043*a* and 1043*c* (or 43*b* and 43*d*) of the commutator 1043. Between the common connection terminals T5 and T6, the current flows to the coil 1051*a* (or 1051*b*)

through the brushes 1038a and 1038c and the segments 1043a and 1043c (or 1043b and 1043d) of the commutator 1043.

At this time, in the coils 1051a and 1051b, the rotating force which is the electromagnetic force is generated based on the current that flows to the coils 1051a and 1051b themselves and the magnetic flux from the permanent magnets 1035a and 1035b. The rotating force is a rotating force for rotating the armature 1036 (that is, rotation shaft 1030) in a first rotation direction centered on the rotation center line S1.

Here, according to the rotation of the rotation shaft 1030, segments with which each of the brushes 1038a and 1038c is in contact among the segments 1043a, 1043b, 1043c, and 1043d of the commutator 1043, are consecutively switched. According to the rotation of the rotation shaft 1030, segments with which each of the brushes 1038b and 1038d is in contact among the segments 1043a, 1043b, 1043c, and 1043d of the commutator 1043, are consecutively switched.

Accordingly, every time when segments with which the brushes 1038a, 1038b, 1038c, and 1038d are in contact among the segments 1043a, 1043b, 1043c, and 1043d are switched, in the coil 1051a (or 1051b), the rotating force for repeatedly performing the rotation in the first rotation direction is generated.

Meanwhile, the control circuit 1074 turns OFF the transistors SW9 and SW12 and turns ON the transistors SW10 and SW11. Therefore, between the common connection terminals T5 and T6, the current flows to the coil 1051a (or 1051b) through the brushes 1038b and 1038d and the segments 1043a and 1043c (or 1043b and 1043d) of the commutator 1043. Between the common connection terminals T5 and T6, the current flows to the coil 1051a (or 1051b) through the brushes 1038a and 1038c and the segments 1043a and 1043c (or 1043b and 1043d) of the commutator 1043.

At this time, in the coils 1051a and 1051b, the rotating force which is the electromagnetic force is generated based on the current that flows to the coils 1051a and 1051b themselves and the magnetic flux from the permanent magnets 1035a and 1035b. The rotating force is a rotating force for rotating the armature 1036 (that is, the rotation shaft 1030) in a second rotation direction centered on the rotation center line S1. The second rotation direction is a direction reverse to the first rotation direction.

Here, according to the rotation of the rotation shaft 1030, segments with which each of the brushes 1038a and 1038c is in contact among the segments 1043a, 1043b, 1043c, and 1043d of the commutator 1043, are consecutively switched. According to the rotation of the rotation shaft 1030, segments with which each of the brushes 1038b and 1038d is in contact among the segments 1043a, 1043b, 1043c, and 1043d of the commutator 1043, are consecutively switched.

Accordingly, every time when segments with which the brushes 1038a, 1038b, 1038c, and 1038d are in contact among the segments 1043a, 1043b, 1043c, and 1043d are switched, in the coil 1051a (or 1051b), the rotating force for repeatedly performing the rotation in the second rotation direction is generated.

Here, by controlling the transistors SW9, SW10, SW11, and SW12, the control circuit 1074 controls a current value of the current that flows to the coils 1051a and 1051b through the brushes 1038a, 1038b, 1038c, and 1038d and the commutator 1043. According to this, by controlling the magnitude of the electromagnetic force which is the rotating force that acts on the coils 1051a and 1051b, the rotational speed of the rotation shaft 1030 (that is, armature 1036) can be controlled.

In addition, there is a case where the axis line S2 of the rotation shaft 1030 and the rotation center line S1 of the rotation shaft 1030 are shifted by the disturbance. At this time, the rotation shaft 1030 oscillates centered on the fulcrum P1 while rotating centered on the rotation center line S1.

In contrast, by switching-controlling the transistors SW1, SW2, SW3, and SW4, the control circuit 1074 allows the current to flow to the coil 1050a, and generates electromagnetic forces f1 and f2 for moving the armature 1036 between the coil 1050a and the permanent magnets 1035a and 1035b.

Specifically, the process moves following the next (a), (b), (c), and (d). (a) In a state where the brush 1039a is in contact with the segment 1044a and the brush 1039c is in contact with the segment 1044c, when the transistors SW1 and SW4 are turned ON and the transistors SW2 and SW3 are turned OFF, the current can flow in the first current direction with respect to the coil 1050a through the segments 1044a and 1044c from the common connection terminals T1 and T2. (b) In a state where the brush 1039c is in contact with the segment 1044a and the brush 1039a is in contact with the segment 1044c, when the transistors SW1 and SW4 are turned OFF and the transistors SW2 and SW3 are turned ON, the current can flow in the first current direction with respect to the coil 1050a through the segments 1044a and 1044c from the common connection terminals T1 and T2.

As the current flows in the first current direction with respect to the coil 1050a in this manner, between the coil 1050a wound around the teeth 1054b and 1054d and the permanent magnets 1035a and 1035b, the electromagnetic force f1 is generated. The electromagnetic force f1 is a force for moving the armature 1036 (that is, rotation shaft 1030) toward one side in the axis line direction of the coil 1050a. The axis line direction of the coil 1050a is a direction in which the axis lines of the teeth 1054b and 1054d are linked to each other. (c) In a state the brush 1039a is in contact with the segment 1044a and the brush 1039c is in contact with the segment 1044c, when the transistors SW1 and SW4 are turned OFF and the transistors SW2 and SW3 are turned ON, the current can flow in the second current direction with respect to the coil 1050a through the segments 1044a and 1044c from the common connection terminals T1 and T2. The second current direction is a direction in which the current flows being reverse to the first current direction with respect to the coil 1050a. (d) In a state the brush 1039c is in contact with the segment 1044a and the brush 1039a is in contact with the segment 1044c, when the transistors SW1 and SW4 are turned ON and the transistors SW2 and SW3 are turned OFF, the current can flow in the second current direction to the coil 1050a through the segments 1044a and 1044c from the common connection terminals T1 and T2.

As the current flows in the second current direction with respect to the coil 1050a in this manner, between the coil 1050a wound around the teeth 1054b and 1054d and the permanent magnets 1035a and 1035b, the electromagnetic force f2 is generated. The electromagnetic force f2 is a force for moving the armature 1036 (that is, rotation shaft 1030) toward the other side of the coil 1050a in the axis line direction.

By changing the direction in which the current flows with respect to the coil 1050a to the second current direction from the first current direction (or to the first current direction from the second current direction), the control circuit 1074 can change the direction of the electromagnetic force generated between the coil 1050*a* and the permanent magnets 1035*a* and 1035*b*. As the control circuit 1074 switching-controls the transistors SW1, SW2, SW3, and SW4 and controls the current value that flows to the coil 1050*a*, the magnitude of the electromagnetic forces f1 and f2 that act between the coil 1050*a* and the permanent magnets 1035*a* and 1035*b* can be controlled.

By switching-controlling the transistors SW5, SW6, SW7, and SW8, the control circuit 1074 allows the current to flow to the coil 1050*b* and generates electromagnetic forces f3 and f4 for moving the armature 1036 between the coil 1050*b* and the permanent magnets 1035*a* and 1035*b*.

Specifically, the process moves following the next (e), (f), (g), and (h). (e) In a state where the brush 1039*b* is in contact with the segment 1044*b* and the brush 1039*d* is in contact with the segment 1044*d*, when the transistors SW5 and SW8 are turned ON and the transistors SW6 and SW7 are turned OFF, the current can flow in a third current direction with respect to the coil 1050*b* through the segments 1044*b* and 1044*d* from the common connection terminals T3 and T4. (f) In a state where the brush 1039*d* is in contact with the segment 1044*b* and the brush 1039*b* is in contact with the segment 1044*d*, when the transistors SW5 and SW8 are turned OFF and the transistors SW6 and SW7 are turned ON, the current can flow in the third current direction with respect to the coil 1050*b* through the segments 1044*b* and 1044*d* from the common connection terminals T3 and T4.

As the current flows in the third current direction with respect to the coil 1050*b* in this manner, between the coil 1050*b* wound around the teeth 1054*a* and 1054*c* and the permanent magnets 1035*a* and 1035*b*, the electromagnetic force f3 is generated. The electromagnetic force f3 is a force for moving the armature 1036 (that is, rotation shaft 1030) toward one side in the axis line direction of the coil 1050*b*. The axis line direction of the coil 1050*b* is a direction in which the axis lines of the teeth 1054*a* and 1054*c* are linked to each other. (g) In a state where the brush 1039*b* is in contact with the segment 1044*b* and the brush 1039*d* is in contact with the segment 1044*d*, when the transistors SW5 and SW8 are turned OFF and the transistors SW6 and SW7 are turned ON, the current can flow in a fourth current direction with respect to the coil 1050*b* through the segments 1044*b* and 1044*d* from the common connection terminals T3 and T4. The fourth current direction is a direction reverse to the third current direction. (h) In a state where the brush 1039*d* is in contact with the segment 1044*b* and the brush 1039*b* is in contact with the segment 1044*d*, when the transistors SW5 and SW8 are turned ON and the transistors SW6 and SW7 are turned OFF, the current can flow in the fourth current direction with respect to the coil 1050*b* through the segments 1044*b* and 1044*d* from the common connection terminals T3 and T4.

As the current flows in the fourth current direction with respect to the coil 1050*b* in this manner, between the coil 1050*b* wound around the teeth 1054*a* and 1054*c* and the permanent magnets 1035*a* and 1035*b*, the electromagnetic force f4 is generated. The electromagnetic force f4 is a force for moving the armature 1036 (that is, rotation shaft 1030) toward the other side of the coil 1050*b* in the axis line direction.

By changing the direction in which the current flows with respect to the coil 1050*b* to the fourth current direction from the third current direction (or to the third current direction from the fourth current direction), the control circuit 1074 can change the direction of the electromagnetic force generated between the coil 1050*b* and the permanent magnets 1035*a* and 1035*b*. As the control circuit 1074 switching-controls the transistors SW5, SW6, SW7, and SW8 and controls the current value that flows to the coil 1050*b*, the magnitude of the electromagnetic forces f3 and f4 that act between the coil 1050*b* and the permanent magnets 1035*a* and 1035*b* can be controlled.

Here, the axis line direction of the coil 1050*a* is a direction orthogonal to the axis line direction of the coil 1050*b*. Each of the electromagnetic forces f1, f2, f3, and f4 is a unit vector. By using the electromagnetic forces f1, f2, f3, and f4 and the coefficients K1, K2, K3, and K4 multiplied to the electromagnetic forces f1, f2, f3, and f4, the supporting force Fa for the axis line S2 of the rotation shaft 1030 to approach the rotation center line S1 can be expressed by the following Equation 1.

$$Fa = K1 \cdot f1 + K2 \cdot f2 + K3 \cdot f3 + K4 \cdot f4 \quad \text{(Equation 1)}$$

The control circuit 1074 controls the transistors SW1, SW2, SW3, SW4, SW5, SW6, SW7, and SW8, and controls the current that flows to the coils 1050*a* and 1050*b* from the common connection terminals T1, T2, T3, and T4. Therefore, as the coefficients K1, K2, K3, and K4 are controlled, the magnitude of the supporting force Fa and the direction of the supporting force Fa can be controlled.

Next, the control processing by the control circuit 1074 of the present embodiment will be described with reference to FIGS. 57 to 62.

Figure 57:
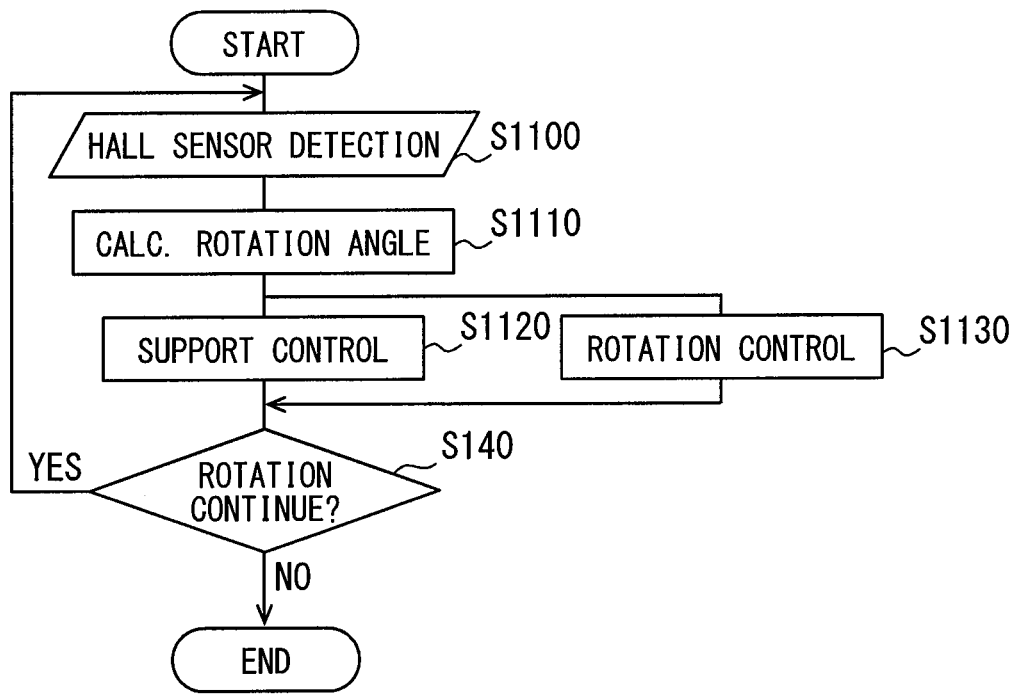
FIG. 57 is a flowchart illustrating control processing of the electronic control device in FIG. 48.
Figure 58:
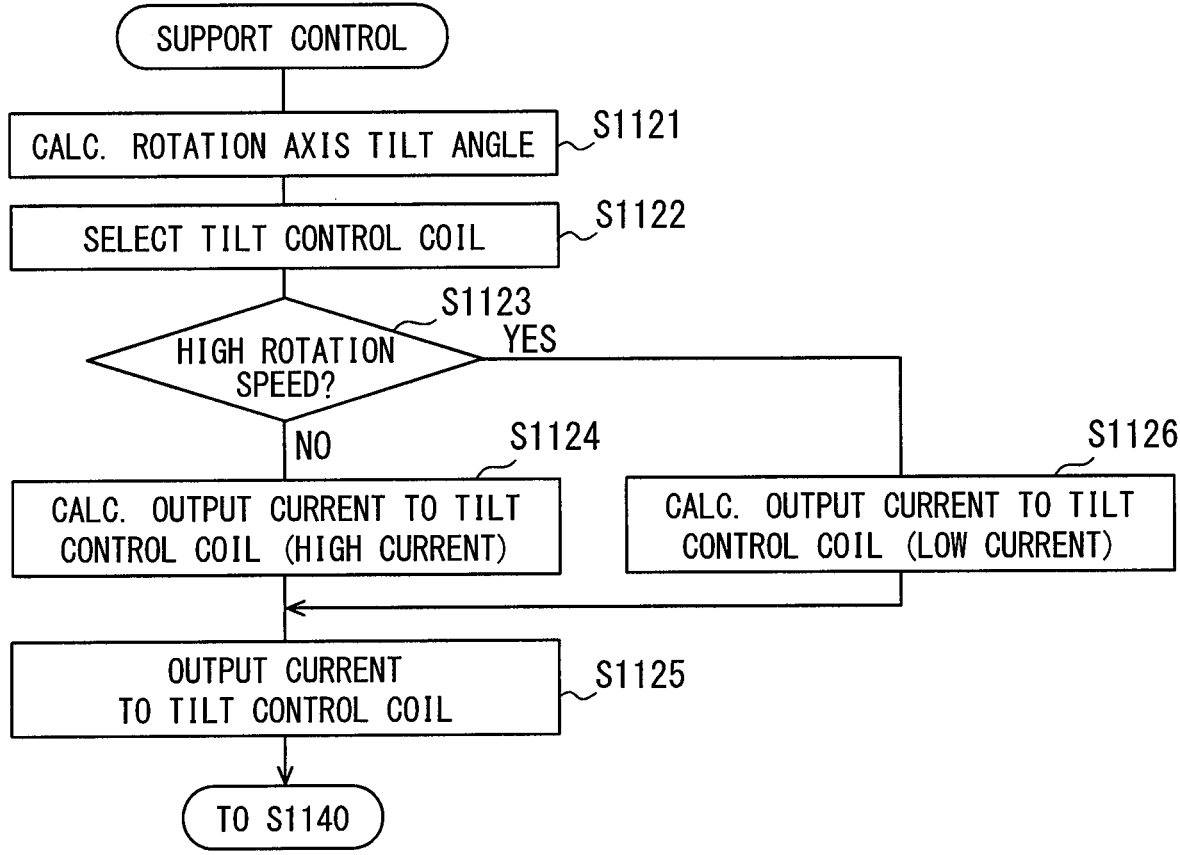
FIG. 58 is a flowchart specifically illustrating steps in FIG. 60.
Figure 59A:
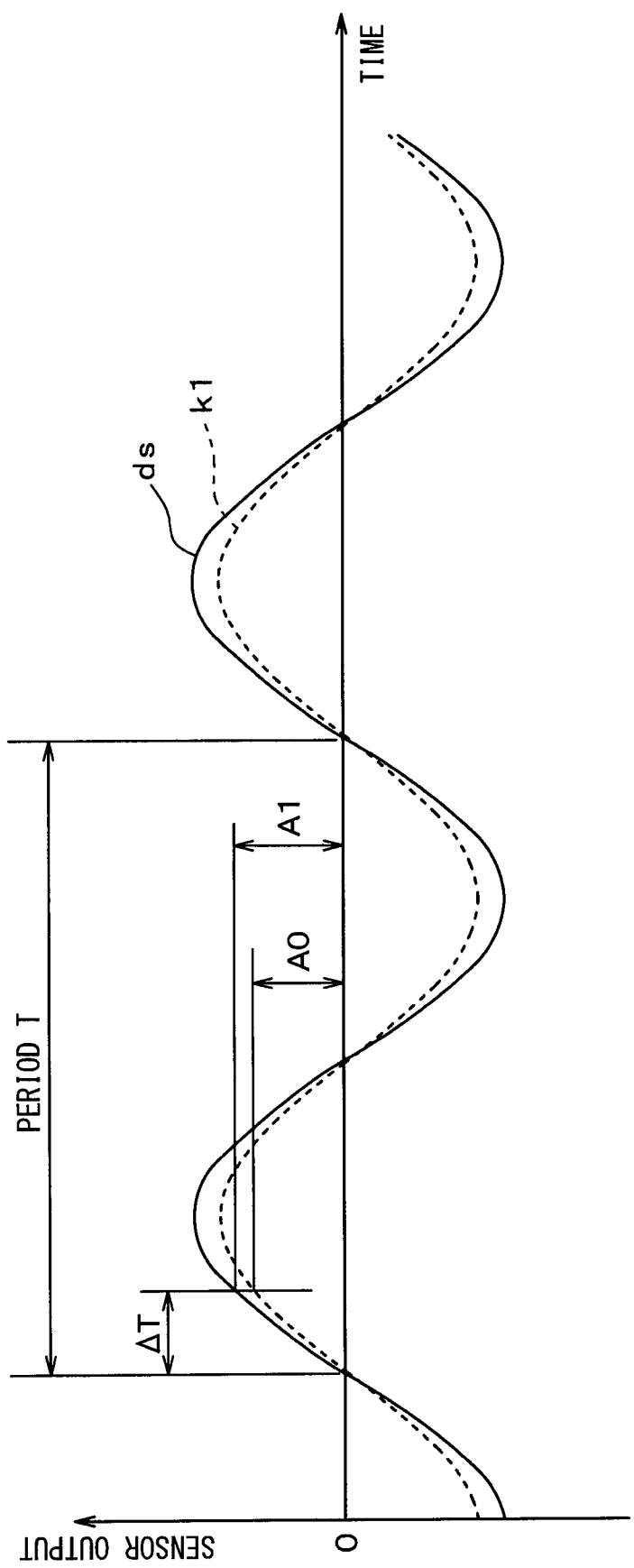
FIG. 59A is a view illustrating an output value or the like of a hall sensor in FIG. 48.
Figure 59B:
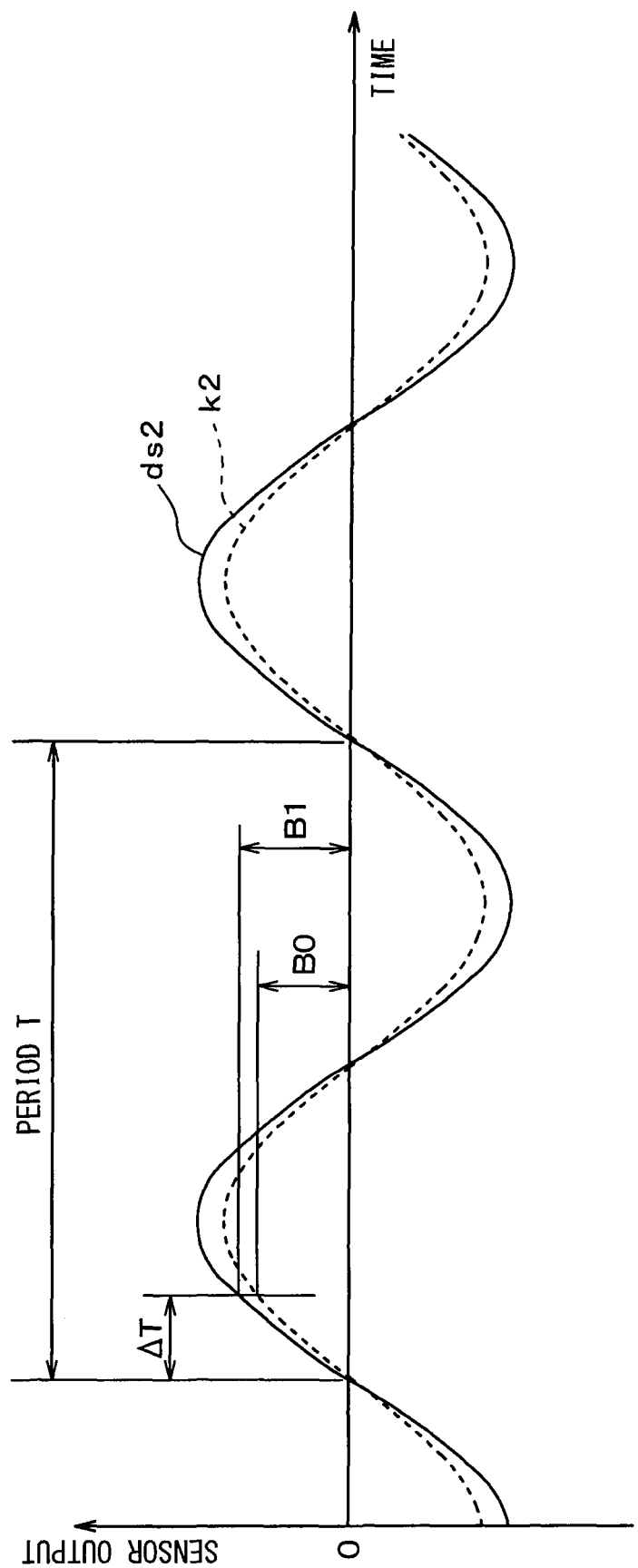
FIG. 59B is a view illustrating an output value or the like of the hall sensor in FIG. 48.

The control circuit 1074 performs the supporting processing following the flowchart of FIGS. 57 and 58. FIGS. 57 and 58 are flowcharts illustrating the control processing.

First, in Step 1100 of FIG. 57, the control circuit 1074 detects the magnetic field generated by the permanent magnets 34*a* and 34*b* by the hall sensors 1037*a*, 1037*b*, 1037*c*, and 1037*d*.

Here, in the X-Y coordinates, the direction in which the hall sensors 1037*a* and 1037*c* are aligned is set to be the X-direction, and the direction in which the hall sensors 1037*b* and 1037*d* are aligned is set to be the Y-direction. A difference ds1 (=Ha−Hc: refer to FIG. 63) between the output signal Ha of the hall sensor 1037*a* and the output signal Hc of the hall sensor 1037*c* is acquired. The difference ds1 indicates rotation angle information of the rotation shaft 1030. In addition, the rotation angle (that is, rotation position) of the rotation shaft 1030 at the current time is calculated based on the difference ds1 (Step 1110).

Next, the supporting control of preventing the rotation shaft 1030 from being inclined from the rotation center line 51 (Step 1120) and the rotation control of rotating the rotation shaft 1030 (Step 1130) are performed in parallel. In addition, the supporting control (Step 1120) and the rotation control (Step 1130) will be described later in detail. Next, it is determined whether or not the rotation of the rotation shaft 1030 continues (Step 1140). After this, when YES which means that the rotation of the rotation shaft 1030 continues is determined in Step 1140, the process returns to Step 1110. Next, until a stop command for stopping the control processing is input from the outside, YES determination in Steps 1100, 110, 120, and 130, and Step 1140 is repeated. After this, when the stop command is input from the outside, NO is determined in Step 1140, and the control processing is finished.

Next, the rotation control (Step 1130) will be described.

First, the rotational speed of the rotation shaft 1030 is acquired by differentiating the rotation angle of the rotation shaft 1030 calculated in the above-described Step 1110 by time. According to this, by controlling the switching SW9, SW10, SW11, and SW12, the current that flows to the coils 1051*a* and 1051*b* is controlled such that the acquired rotational speed of the rotation shaft 1030 approaches a target rotational speed. Therefore, in the coils 1051*a* and 1051*b*, an electromagnetic force which is a rotating force is generated by the current and the magnetic flux from the permanent magnets 1035*a* and 1035*b*. Therefore, the rotation angle of the rotation shaft 1030 (that is, armature 1036) can approach the target rotational speed.

Next, the supporting control (Step 1120) will be described with reference to FIG. 58. FIG. 58 is a flowchart schematically illustrating Step 1120 in FIG. 57.

First, in Step 1121, the tilt θ (refer to FIG. 54) of the rotation shaft 1030 with respect to the rotation center line 51 of the rotation shaft 1030 is calculated based on the output signal of the hall sensors 1037*a*, 1037*b*, 1037*c*, and 1037*d*.

Specifically, the difference ds1 (=Ha−Hc) between the output signal Ha of the hall sensor 1037*a* at the current time and the output signal Hc of the hall sensor 1037*c* at the current time is acquired. In addition, the X coordinate (X coordinate of the end portion on the other side of the rotation shaft 1030 in the axis line direction) of the fan 1020 is acquired by the difference dA (=A1−A0: refer to FIG. 59A) between the amplitude value A1 of the difference ds1 and the amplitude value A0 of the reference signal k1.

Here, the amplitude value A1 indicates the amplitude value of the difference ds1 at the current time. A time period between the timing at which the difference ds1 becomes zero and the current time is ΔT. The amplitude value A0 is an amplitude of the reference signal k1 when ΔT has elapsed after the timing at which the reference signal k1 becomes zero.

In addition, as a difference (A1−A0) increases, the X coordinate (X0) increases, and as a difference (A1−A0) decreases, the X coordinate (X0) increases. The reference signal k1 is a difference (=theoretical value of output signal Ha−theoretical value of output signal Hc) between theoretical value of the output signal Ha of the hall sensor 1037*a* and the theoretical value of the output signal Hc of the hall sensor 1037*c*.

Here, the output signal Ha output from the hall sensor 1037*a* when the rotation shaft 1030 rotates in a state where the axis line of the rotation shaft 1030 matches the rotation center line S1 of the rotation shaft 1030 is considered as a theoretical value of the output signal Ha. The output signal Hc output from the hall sensor 1037*c* when the rotation shaft 1030 rotates in a state where the axis line of the rotation shaft 1030 matches the rotation center line S1 of the rotation shaft 1030 is considered as a theoretical value of the output signal Hc.

Furthermore, a difference dq (=Hb−Hd) between an output signal Hb of the hall sensor 1037*b* at the current time and an output signal Hd of the hall sensor 1037*d* at the current time is acquired, and the Y coordinate (that is, Y coordinate of the end portion on the other side of the rotation shaft 1030 in the axis line direction) of the fan 1020 is acquired based on a difference dB (=B1−B0: refer to FIG. 59B) between an amplitude B1 of the difference dq and an amplitude value B0 of a reference signal k2.

The reference signal k2 is a difference (=theoretical value of output signal Hb−theoretical value of output signal Hd) between the theoretical value of the output signal Hb of the hall sensor 1037*b* and the theoretical value of the output signal Hd of the hall sensor 1037*d*. Here, the output signal Hb output from the hall sensor 1037*b* when the rotation shaft 1030 rotates in a state where the axis line of the rotation shaft 1030 matches the rotation center line S1 of the rotation shaft 1030 is considered as a theoretical value of the output signal Hb. The output signal Hd output from the hall sensor 1037*d* when the rotation shaft 1030 rotates in a state where the axis line of the rotation shaft 1030 matches the rotation center line S1 of the rotation shaft 1030 is considered as a theoretical value of the output signal Hd.

The amplitude value B1 indicates the amplitude value of the difference dq at the current time. The amplitude value B0 is an amplitude of the reference signal k2 when ΔT has elapsed from the timing at which the reference signal k1 becomes zero. In addition, as the difference dB increases, the Y coordinate (Y0) increases. As the difference dB decreases, the Y coordinate (Y0) decreases.

The tilt θ (angle) of the rotation shaft 1030 with respect to the rotation center line S1 is calculated based on the XY coordinates (X0, Y0) of the fan 1020 acquired in this manner. In addition, in the present embodiment, the tilt θ is an angle formed in the clockwise direction toward the axis line S2 of the rotation shaft 1030 from the Z-axis between the Z-axis and the axis line S2 of the rotation shaft 1030 (refer to FIG. 54).

Next, in step 1122, the coil to be excited to cause the axis line S2 of the rotation shaft 1030 to approach the rotation center line S1 is selected from the coils 1050*a* and 1050*b*, based on the XY coordinates (X0, Y0) of the fan 1020. In other words, the coil to be excited to cause the axis line S2 of the inclined rotation shaft 1030 to approach the rotation center line S1 is selected from the coils 1050*a* and 1050*b*. Hereinafter, the coil selected in this manner is called a selected coil.

Next, in Step 1123, it is determined whether or not the rotational speed of the rotation shaft 1030 is a high speed.

Specifically, a difference (Ha−Hc) between the output signal Ha of the hall sensor 1037*a* and the output signal Hc of the hall sensor 1037*c* is acquired, and the rotational speed of the rotation shaft 1030 is calculated based on a change of the acquired difference (Ha−Hc) with respect to the time. It is determined whether or not the calculated rotational speed (hereinafter, referred to as a calculated rotational speed V) is equal to or higher than a predetermined speed.

When the calculated rotational speed V is equal to or higher than the predetermined speed, YES which means that the rotational speed of the rotation shaft 1030 is a high speed is determined in Step 1123. In this case, in order to generate the supporting force Fa necessary to cause the axis line S2 of the rotation shaft 1030 to approach the rotation center line 51 between the coils 1050*a* and 1050*b* and the permanent magnets 1035*a* and 1035*b*, the current to be output to the selected coil is calculated based on (X0, Y0) and the tilt θ (Step 1124).

Meanwhile, when the calculated rotational speed V is lower than the predetermined speed, NO which means that the rotational speed of the rotation shaft 1030 is a low speed is determined in Step 1123. In this case, in order to generate the supporting force Fa necessary to cause the axis line S2 of the rotation shaft 1030 to approach the rotation center line 51 between the coils 1050*a* and 1050*b* and the permanent magnets 1035*a* and 1035*b*, the current to be output to the selected coil is calculated based on (X0, Y0) and the tilt θ (Step 1126).

Here, the supporting force Fa necessary to cause the axis line S2 of the rotation shaft 1030 to approach the rotation center line 51 increases as the tilt θ increases. According to this, as the rotational speed of the rotation shaft 1030 increases, the supporting force Fa necessary to cause the axis line S2 of the rotation shaft 1030 to approach the rotation center line 51 decreases. In other words, when the rotation shaft 1030 rotates at a high speed, the supporting force Fa decreases compared to that when the rotation shaft 1030 rotates at a low speed (refer to FIG. 60).

Figure 60:
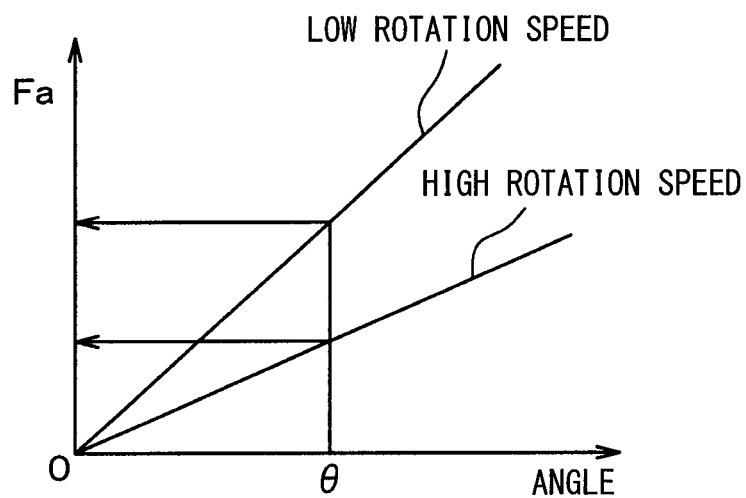
FIG. 60 is a view illustrating a relationship of supporting force Fa-angle-number of rotations of the rotation shaft of FIG. 48.

FIG. 60 is a graph illustrating a relationship between the supporting force Fa and the tilt angle θ in a case where a vertical axis is the supporting force Fa, a horizontal axis is the tilt angle θ, and the rotation shaft 1030 rotates at a low speed or at a high speed. The graph when the rotation shaft 1030 rotates at a low speed, a gradient is larger compared to that of the graph when the rotation shaft 1030 rotates at a high speed.

Here, when the rotation shaft 1030 rotates at a high speed, the current to be output to the selected coil is calculated based on the graph illustrating a relationship of supporting force Fa-tilt θ when rotating at a high speed in FIG. 60 (Step 1126).

Meanwhile, when the rotation shaft 1030 rotates at a low speed, the current to be output to the selected coil is calculated based on the graph illustrating the relationship of supporting force Fa-tilt θ when rotating at a low speed of FIG. 60 (Step 1124).

In this manner, the current to be output to the selected coil is calculated based on the rotational speed of the rotation shaft 1030, (X0, Y0), and the tilt θ. According to this, in order to output the calculated current to the selected coil, the transistors SW1, SW2, . . . , and SW6 of the bridge circuit 1071 are controlled. Accordingly, the current is output to the selected coil from the common connection terminals T1, T2, and T3. Therefore, the supporting force Fa is generated between the selected coil and the permanent magnet 1035. Accordingly, the rotation shaft 1030 can approach the rotation center line S1 by the supporting force Fa.

Here, when the rotation shaft 1030 rotates at a low speed in a case of the same tilt angle θ, the supporting force Fa increases between the selected coil and the permanent magnet 1035 compared to a case where the rotation shaft 1030 rotates at a high speed.

According to the present embodiment described above, the motor control system 1000 includes the stator 1031 of which one side in the axial direction of the rotation shaft 1030 is rotatably supported via the bearing 1032; and the permanent magnets 1035*a* and 1035*b* which are supported by the stator 1031 and include two magnetic poles aligned in the circumferential direction around the rotation center line S1 of the rotation shaft 1030. The coils 1051*a* and 1051*b* are coils supported by the rotation shaft 1030, and generate the electromagnetic force for rotating the armature 1036 based on the current that flows to the coil and the magnetic flux from the permanent magnets 1035*a* and 1035*b*. The coils 1050*a* and 1050*b* form the magnetic bearing which is supported by the rotation shaft 1030, and rotatably support the other side in the axial direction with respect to the bearing 1032 in the rotation shaft 1030 by generating the electromagnetic force between the permanent magnets 1035*a* and 1035*b*. In other words, the coils 1050*a* and 1050*b* form the magnetic bearing that rotatably supports the portion shifted from the bearing 1032 in the axis line of the rotation shaft 1030.

The commutator 1043 is supported by the rotation shaft 1030 and is connected to the coils 1051*a* and 1051*b*. The commutator 1044 is supported by the rotation shaft 1030 and is connected to the coils 1050*a* and 1050*b*. The brushes 1039*a* to 1039*d* are pressed toward the commutator 1043 side by the elastic force of the springs 1042*a* to 1042*d*, and output the current to the coils 1050*a* and 1050*b* through the commutator 1044 sliding to the segments 1044*a*, 1044*b*, 1044*c*, and 1044*d* of the commutator 1044 according to the rotation of the rotation shaft 1030.

The brushes 1038*a* to 1038*d* are pressed toward the commutator 1044 side by the elastic force of the springs 1041*a* to 1041*d*, and output the current to the coils 1051*a* and 1051*b* through the commutator 1043 sliding to the segments 1043*a*, 1043*b*, 1043*c*, and 1043*d* of the commutator 1043 according to the rotation of the rotation shaft 1030.

The electronic control device 1070 controls the current that flows to the coils 1050*a* and 1050*b* such that the electromagnetic force which prevents the axis line of the rotation shaft 1030 from being inclined from the rotation center line S1 is generated between the coils 1050*a* and 1050*b* and the permanent magnets 1035*a* and 1035*b*.

Above, the rotation shaft 1030 is rotatably supported by the magnetic bearing including the permanent magnets 1035*a* and 1035*b* and the coils 1050*a* and 1050*b*, and the bearing 1032. Accordingly, one magnetic bearing for supporting the rotation shaft 1030 is used. Therefore, the electric motor 1010, the electronic control device 1070, and the motor control system 1000 in which the power consumption for supporting the rotation shaft 1030 is reduced, can be provided.

In the present embodiment, when the rotation shaft 1030 rotates at a high speed, the supporting force Fa becomes small compared to that when the rotation shaft 1030 rotates at a low speed. Therefore, since the supporting force Fa is generated, the power consumed in the coils 1050*a* and 1050*b* can be reduced.

Figure 63:
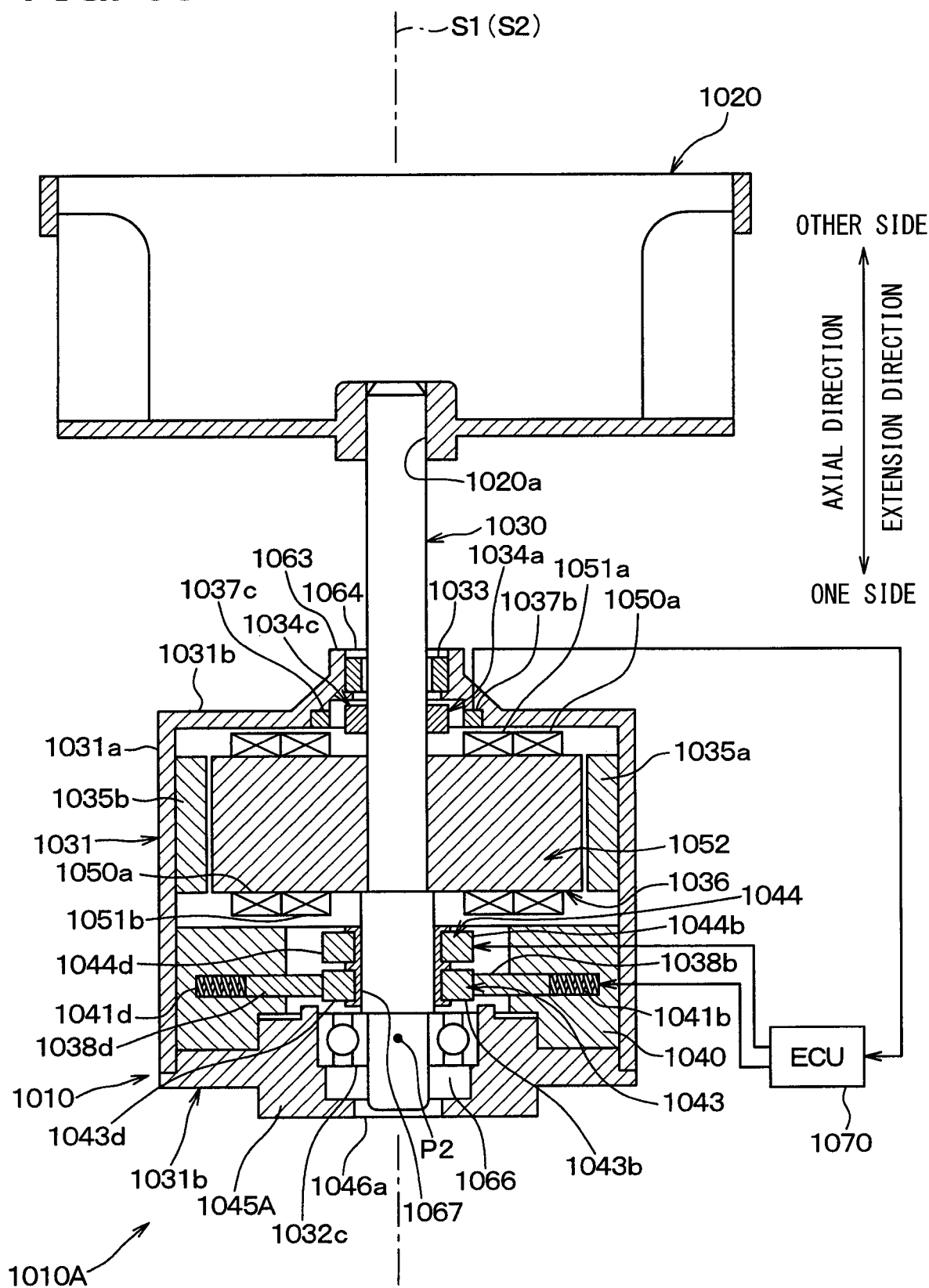
FIG. 63 is a view illustrating the entire configuration of a motor control system in a comparative example of the present disclosure.

Here, as illustrated in FIG. 63, in an electric motor 1010A of which one side in the axial direction of the rotation shaft 1030 is rotatably supported by a supporting member 1045A via a bearing 1032*c*, in a case where the bearing 1032*c* is fixed to the supporting member 1045A, the bearing 1032*c* side in the rotation shaft 1030 becomes a fulcrum P2. The axis line of the rotation shaft 1030 is configured to be freely inclined from the rotation center line S1 centered on the fulcrum P2. Therefore, when the tilt vibration is generated when the rotation shaft 1030 rotates, the brushes 1038*a* to 1038*d* are displaced according to the elastic force of the springs 1041*a* to 1041*d*, or the brushes 1039*a* to 1039*d* are displaced according to the elastic force of the springs 1042*a* to 1042*d*. The tilt vibration of the rotation shaft 1030 is a phenomenon in which the axis line of the rotation shaft 1030 oscillates in the radial direction around the rotation center line S1 when the rotation shaft 1030 rotates.

Therefore, there is a concern that a contact failure is generated between the brushes 1038*a* to 1038*d* and the segments 1043*a* to 1043*d* of the commutator 1043 or a contact failure is generated between the brushes 1039*a* to 39*d* and the segments 1044*a* to 1044*d* of the commutator 1044.

In contrast, in the present embodiment, in the bearing mechanism 1049, the rotation shaft supporting member 1045 is supported by the stator 1031, and the position on the other side in the axial direction with respect to the bearing 1032 in the axis line of the rotation shaft 1030 is the fulcrum P1. The rotation shaft 1030 is supported to be freely oscillatable via the bearing 1032 centered on the fulcrum P1. In addition to this, the commutators 1043 and 1044 are disposed on the fulcrum P1 side.

Therefore, variation in contact portion between the brushes 1038*a* to 1038*d* and the segments 1043*a* to 1043*d* can be prevented. Accordingly, the contact state between the brushes 1038*a* to 1038*d* and the segments 1043*a* to 1043*d* becomes excellent. Furthermore, variation in contact portion between the brushes 1039*a* to 39*d* and the segments 1044*a* to 1044*d* can be prevented. Accordingly, the contact state between the brushes 1039*a* to 39*d* and the segments 1044*a* to 1044*d* of the commutator 1044 becomes excellent.

In particular, in the present embodiment, the fulcrum P1 is an intermediate point between the rotation center of the commutator 1044 and the rotation center of the commutator 1043, in the axis line of the rotation shaft 1030. Therefore, variation in contact portion between the brushes 1038*a* to 1038*d* and the segments 1043*a* to 1043*d* can be reliably prevented. Furthermore, variation in contact portion between the brushes 1039*a* to 1039*d* and the segments 1044*a* to 1044*d* can be reliably prevented.

Figure 61:
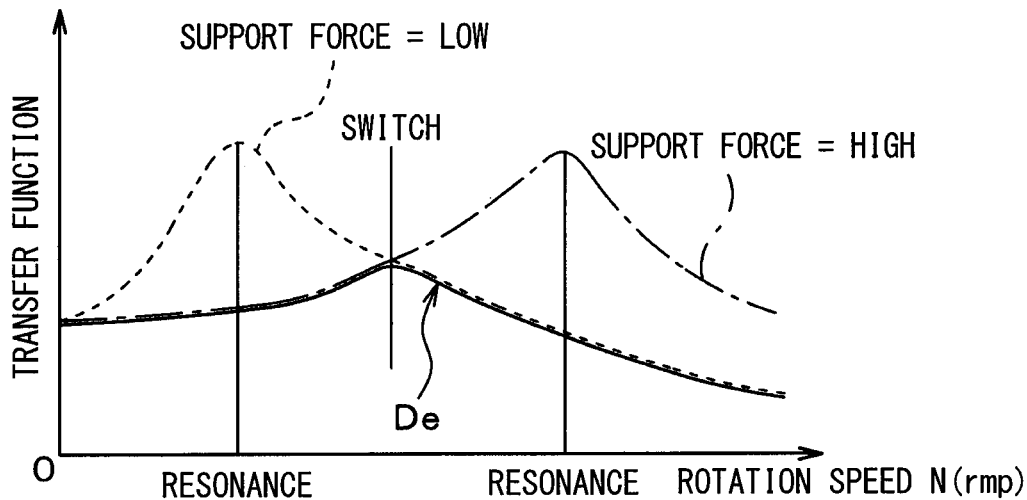
FIG. 61 is a view illustrating a relationship of transfer function-number of rotations of an electric motor of FIG. 48.

In FIG. 61, a horizontal axis is the number of rotations N (that is, rotational speed) of the rotation shaft 1030. The vertical axis is a transfer function indicating a vibration system of the electric motor 1010. In the transfer function, a centrifugal force generated from the vibration source is input using the tilt vibration of the rotation shaft 1030 as a vibration source. The tilt vibration of the rotation shaft 1030 is a phenomenon in which the rotation shaft 1030 oscillates in the radial direction around the rotation center line S1 when the rotation shaft 1030 rotates. In the transfer function, the vibration acceleration at the predetermined portion (for example, stator 1031) other than the rotation shaft 1030 and the armature 1036 in the electric motor 1010 is output.

The graph De illustrated by a solid line indicates the transfer function indicating the vibration system of the electric motor 1010 of the present embodiment. A chain line indicates the transfer function indicating the vibration system of the electric motor 1010 when the supporting force Fa decreases, and a one-dot chain line indicates the transfer function indicating the vibration system of the electric motor 1010 when the supporting force Fa increases.

Here, a peak of the transfer function in a case where the supporting force Fa is small is generated when the number of rotations of the rotation shaft 1030 is a low speed. A peak of the transfer function in a case where the supporting force Fa is large is generated when the number of rotations of the rotation shaft 1030 is a high speed (refer to FIG. 61). Therefore, in a case where the supporting force Fa is small, resonance is generated in the electric motor 1010 when the number of rotations of the rotation shaft 1030 is a low speed. Meanwhile, when the supporting force Fa is large, resonance is generated in the electric motor 1010 when the number of rotations of the rotation shaft 1030 is a high speed.

Here, in the present embodiment, the supporting force Fa decreases when the rotation shaft 1030 rotates at a high speed, and the supporting force Fa increases when the rotation shaft 1030 rotates at a low speed. In other words, the magnitude of the supporting force Fa is switched according to the number of rotations of the rotation shaft 1030. Therefore, in the vibration system of the electric motor 1010, the transfer function De of which the peak is suppressed is formed. Accordingly, the resonance can be unlikely to be generated in the electric motor 1010.

Figure 62:
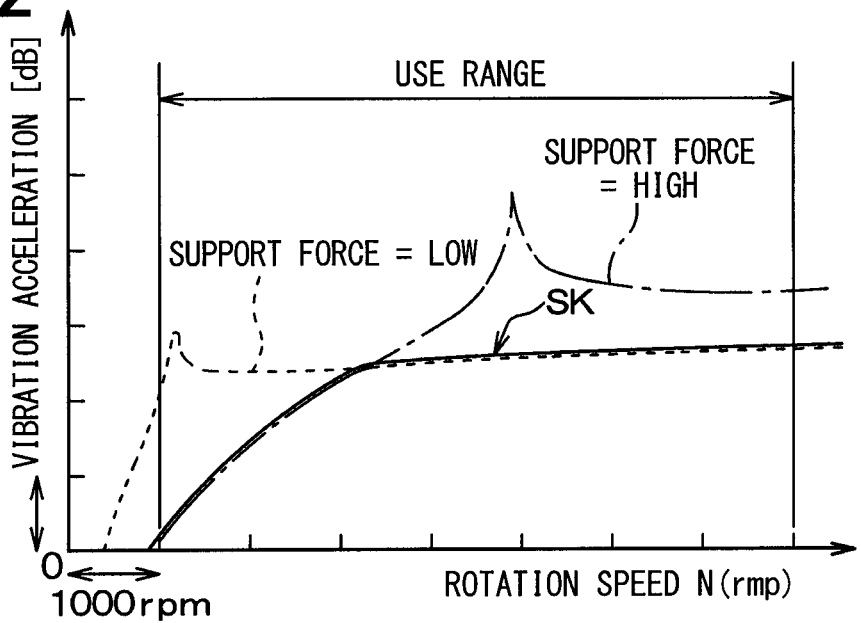
FIG. 62 is a view illustrating a relationship of vibration acceleration-number of rotations of the electric motor of FIG. 48.

Above, the tilt vibration of the rotation shaft 1030 is caused, and vibration acceleration Sk generated in the electric motor 1010 can be reduced across a use range of the rotational speed N (refer to FIG. 62). The use range is a range of the number of rotations N of the rotation shaft 1030 to be practically used in the electric motor 1010.

In addition, in FIG. 62, a horizontal axis is the number of rotations N of the rotation shaft 1030. A vertical axis is the vibration acceleration generated at a predetermined portion (for example, stator 1031) other than the rotation shaft 1030 and the armature 1036 in the electric motor 1010. A chain line indicates the vibration acceleration generated at the predetermined portion in the electric motor 1010 when the supporting force Fa is small, and a one-dot chain line indicates the vibration acceleration generated at the predetermined portion in the electric motor 1010 when the supporting force Fa increases. SK illustrated by a solid line indicates the vibration acceleration generated at the predetermined portion in the electric motor 1010 of the present embodiment.

Ninth Embodiment

In the above-described eighth embodiment, an example in which the supporting force Fa that causes the axis line S2 of the rotation shaft 1030 to approach the rotation center line S1 is generated in order to prevent the axis line S2 of the rotation shaft 1030 from being inclined from the rotation center line S1, is described, but instead of this, the ninth embodiment in which the restoring force Fb for moving the rotation shaft 1030 in the rotation direction is generated will be described.

Figure 64:
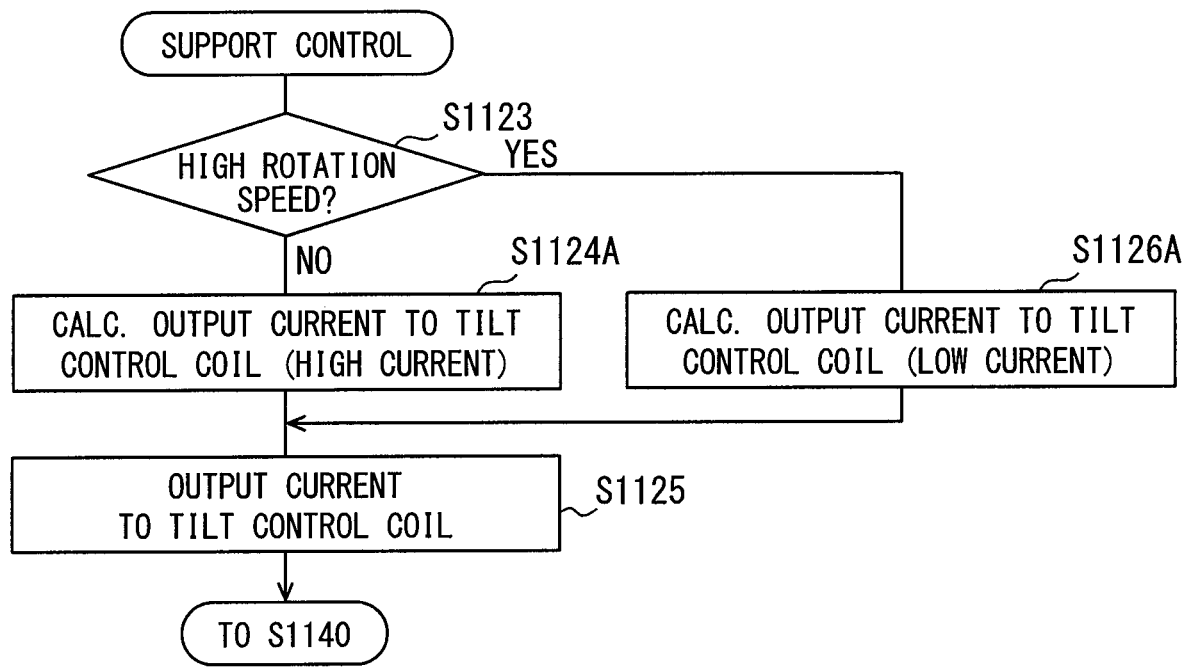
FIG. 64 is a flowchart illustrating supporting processing of a control circuit in a ninth embodiment of the present disclosure.
Figure 65:
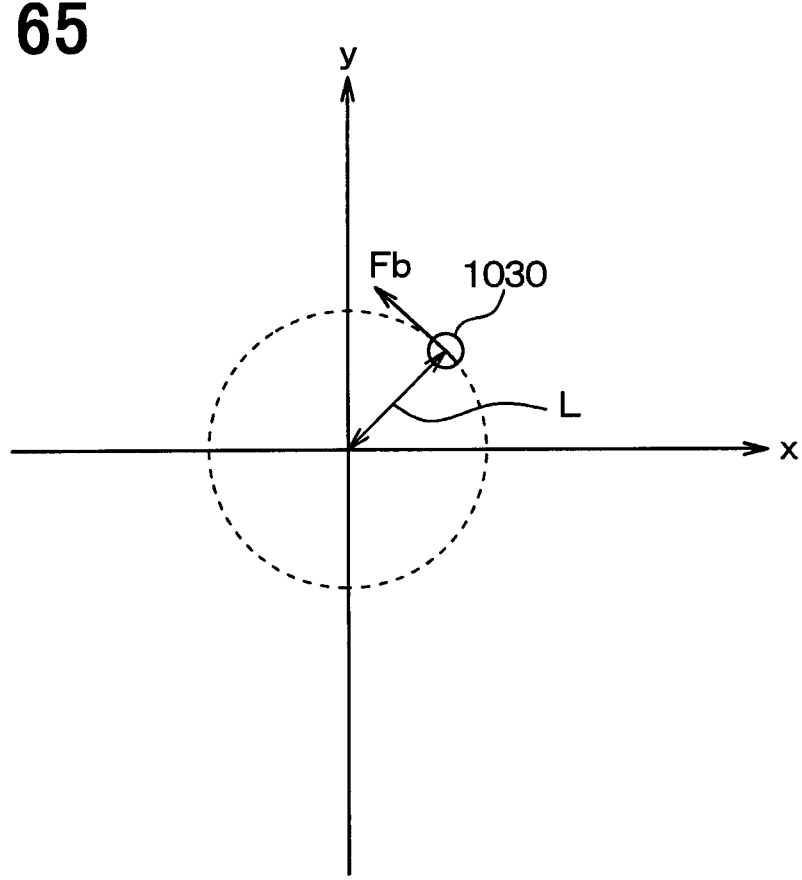
FIG. 65 is a view illustrating an electromagnetic force generated by a tilt-control coil in the ninth embodiment.

The present embodiment and the above-described eighth embodiment are different in supporting control of the control circuit 1074 (Step 1120). Hereinafter, the supporting control (Step 1120) of the present embodiment will be described. FIG. 64 is a flowchart specifically illustrating the supporting control of the control circuit 1074.

First, in Step 1123, it is determined whether or not the rotational speed of the rotation shaft 1030 is a high speed.

Specifically, the difference (Ha−Hc) between the output signal Ha of the hall sensor 1037*a* and the output signal Hc of the hall sensor 1037*c* is acquired, and the rotational speed of the rotation shaft 1030 is calculated based on the change in the acquired difference (Ha−Hc) with respect to the time. It is determined whether or not the calculated rotational speed (hereinafter, referred to as a calculated rotational speed V) is equal to or higher than a predetermined speed.

When the calculated rotational speed V is equal to or higher than the predetermined speed, YES which means that the rotational speed of the rotation shaft 1030 is a high speed is determined in Step 1123. In this case, in order to generate the restoring force Fb necessary for preventing the rotation shaft 1030 from being inclined from the rotation center line S1 between the coils 1050*a* and 1050*b* and the permanent magnets 1035*a* and 1035*b*, the current to be output to the coils 1050*a* and 1050*b* is calculated (Step 1126A).

Meanwhile, when the calculated rotational speed V is lower than the predetermined speed, NO which means that the rotational speed of the rotation shaft 1030 is a low speed is determined in Step 1123. In this case, since the restoring force Fb for preventing the rotation shaft 1030 from being inclined from the rotation center line 51 is generated between the coils 1050*a* and 1050*b* and the permanent magnets 1035*a* and 1035*b*, the current to be output to the coils 1050*a* and 1050*b* is calculated (Step 1124A).

The restoring force Fb of the present embodiment is the electromagnetic force for moving the fan 1020 (that is, rotation shaft 1030) in the rotation direction. Regarding the restoring force Fb, the restoring force Fb is an electromagnetic force determined from (L×V×C) when a distance between the fan 1020 and the rotation center line 51 is set to be L, the number of rotations of the fan 1020 (that is, rotation shaft 1030) is set to be V, and an attenuation coefficient is set to be C (refer to FIG. 70). The shaft center of the fan 1020 of the present embodiment is the shaft center of the end portion on the other end side in the axial direction of the rotation shaft 1030.

Here, the distance L is acquired by the XY coordinates (x0, y0) of the fan 1020. The X coordinate (x0) is acquired based on the difference ds (=Ha−Hc) between the output signal Ha of the hall sensor 1037a and the output signal Hc of the hall sensor 1037c, as described in the above-described eighth embodiment. The Y coordinate (y0) is acquired based on the difference dq (=Hb−Hd) between the output signal Hb of the hall sensor 1037b and the output signal Hd of the hall sensor 1037d. The number of rotations V is calculated based on the difference (Ha−Hc) between the output signal Ha of the hall sensor 1037a and the output signal Hc of the hall sensor 1037c, as described above. The rotation direction of the fan 1020 (that is, rotation shaft 1030) is acquired by the XY coordinates (x0, y0) of the shaft center of the fan 1020.

Here, in the present embodiment, in Steps 1124A and 126A, the current to be output to the coils 1050a and 1050b is calculated based on the XY coordinates (x0, y0) of the fan 1020 and (L×V×C). As the restoring force Fb increases, the current to be output to the coils 1050a and 1050b increases.

In this manner, in order to output the current calculated in Steps 1124A and 126A to the coil, the transistors SW1, SW2, . . . , and SW6 of the bridge circuit 1071 are controlled. Accordingly, the current is output to the coils 1050a and 1050b from the common connection terminals T1, T2, and T3 (Step 1125). Therefore, the electromagnetic force which is the restoring force Fb for moving the fan 1020 in the rotation direction of the fan 1020 around the rotation center line S1 is generated between the coils 1050a and 1050b and the permanent magnets 1035a and 1035b.

The restoring force Fb which acts in the rotation direction in this manner acts between the coils 1050a and 1050b and the permanent magnets 1035a and 1035b. Therefore, the axis line S2 of the rotation shaft 1030 is prevented from being inclined from the rotation center line S1 by disturbance or the like.

Here, as the number of rotations of the rotation shaft 1030 increases, the restoring force Fb necessary for preventing the rotation shaft 1030 from being inclined from the rotation center line S1 decreases. In other words, when the rotation shaft 1030 rotates at a high speed, the necessary restoring force Fb becomes small compared to that when the rotation shaft 1030 rotates at a low speed.

Here, when YES which means that the rotation shaft 1030 rotates at a high speed is determined in Step 1123, the attenuation coefficient C decreases, and the current to be output to the coils 1050a and 1050b decreases (Step 1126A). Meanwhile, when NO which means that the rotation shaft 1030 rotates at a low speed is determined in Step 1123, the attenuation coefficient C increases, and the current to be output to the coils 1050a and 1050b increases (Step 1124A). In other words, when the rotation shaft 1030 rotates at a high speed, compared to that when the rotation shaft 1030 rotates at a low speed, the attenuation coefficient C can decrease, and the current that flows to the coils 1050a and 1050b can decrease.

According to the present embodiment described above, the electronic control device 1070 controls the bridge circuit 1071, and generates the restoring force Fb (=L×V×C) for moving the fan 1020 in the rotation direction between the coils 1050a and 1050b and the permanent magnets 1035a and 1035b when the distance between the fan 1020 and the rotation center line S1 is set to be L and the attenuation coefficient is set to be C. Accordingly, even when the disturbance is generated, the axis line S2 of the rotation shaft 1030 is prevented from being inclined from the rotation center line S1 of the rotation shaft 1030.

Above, the rotation shaft 1030 is rotatably supported from the magnetic bearing including the permanent magnets 1035a and 1035b and the coils 1050a and 1050b and from the bearing main body 1032a. Accordingly, one magnetic bearing for supporting the rotation shaft 1030 is used. Therefore, the power consumption for supporting the rotation shaft 1030 can be reduced.

In the present embodiment, when the rotation shaft 1030 rotates at a high speed, the current output to the coils 1050a and 1050b from the bridge circuits 1071 and 72 becomes small compared to that when the rotation shaft 1030 rotates at a low speed. Therefore, when the rotation shaft 1030 rotates at a high speed, the restoring force Fb becomes small compared to that when the rotation shaft 1030 rotates at a low speed. Therefore, since the restoring force Fb is generated, the power consumed by the coils 1050a and 1050b can be reduced.

Figure 66:
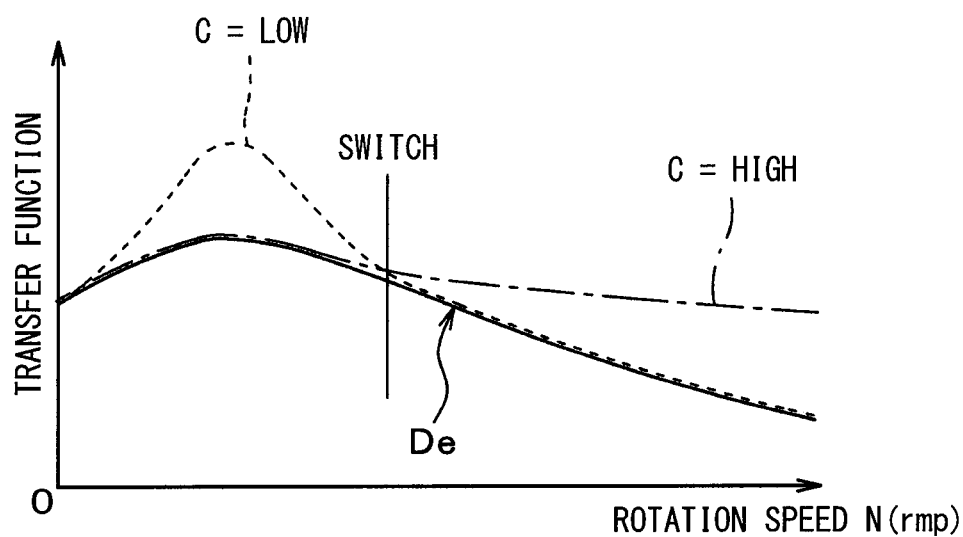
FIG. 66 is a view illustrating a relationship of transfer function-rotational speed of an electric motor in the ninth embodiment.

In FIG. 66, a graph in which the number of rotations N of the rotation shaft 1030 is a horizontal axis and the transfer function indicating the vibration system of the electric motor 1010 is a vertical axis, is illustrated. In the transfer function, a centrifugal force generated from the vibration source is input using the tilt vibration of the rotation shaft 1030 as a vibration source. In the transfer function, the vibration acceleration at the predetermined portion (for example, stator 1031) other than the rotation shaft 1030 and the armature 1036 in the electric motor 1010 is output.

The graph De indicates the transfer function indicating the vibration system of the electric motor 1010 of the present embodiment. The graph of a chain line indicates the transfer function in a case where the attenuation coefficient C is small, and a one-dot chain line indicates the transfer function in a case where the attenuation coefficient C is large.

Here, when the rotation shaft 1030 rotates at a low speed, in a case where the attenuation coefficient C (that is, restoring force Fb) is small, the transfer function becomes large compared to a case where the attenuation coefficient C is large (refer to FIG. 66). Meanwhile, when the rotation shaft 1030 rotates at a high speed, in a case where the attenuation coefficient C is large, the transfer function becomes large compared to a case where the attenuation coefficient C is small.

Here, in the present embodiment, the attenuation coefficient C decreases when the rotation shaft 1030 rotates at a high speed, and the attenuation coefficient C increases when the rotation shaft 1030 rotates at a low speed. In other words, by the number of rotations of the rotation shaft 1030, by switching the size of the attenuation coefficient C (that is, restoring force Fb), an increase in transfer function is restricted. Accordingly, in the electric motor 1010, the resonance can be unlikely to be generated.

Above, since the attenuation coefficient C is switched according to the number of rotations N, similar to the above-described eighth embodiment, the vibration acceleration can be reduced in the electric motor 1010 across the use range of the number of rotations N. Accordingly, small vibration can be achieved.

Tenth Embodiment

In the above-described eighth embodiment, an example in which the radius of curvature r1 of the inner peripheral surface 1047 and the radius of curvature r2 of the side surface 1048 are the same as each other is described, but instead of this, the tenth embodiment in which the radius of curvature r1 of the inner peripheral surface 1047 is smaller than the radius of curvature r2 of the side surface 1048 will be described with reference to FIGS. 67 and 68.

Figure 67:
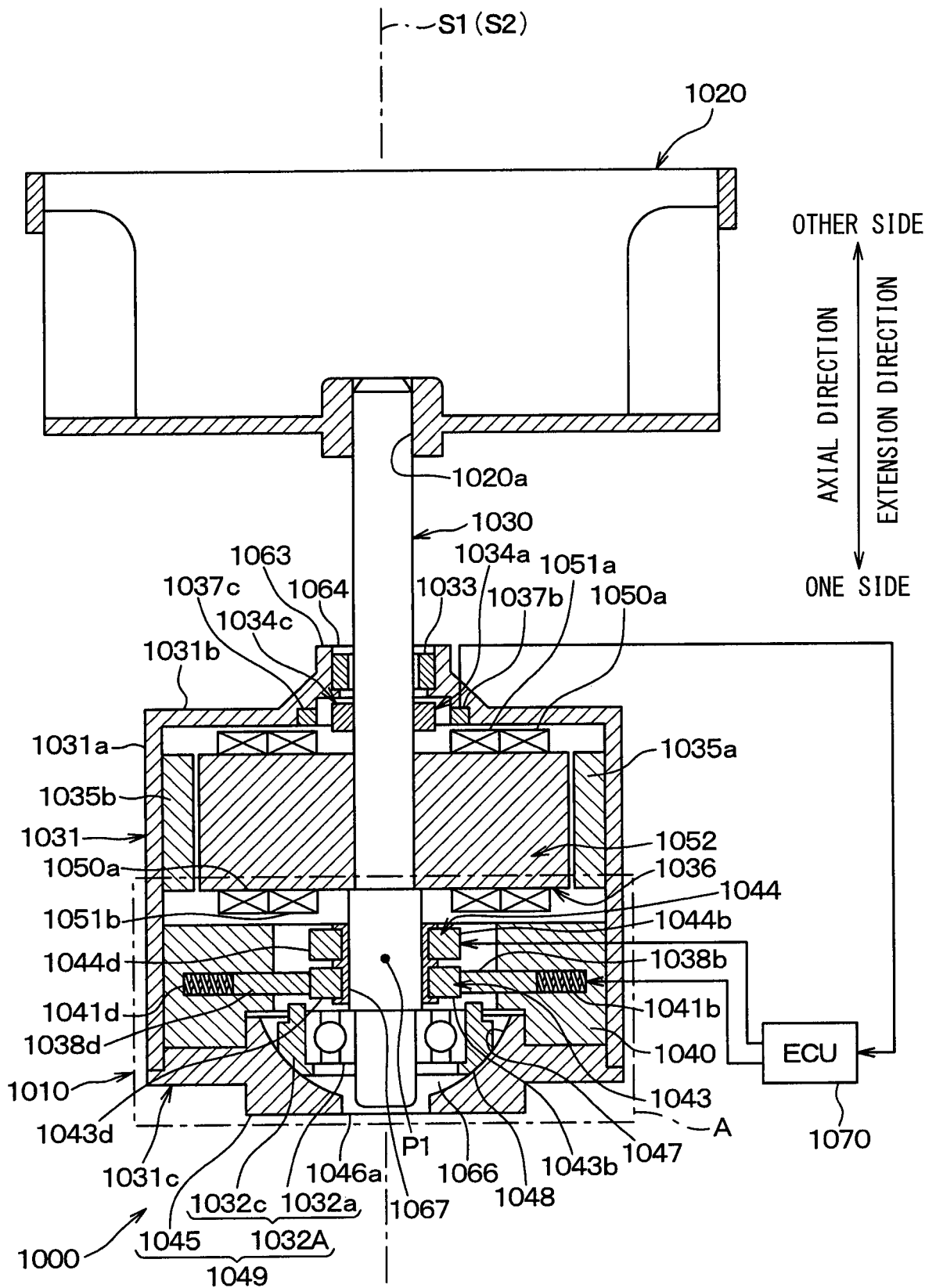
FIG. 67 is a view illustrating the entire configuration of a motor control system in a tenth embodiment of the present disclosure.
Figure 68:
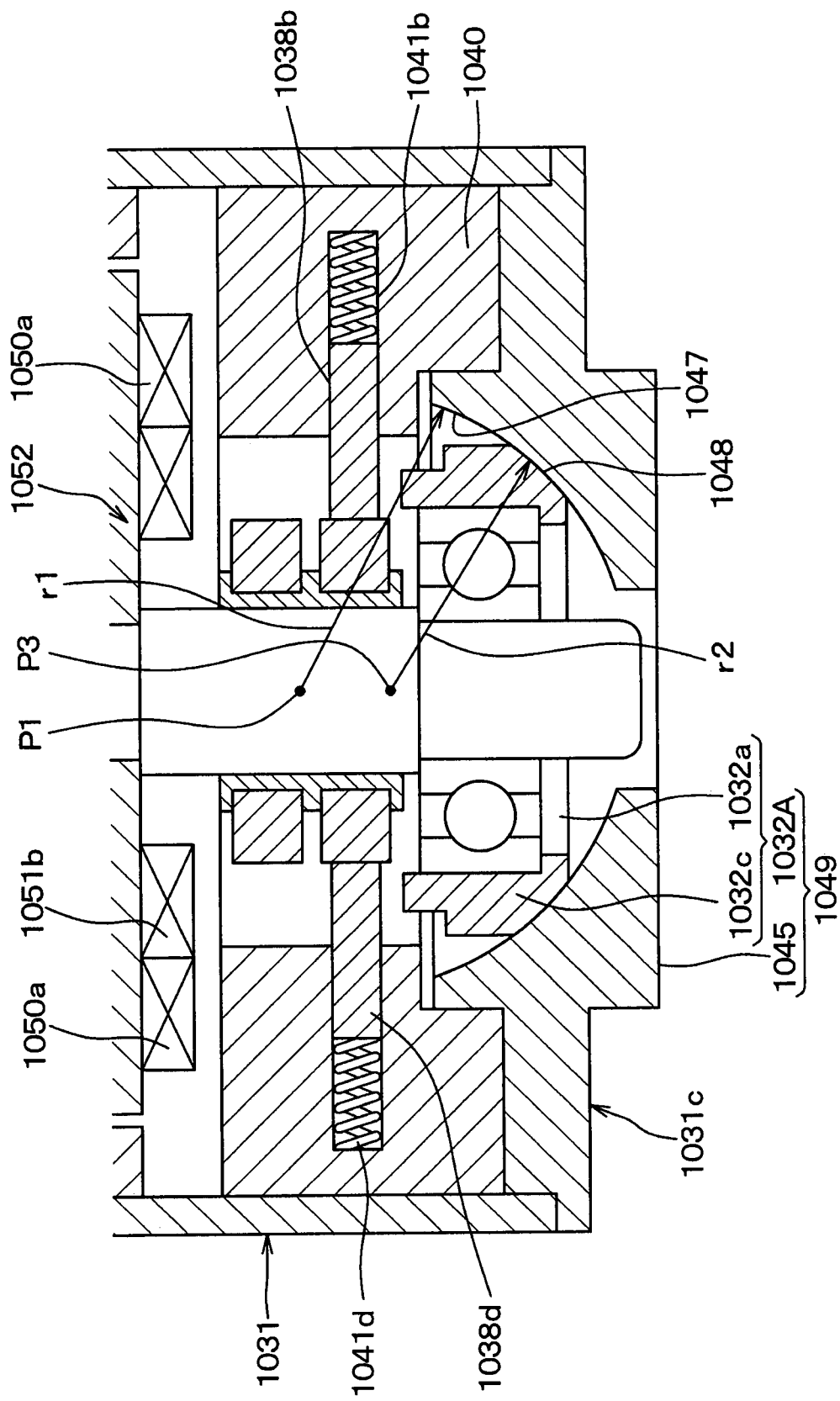
FIG. 68 is a partially enlarged view of FIG. 67.

FIG. 67 is a cross-sectional view illustrating the entire configuration of the motor control system 1000 of the tenth embodiment. FIG. 68 is a partially enlarged view of FIG. 67.

In the present embodiment and the above-described eighth embodiment, only the side surface 1048 of the brush 1032b of the bearing 1032 is different, and a configuration except for the side surface 1048 of the brush 1032b of the bearing 1032 is the same. Therefore, the side surface 1048 of the brush 1032b of the bearing 1032 of the present embodiment will be described, and the description of other configurations will be omitted.

The side surface 1048 of the brush 1032b of the bearing 1032 is formed in an annular shape around the axis line S2 of the rotation shaft 1030. In the side surface 1048, the section including the axis line S2 of the rotation shaft 1030 is formed in an arc shape around a fulcrum P3. The fulcrum P3 is located further on one side in the axial direction (lower side in FIG. 68) than the fulcrum P1. Therefore, the radius (that is, radius of curvature) r2 between the inner peripheral surface 1047 and the fulcrum P3 becomes smaller than the radius (that is, radius of curvature) r1 between the side surface 1048 and the fulcrum P1.

In the present embodiment configured in this manner, in the bearing mechanism 1049, the side surface 1048 of the bearing 1032 slides with respect to the inner peripheral surface 1047 of the rotation shaft supporting member 1045 according to the rotation of the rotation shaft 1030. According to this, the bearing mechanism 1049 can rotatably support the rotation shaft 1030 centered on the fulcrum P1 via the bearing 1032, similar to the above-described eighth embodiment.

Eleventh Embodiment

Figure 69:
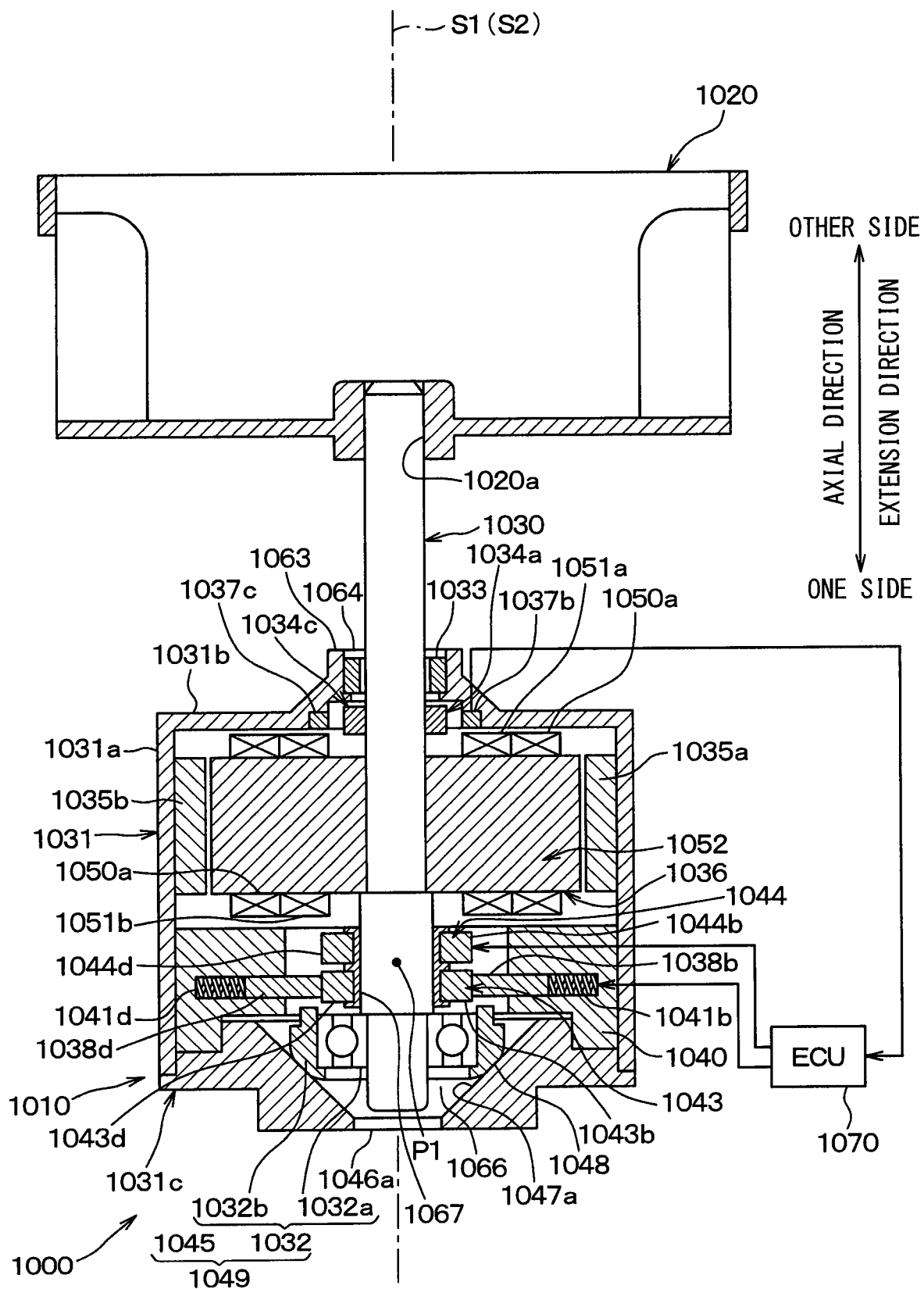
FIG. 69 is a view illustrating the entire configuration of a motor control system in an eleventh embodiment of the present disclosure.

In the above-described eighth embodiment, an example in which the inner peripheral surface 1047 of the rotation shaft supporting member 1045 is formed in a shape of a spherical surface is described, but instead of this, in the eleventh embodiment, the inner peripheral surface 1047 of the rotation shaft supporting member 1045 is configured as illustrated in FIG. 69.

FIG. 69 is a cross-sectional view illustrating the entire configuration of the motor control system 1000 of the eleventh embodiment.

In the present embodiment and the above-described eighth embodiment, only the inner peripheral surface 1047 of the rotation shaft supporting member 1045 is different, and a configuration except for the inner peripheral surface 1047 of the brush 1032b is the same. Therefore, the inner peripheral surface 1047 of the brush 1032b of the present embodiment will be described, and the description of other configurations will be omitted. Hereinafter, for convenience of the description, the inner peripheral surface 1047 of the brush 1032b of the present embodiment is an inner peripheral surface 1047a.

The inner peripheral surface 1047a of the rotation shaft supporting member 1045 of the present embodiment is formed in an annular shape centered on the rotation center line S1, and the section orthogonal to the rotation center line S1 is formed in a circular shape. Furthermore, the inner peripheral surface 1047a is formed such that an area of the section orthogonal to the rotation center line S1 in a hole portion 1046 gradually decreases as approaching one side (lower side in FIG. 69) in the extension direction from the other side (upper side in FIG. 69) in the extension direction of the rotation center line S1. The extension direction of the rotation center line S1 is a direction in which the rotation center line S1 extends.

In the present embodiment configured in this manner, in the bearing mechanism 1049, the side surface 1048 of the bearing 1032 slides with respect to the inner peripheral surface 1047 of the rotation shaft supporting member 1045 according to the rotation of the rotation shaft 1030. According to this, the bearing mechanism 1049 can rotatably support the rotation shaft 1030 centered on the fulcrum P1 via the bearing 1032, similar to the above-described eighth embodiment.

Twelfth Embodiment

In the twelfth embodiment, an example in which an automatic aligning thrust bearing is formed as the bearing mechanism 1049 in the motor control system 1000 of the above-described eighth embodiment, will be described.

Figure 70:
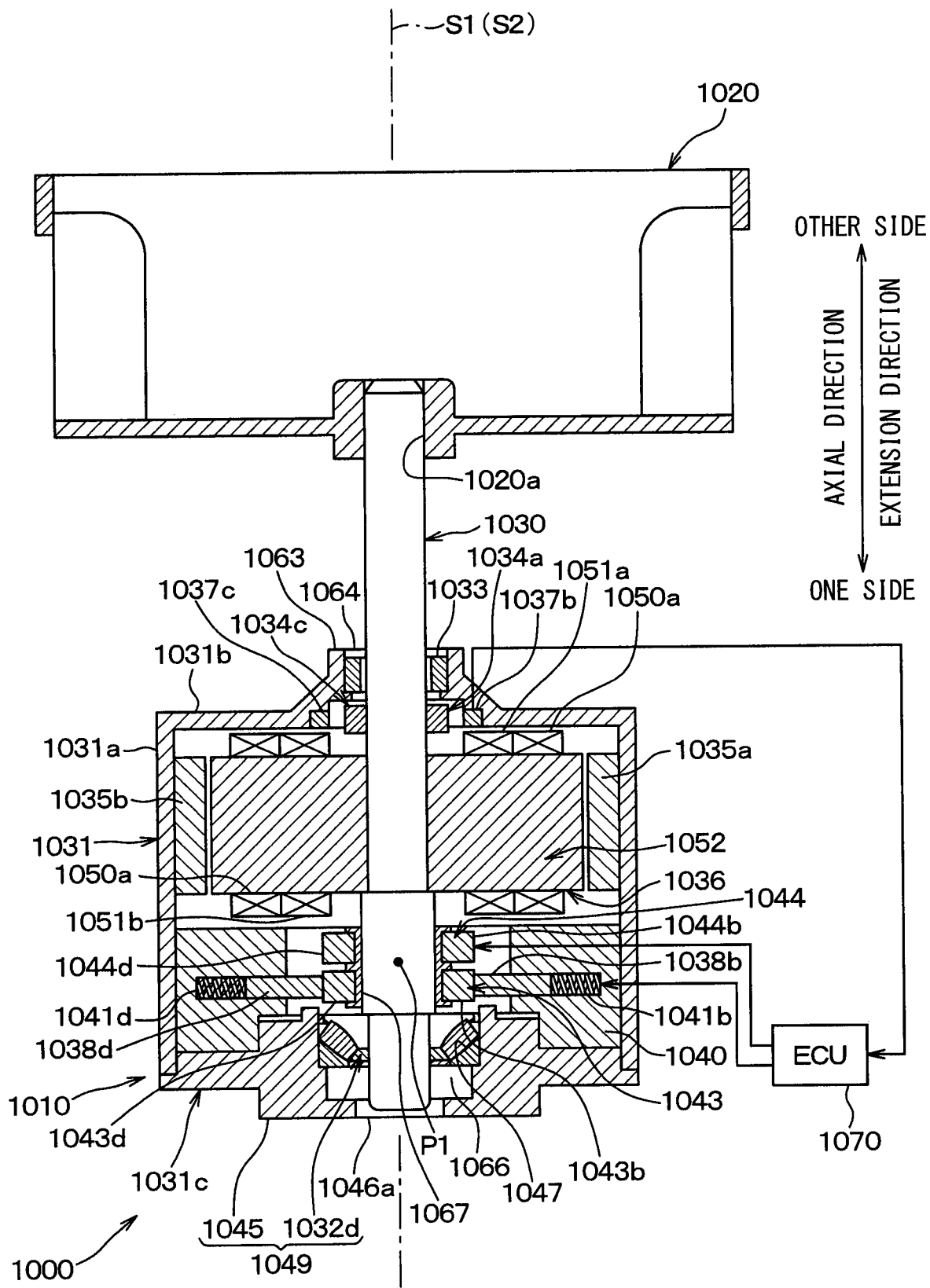
FIG. 70 is a view illustrating the entire configuration of a motor control system in a twelfth embodiment of the present disclosure.

FIG. 70 is a cross-sectional view illustrating the entire configuration of the motor control system 1000 in the eleventh embodiment of the present disclosure.

In the present embodiment and the above-described eighth embodiment, only the bearing mechanism 1049 is different, and a configuration except for the bearing mechanism 1049 is the same. Therefore, the bearing mechanism 1049 of the present embodiment will be described and the description thereof will be omitted.

The bearing mechanism 1049 of the present embodiment includes a bearing 1032d instead of the bearing 1032 of FIG. 48, and the rotation shaft supporting member 1045.

The bearing 1032d and the rotation shaft supporting member 1045 form the bearing mechanism 1049 which supports the rotation shaft 1030 to be freely oscillatable around the fulcrum P1 via the bearing 1032d.

When the rotation shaft 1030 rotates centered on the rotation center line S1, the bearing 1032d slides with respect to the inner peripheral surface 1047 of the rotation shaft supporting member 1045. According to this, the bearing mechanism 1049 can rotatably support the rotation shaft 1030 centered on the fulcrum P1 via the bearing 1032, similar to the above-described eighth embodiment.

When the rotation shaft 1030 rotates around the rotation center line S1, the bearing mechanism 1049 of the present embodiment forms a known automatic aligning thrust bearing in which the axis line of the rotation shaft 1030 automatically matches the rotation center line S1.

Other Embodiments (1) When performing the present disclosure, the above-described eighth and ninth embodiments may be combined and realized. In other words, the supporting control processing of Step 1120 in the above-described eighth embodiment and the supporting control processing of Step 1120 in the above-described ninth embodiment, are performed in parallel. Therefore, as the electronic control device 1070 controls the current that flows to the coils 1050a, 1050b, and 50c, the supporting force Fa that causes the axis line M2 of the rotation shaft 1030 to approach the rotation center line M1 and the restoring force Fb (=L×V×C) for moving the rotation shaft 1030 in the rotation direction, are generated.

At this time, when the rotation shaft 1030 rotates at a high speed, the supporting force Fa becomes small compared to that when the rotation shaft 1030 rotates at a low speed. In addition to this, when the rotation shaft 1030 rotates at a high speed, compared to a case where the rotation shaft 1030 rotates at a low speed, the attenuation coefficient C decreases and the current that flows to the coils 1050a, 1050b, and 1050c decreases. In other words, both of the supporting force Fa and the attenuation coefficient C (that is, restoring force Fb) are switched according to the rotational speed of the rotation shaft 1030.

(2) In the above-described eighth to twelfth embodiments, an example in which the DC motor is used as the electric motor 1010 of the present disclosure is described, but instead of this, the electric motor 1010 which is a synchronization type three-phase AC motor may be employed.

(3) In the above-described eighth to twelfth embodiments, an example in which the rolling bearing is used as the bearing 1032 which is the mechanical bearing is described, but instead of this, a plain bearing and a fluid bearing may be used as the bearing 1032. The plain bearing is a bearing which receives a shaft on a sliding surface. The fluid bearing is a bearing supported by liquid or gas.

(4) In the above-described eighth to twelfth embodiments, an example in which the common permanent magnets 1035a and 1035b are used as the permanent magnet that imparts the magnetic flux to the coils 1051a and 1051b and the permanent magnet that imparts the magnetic flux to the coils 1050a and 1050b in the rotation shaft 1030 is described, but instead of this, the following may be employed.

The permanent magnet that imparts the magnetic flux to the coils 1051a and 1051b and the permanent magnet that imparts the magnetic flux to the coils 1050a and 1050b in the rotation shaft 1030 may be respectively and independently provided.

(5) In the above-described eighth to twelfth embodiments, an example in which the rotational speed or the rotation angle of the rotation shaft 1030 is acquired by the hall sensors 1037a, 1037b, 1037c, and 1037d is described, but instead of this, the following may be employed.

In other words, a sensor (for example, an optical encoder) for acquiring the rotational speed or the rotation angle of the rotation shaft 1030 is provided in addition to the hall sensors 1037a, 1037b, 1037c, and 1037d.

(6) In the above-described eighth to twelfth embodiments, an example in which the tilt angle θ with respect to the rotation center line S1 of the rotation shaft 1030, the XY coordinates of the end portion (that is, fan 1020) on the other side of the rotation shaft 1030 in the axis line direction, and the rotation angle of the rotation shaft 1030 are detected by the hall sensors 1037a, 1037b, 1037c, and 1037d and the permanent magnets 1034a, 1034b, 1034c, and 1034d is described, but instead of this, the following may be employed.

In other words, the tilt angle θ of the rotation shaft 1030 with respect to the rotation center line M1 and the XY coordinates of the end portion on the other side of the rotation shaft 1030 in the axis line direction are detected by the hall sensors 1037a, 1037b, 1037c, and 1037d and the permanent magnets 1034a, 1034b, 1034c, and 1034d.

Furthermore, the rotation angle of the rotation shaft 1030 may be detected by the other rotation sensor in addition to the hall sensors 1037a, 1037b, 1037c, and 1037d and the permanent magnets 34a and 34b. In the case, another rotation sensor may be disposed on the bearing 1032 side in the rotation shaft 3.

(7) In the above-described eighth to twelfth embodiments, an example in which the rotational speed of the rotation shaft 1030 is calculated based on the difference (Ha−Hc) between the output signal Ha of the hall sensor 1037a and the output signal Hc of the hall sensor 1037c is described but instead of this, the following may be employed.

In other words, the rotational speed of the rotation shaft 1030 may be calculated from the change of the XY coordinates (X0, Y0) with respect to the time by acquiring the XY coordinates (X0, Y0) of the fan 1020 based on the output signal from the hall sensors 1037a, 1037b, 1037c, and 1037d.

In the eighth to twelfth embodiments and other embodiments which are configured in this manner, the present disclosure can be expressed as follows. (a) The present disclosure provides a control device which controls the current that flows to the second coil of the electric motor, including the rotation shaft control unit (S1123 to S1126) which prevents the axis line of the rotation shaft from being inclined from the rotation center line by controlling the current that flows to the second coil and by generating the electromagnetic force that causes the rotation shaft to approach the rotation center line. (b) In the present disclosure, the rotation shaft control unit increases the electromagnetic force by increasing the current that flows to the second coil as a tilt angle increases, based on a detection value of a tilt angle detection sensor (1037a, 1037b, 1037c, 1037d) which detects the tilt angle of the rotation shaft with respect to the rotation center line. (c) In the present disclosure, the rotation shaft control unit includes a determination unit (S1123) which determines whether or not the number of rotations of the rotation shaft is equal to or higher than a predetermined speed, in accordance with a detection value of a rotation sensor (1037a, 1037b, 1037c, 1037d) that detects rotation of the rotation shaft, and a first current control unit (S1124, S1125, S1126) which controls the current that flows to the second coil to decrease the electromagnetic force compared to that when the determination unit determines that the number of rotations of the rotation shaft is lower than a predetermined speed, when the determination unit determines that the number of rotations of the rotation shaft is equal to or higher than the predetermined speed. (d) In the present disclosure, there is provided a control device which controls the current that flows to the second coil of the electric motor, including the rotation shaft control unit (S1123, S1124A, S1126A, S) which controls the current that flows to the second coil and generates the electromagnetic force for moving the rotation shaft in the rotation direction in order to prevent the rotation shaft from being inclined from the rotation center line, and in which the electromagnetic force is a force determined by L×V×C when the distance detected by the rotation sensor (1037a, 1037b, 1037c, 1037d) for detecting each of the distance between the rotation center line of the rotation shaft and the other side of the rotation shaft in the axis line direction and the number of rotations of the rotation shaft is L, the number of rotations of the rotation shaft detected by the rotation sensor is V, and a coefficient is C. (e) In the present disclosure, the rotation shaft control unit includes a determination unit (S1123) which determines whether or not the number of rotations of the rotation shaft is equal to or higher than a predetermined speed, based on a detection value of a rotation sensor, and a second current control unit (S1124A, S1125, S1126A) which reduces the current that flows to the first coil by reducing the C compared to that when the determination unit determines that the number of rotations of the rotation shaft is lower than a predetermined speed, when the determination unit determines that the number of rotations of the rotation shaft is equal to or higher than the predetermined speed. (f) In the present disclosure, in the motor control system, the electric motor and the control device are provided.

Next, a correspondence relationship between the configuration elements of the above-described eighth to twelfth embodiments and the present disclosure will be described.

First, Step 1120 corresponds to the rotation shaft control unit, Steps 1124, 125, and 126 correspond to the first current control unit, Step 1123 corresponds to the determination unit, and Steps 1124A, 125, and 126A form the second current control unit.

In addition, the present disclosure is not limited to the above-described embodiments, and can be appropriately changed. In addition, each of the above-described embodiments is related to each other, and can be appropriately combined with each other except for a case where the combination is apparently impossible. In addition, in each of the above-described embodiments, it is needless to say that the elements that configure the embodiments are not necessarily essential except for a case where it is described that the elements are necessarily essential, or a case where it is principally apparent that the elements are necessarily essential. In addition, in each of the above-described embodiments, numbers are not limited to the certain number except for a case where numerical values, such as the number of configuration elements of the embodiments, are mentioned, a case where it is described that the numbers are necessarily essential, or a case where it is principally apparent that the numbers are necessarily essential.

What is claimed is:

1. An electric motor comprising:
   a supporting member which rotatably supports one side of a rotation shaft in an axis line direction via a mechanical bearing;
   a rotor which is attached to the rotation shaft and which includes a permanent magnet;
   a first coil which is attached to the supporting member and generates a magnetic field that generates a rotating force that rotates the rotor together with the rotation shaft;
   a second coil which is attached to the supporting member and generates an electromagnetic force as an attracting force between the permanent magnet and the second coil, the second coil forming a magnetic bearing that rotatably supports the other side of the rotation shaft in the axis line direction from the mechanical bearing; and
   a stator core which allows the magnetic field generated from the first and second coils to pass therethrough,
   wherein the rotation shaft, in which the mechanical bearing side is used as a fulcrum, is configured to be capable of being inclined with respect to a rotation center of the rotation shaft,
   wherein a control device controls a current that flows to the second coil such that an axis line of the rotation shaft approaches the rotation center due to the electromagnetic force between the permanent magnet and the second coil,
   wherein the first coil and the second coil are disposed in the radial direction centered on the rotation center line with respect to the permanent magnet,
   wherein each of the first and second coils is wound around the stator core, and
   wherein the first coil is disposed on a stator core side further toward the rotor with respect to the second coil.

2. The electric motor according to claim 1,
   wherein the stator core includes
      a ring portion formed in a ring shape centered on the rotation center line, and
      a plurality of teeth which are projected toward the radially outer side centered on the rotation center line from the ring portion and are aligned at an equivalent interval in the circumferential direction centered on the rotation center line,
   wherein the first and second coils are wound around each of the plurality of teeth, and
   wherein, for each of the teeth, the first coil is disposed on the stator core side with respect to the second coil by being disposed on the teeth side with respect to the second coil.

3. The electric motor according to claim 1,
   wherein the first and second coils are wound in pair.

4. The electric motor according to claim 1,
   wherein the permanent magnet generates the rotating force for rotating the rotor together with the rotation shaft by the magnetic field generated from the first coil.

5. A control device for an electric motor including a supporting member which rotatably supports one side of a rotation shaft in an axis line direction via a mechanical bearing, a rotor which is attached to the rotation shaft and which includes a permanent magnet, a first coil which is attached to the supporting member and generates a magnetic field that generates a rotating force for rotating the rotor together with the rotation shaft, and a second coil which is attached to the supporting member, the second coil generating an electromagnetic force between the permanent magnet and the second coil and forming a magnetic bearing that rotatably supports the other side of the rotation shaft in the axis line direction, in which the rotation shaft is configured to be capable of being inclined with respect to a rotation center line of the rotation shaft using the mechanical bearing side of the rotation shaft as a fulcrum, comprising:
   a rotation shaft control unit which controls a current that flows to the second coil such that an axis line of the rotation shaft approaches the rotation center line due to the electromagnetic force between the permanent magnet and the second coil,
   wherein the rotation shaft control unit increases the electromagnetic force by increasing the current that flows to the second coil as a tilt angle of the rotation shaft increases, based on a detection value of a tilt angle detection sensor which detects the tilt angle of the rotation shaft with respect to the rotation center line, and
   wherein the rotation shaft control unit includes
      a determination unit which determines whether or not a rotational speed of the rotation shaft is equal to or higher than a predetermined speed, in accordance with a detection value of a rotation sensor that detects rotation of the rotation shaft, and
      a first current control unit which, when the determination unit determines that the rotational speed of the rotation shaft is equal to or higher than the predetermined speed, controls the current that flows to the second coil to decrease the electromagnetic force as compared to when the determination unit determines that the rotational speed of the rotation shaft is lower than the predetermined speed.

6. The control device according to claim 5,
   wherein the rotation shaft control unit controls the current that flows to the second coil to generate
      the electromagnetic force for causing the axis line of the rotation shaft to approach the rotation center line, and
      the electromagnetic force for moving the rotation shaft in a rotation direction of the rotation shaft, and
   wherein when the rotation sensor is for detecting each of
      a distance between the rotation center line of the rotation shaft and the other side of the rotation shaft in the axis line direction and the rotational speed of the rotation shaft, the distance detected by the rotation sensor is L, the rotational speed of the rotation shaft detected by the rotation sensor is V, and a coefficient is C, the electromagnetic force for moving the rotation shaft in the rotation direction is a force determined by L×V×C.

7. The control device according to claim 6,
wherein the rotation shaft control unit includes
   a second current control unit which, when the determination unit determines that the rotational speed of the rotation shaft is equal to or higher than the predetermined speed, reduces the current that flows to the plurality of second coils by reducing the C as compared to when the determination unit determines that the rotational speed of the rotation shaft is lower than the predetermined speed.

8. The control device according to claim 5,
wherein, on one side in the axis line direction of the rotation shaft, the mechanical bearing rotatably supports a centroid side of a rotating body including the rotation shaft and the rotor including in the permanent magnet.

9. A motor control system comprising:
the electric motor and the control device according to claim 5.

* * * * *